(12) United States Patent
Rofougaran et al.

(10) Patent No.: US 8,160,640 B2
(45) Date of Patent: Apr. 17, 2012

(54) MULTI-MODE MOBILE COMMUNICATION DEVICE WITH MOTION SENSOR AND METHODS FOR USE THEREWITH

(75) Inventors: Ahmadreza Reza Rofougaran, Newport Coast, CA (US); Maryam Rofougaran, Rancho Palos Verdes, CA (US); Nambirajan Seshadri, Irvine, CA (US); Brima B. Ibrahim, Aliso Viejo, CA (US); John Walley, Ladera Ranch, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 434 days.

(21) Appl. No.: 12/131,579

(22) Filed: Jun. 2, 2008

(65) Prior Publication Data

US 2008/0318626 A1   Dec. 25, 2008

Related U.S. Application Data

(60) Provisional application No. 60/936,724, filed on Jun. 22, 2007.

(51) Int. Cl.
*H04M 1/00* (2006.01)

(52) U.S. Cl. .............. 455/556.1; 455/556.2; 455/550.1; 463/42

(58) Field of Classification Search ........... 463/42; 455/556.1, 456.5, 456.6, 403, 404.1, 404.2, 455/414.2
See application file for complete search history.

(56) References Cited

U.S. PATENT DOCUMENTS

| | | | | |
|---|---|---|---|---|
| 6,539,336 | B1 * | 3/2003 | Vock et al. | 702/182 |
| 7,218,645 | B2 * | 5/2007 | Lotter et al. | 370/469 |
| 7,715,432 | B2 * | 5/2010 | Bennett | 370/466 |
| 2003/0120183 | A1 * | 6/2003 | Simmons | 600/595 |
| 2005/0080566 | A1 * | 4/2005 | Vock et al. | 702/2 |
| 2006/0025282 | A1 * | 2/2006 | Redmann | 482/8 |
| 2006/0189386 | A1 * | 8/2006 | Rosenberg | 463/37 |
| 2008/0136775 | A1 * | 6/2008 | Conant | 345/156 |
| 2008/0316863 | A1 * | 12/2008 | Walley et al. | 367/135 |
| 2008/0318625 | A1 * | 12/2008 | Rofougaran | 455/556.1 |
| 2008/0318675 | A1 * | 12/2008 | Rofougaran et al. | 463/33 |
| 2008/0318680 | A1 * | 12/2008 | Rofougaran et al. | 463/39 |
| 2008/0318682 | A1 * | 12/2008 | Rofougaran et al. | 463/39 |
| 2008/0318689 | A1 * | 12/2008 | Rofougaran et al. | 463/42 |
| 2009/0002316 | A1 * | 1/2009 | Rofougaran | 345/156 |
| 2009/0011832 | A1 * | 1/2009 | Rofougaran | 463/41 |
| 2009/0258706 | A1 * | 10/2009 | Rofougaran et al. | 463/39 |
| 2009/0273559 | A1 * | 11/2009 | Rofougaran et al. | 345/156 |

* cited by examiner

*Primary Examiner* — Kent Chang
*Assistant Examiner* — Ronald Eisner
(74) *Attorney, Agent, or Firm* — Garlick & Markison; Bruce E. Stuckman

(57) ABSTRACT

A mobile communication device includes a motion sensor for generating motion signals in response to motion of the mobile communication device. A motion data generation module generates motion data based on the motion signals. At least one transceiver sends the motion data to a game device in a gaming mode of operation and transceives wireless telephony data with a wireless telephony network in a telephony mode of operation.

20 Claims, 41 Drawing Sheets

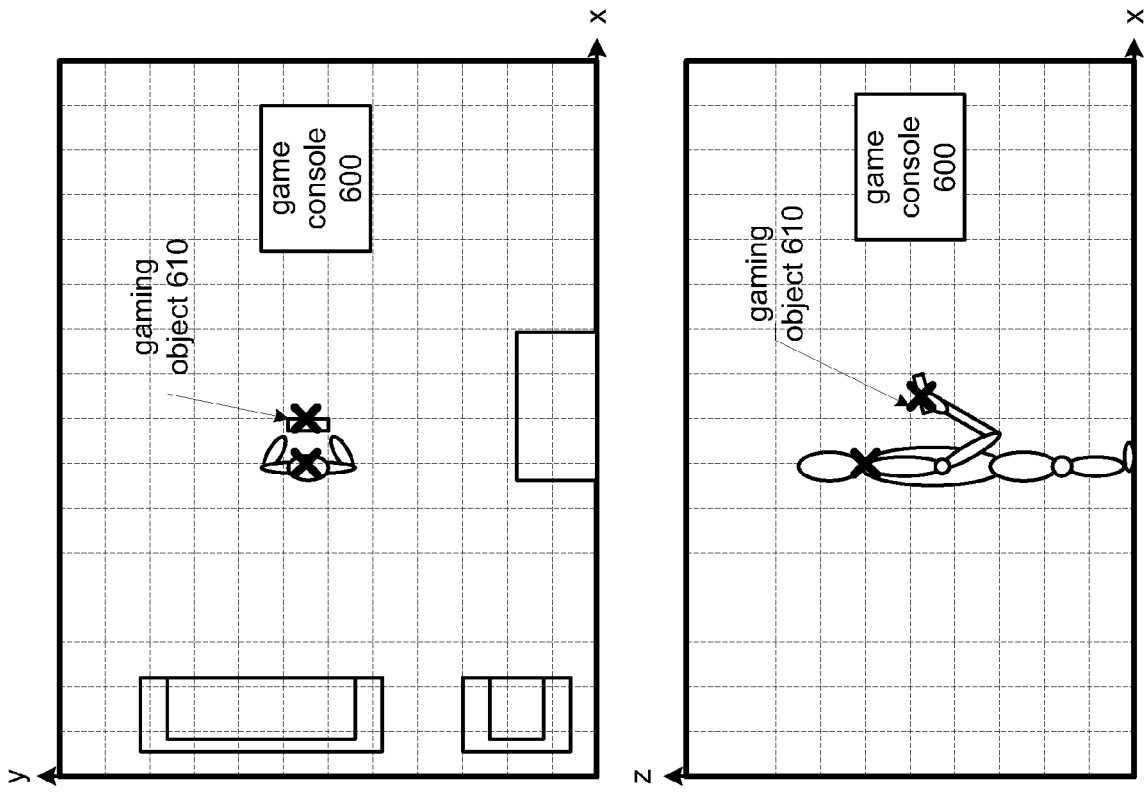
FIG. 31
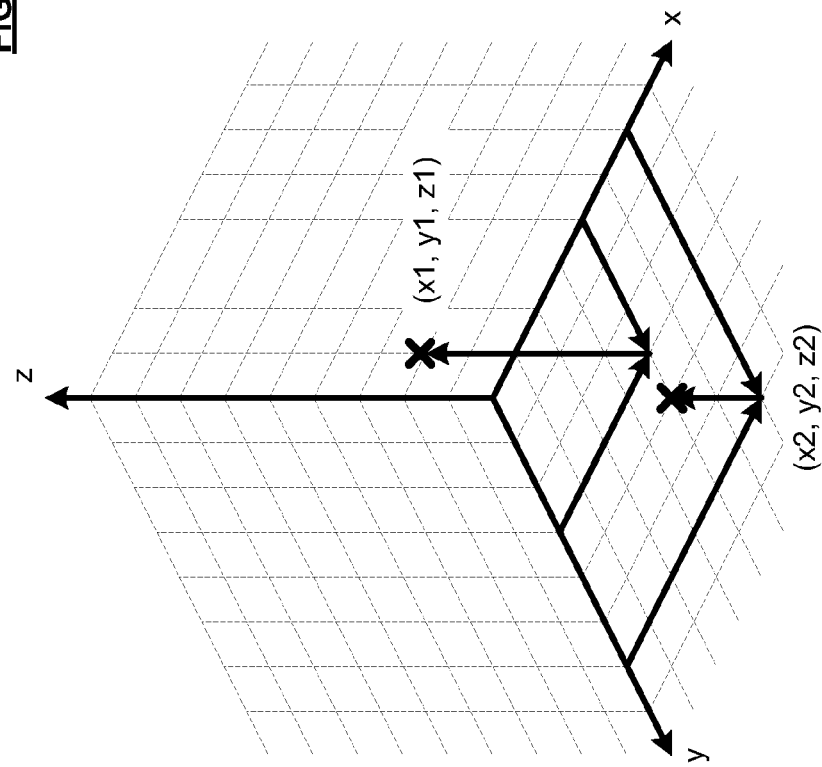
FIG. 32
FIG. 30

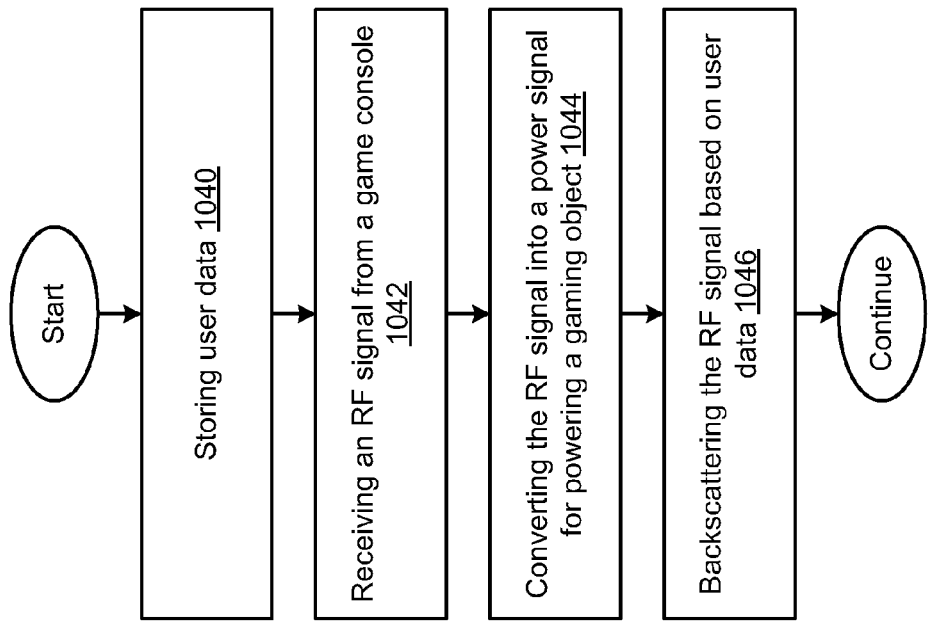
FIG. 52
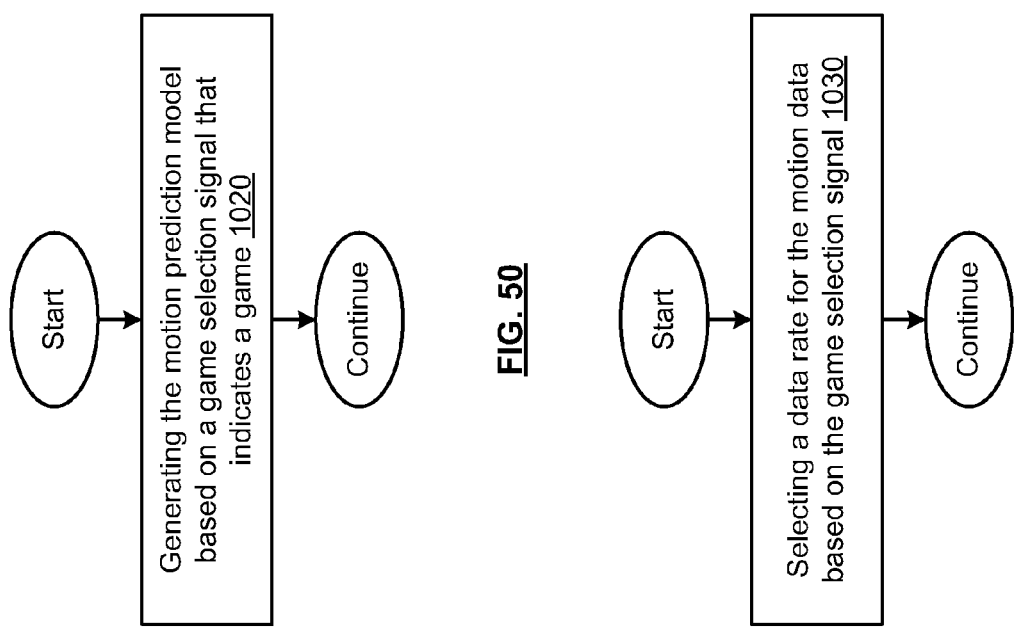
FIG. 50
FIG. 51

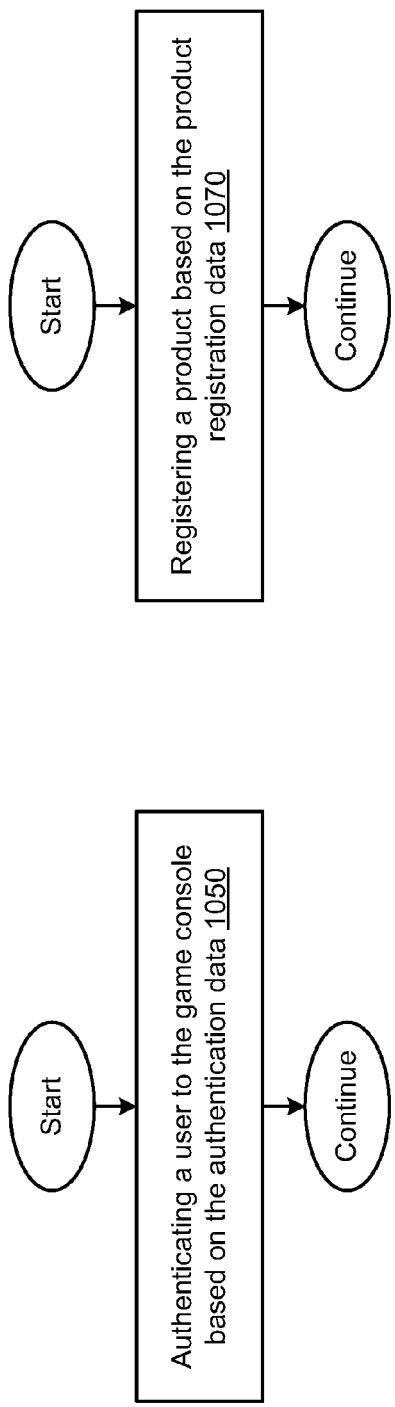
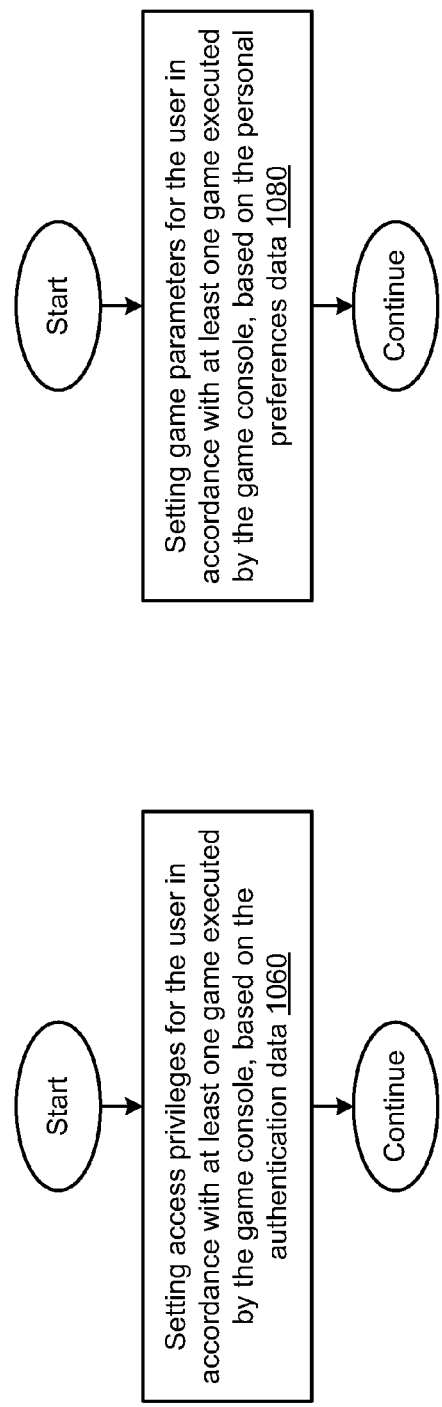
FIG. 55
FIG. 56
FIG. 53
FIG. 54

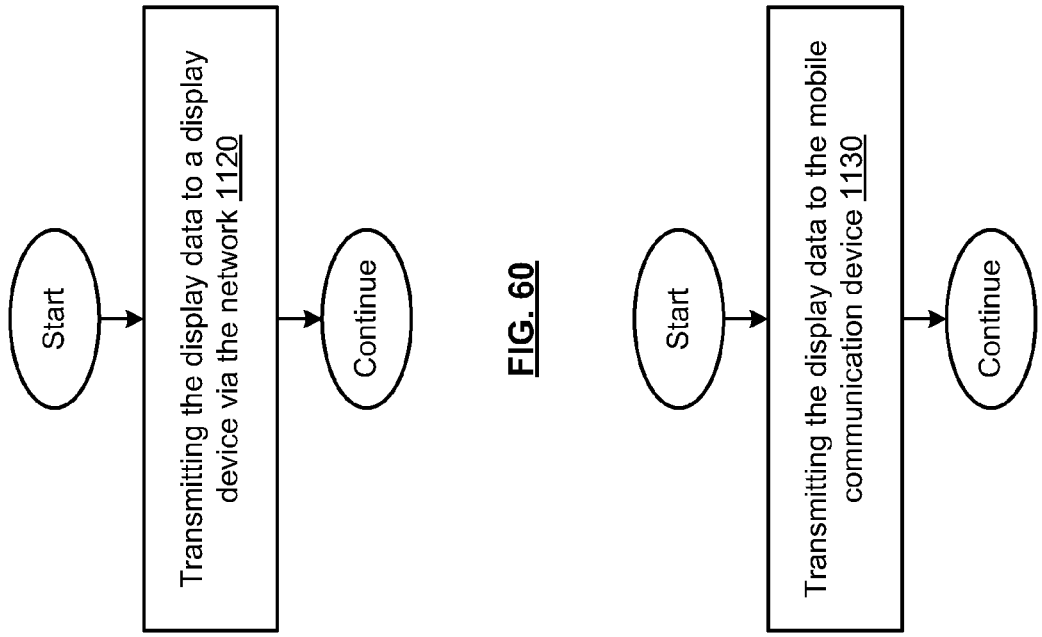
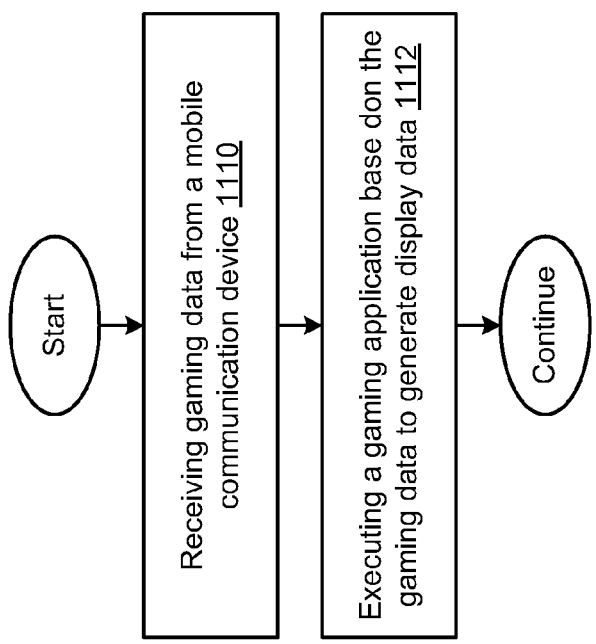

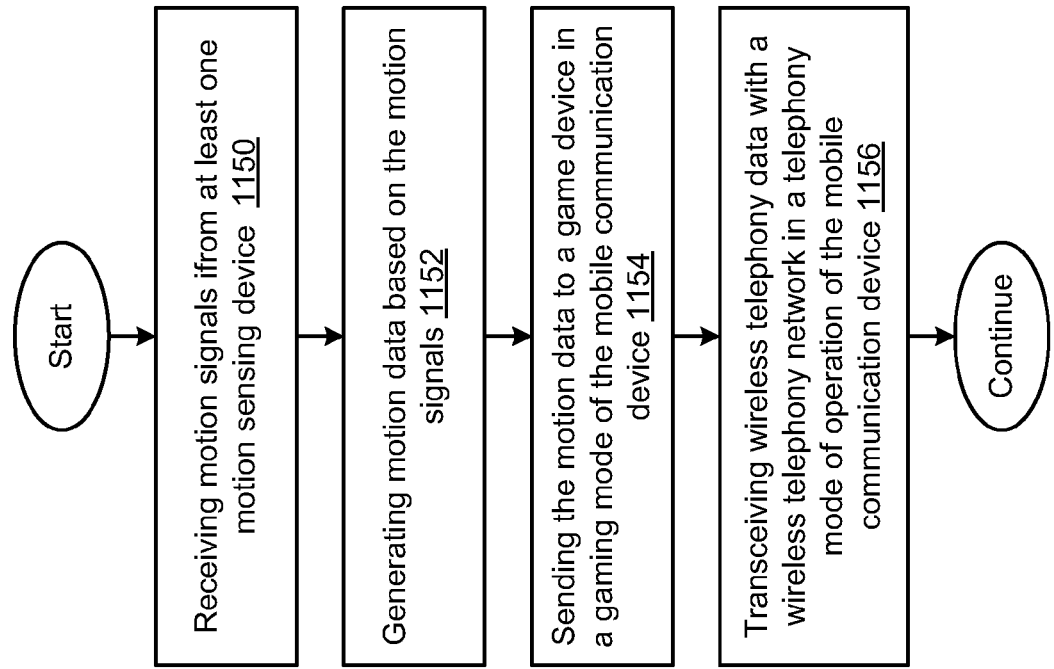
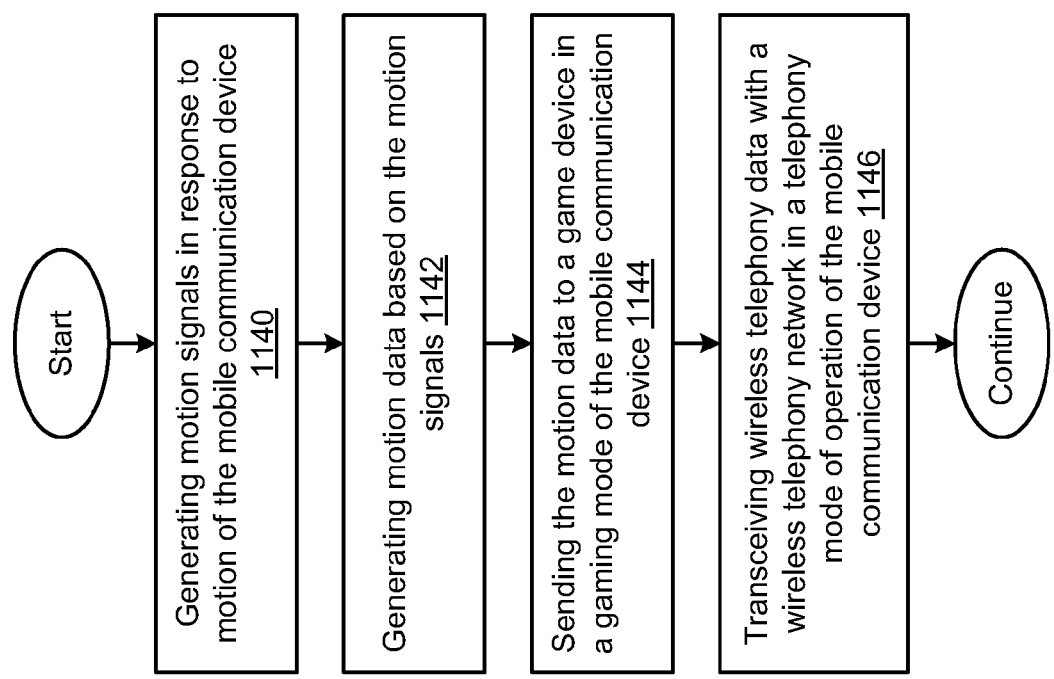

MULTI-MODE MOBILE COMMUNICATION DEVICE WITH MOTION SENSOR AND METHODS FOR USE THEREWITH

CROSS-REFERENCE TO RELATED APPLICATIONS

This invention is claiming priority under 35 USC §119(e) to a provisionally filed patent application having the title VIDEO GAMING SYSTEM WITH POSITION AND MOTION TRACKING, a filing date of Jun. 22, 2007, and an application No. 60/936,724.

The present application is related to the following copending applications:

U.S. patent application Ser. No. 12/131,331, GAME CONSOLE AND GAMING OBJECT WITH MOTION PREDICTION MODELING AND METHODS FOR USE THEREWITH, filed on Jun. 2, 2008;

U.S. patent application Ser. No. 12/131,480, GAMING OBJECT AND GAMING CONSOLE THAT COMMUNICATE USER DATA VIA BACKSCATTERING AND METHODS FOR USE THEREWITH, filed on Jun. 2, 2008;

U.S. patent application Ser. No. 12/131,550, MOBILE COMMUNICATION DEVICE WITH GAMING MODE AND METHODS FOR USE THEREWITH, filed on Jun. 2, 2008.

BACKGROUND OF THE INVENTION

TECHNICAL FIELD OF THE INVENTION

Description of Related Art

This invention relates generally to wireless systems and more particularly to wireless devices that communicate with a remote game device.

Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used video games to detect the direction in which a game controller is pointed. As an example, an IR sensor is placed near the game display, where the IR sensor to detect the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
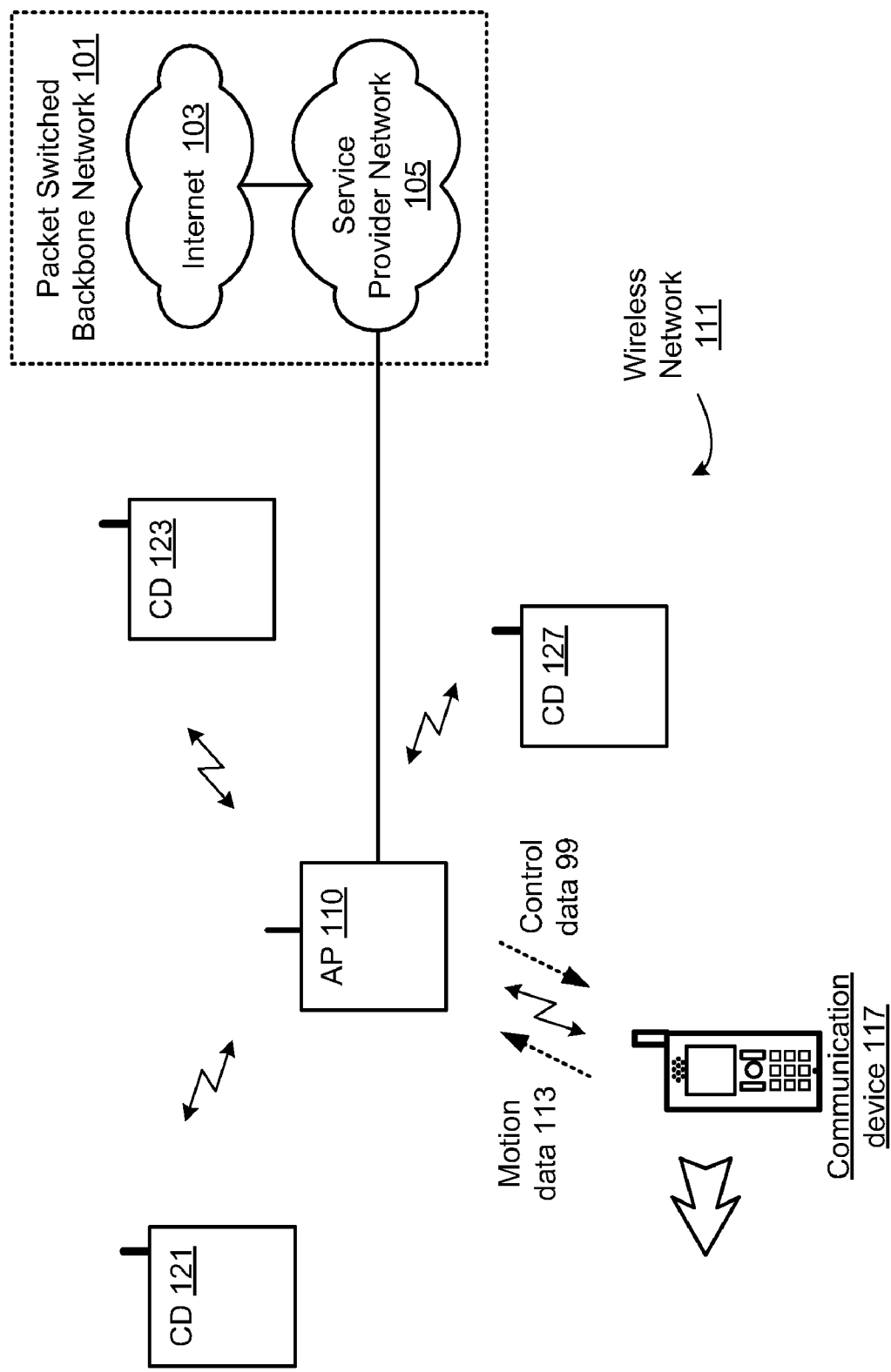
Figure 4:
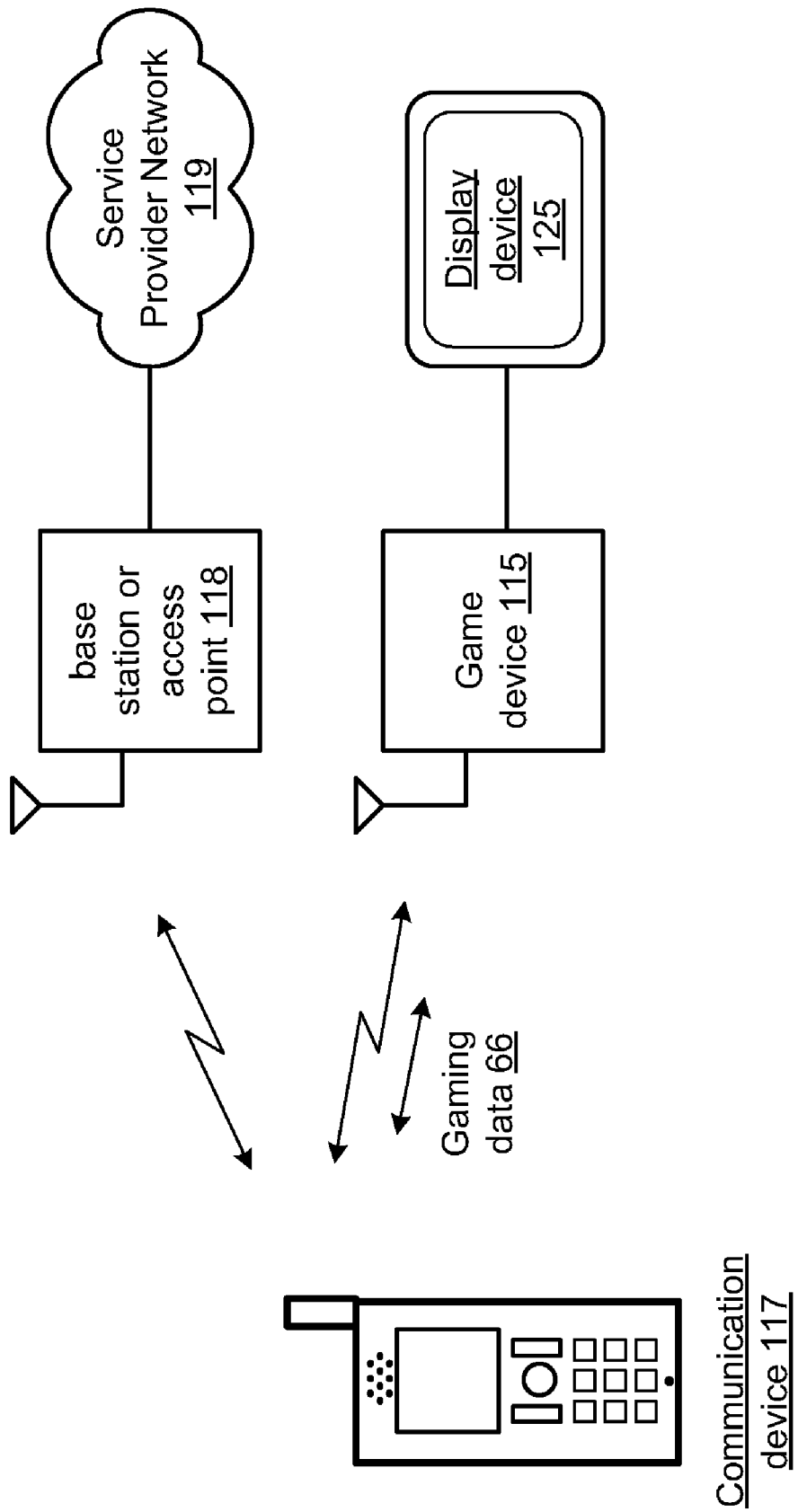
Figure 5:
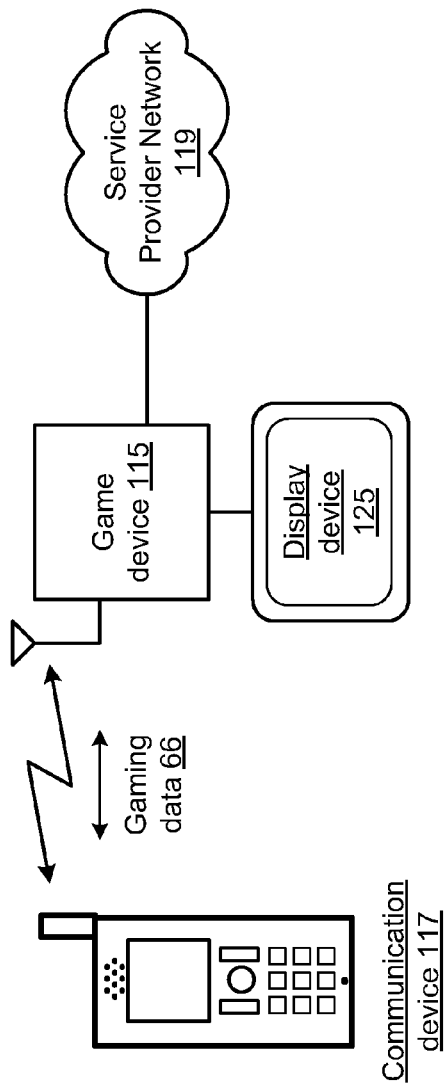
Figure 6:
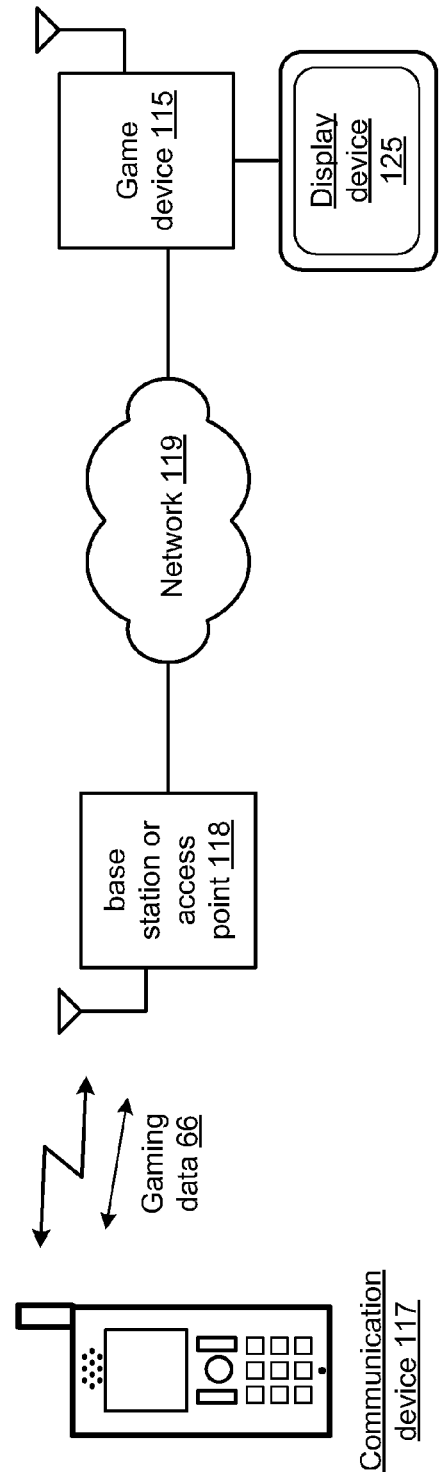
Figure 7:
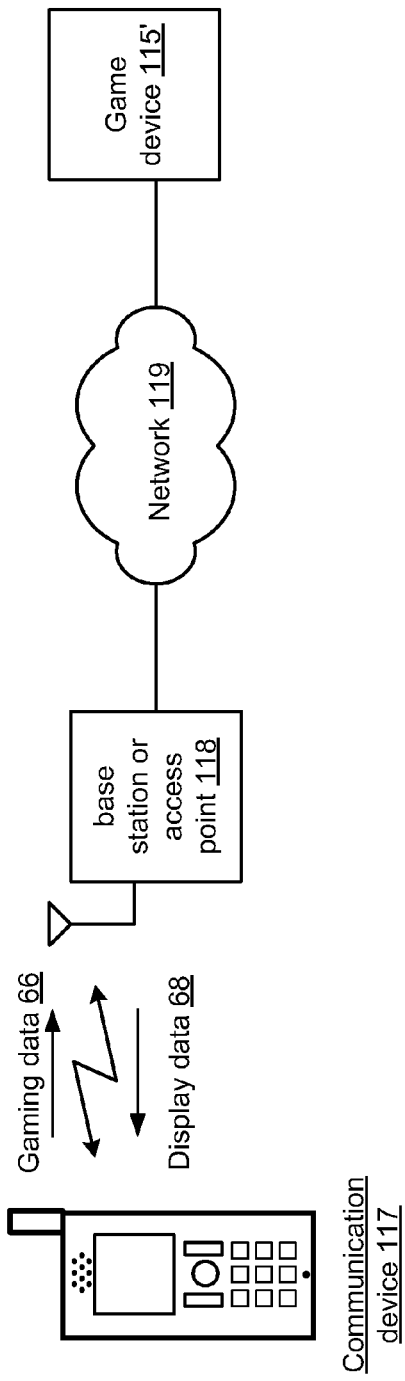
Figure 8:
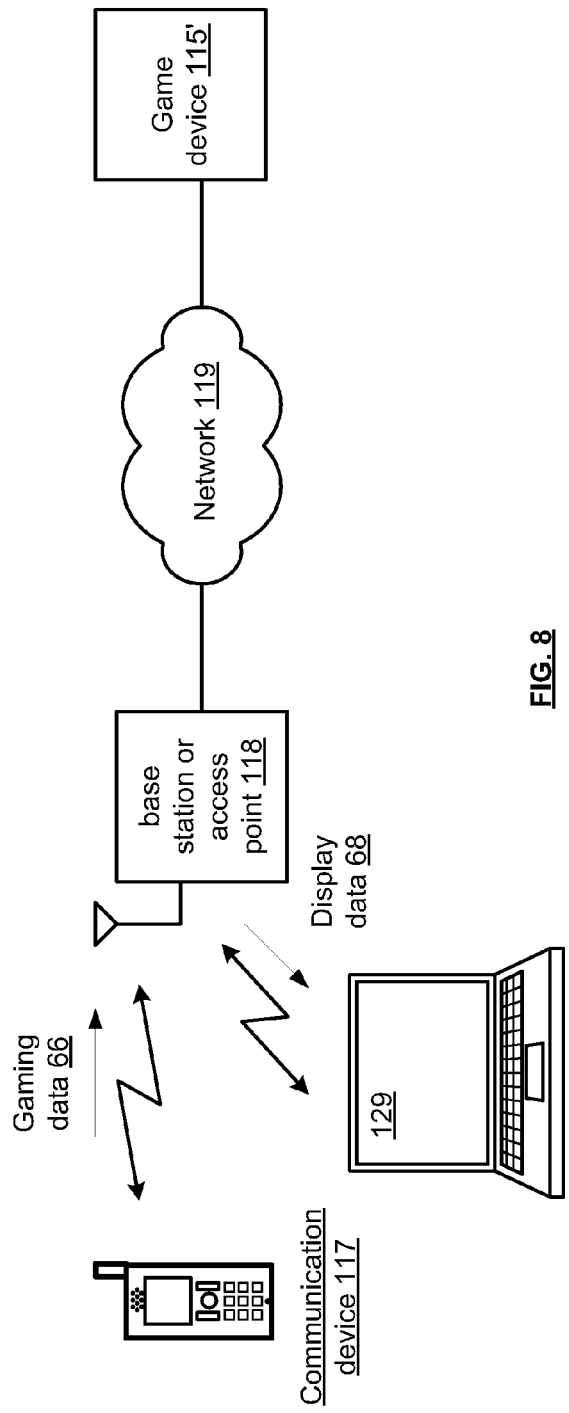
Figure 9:
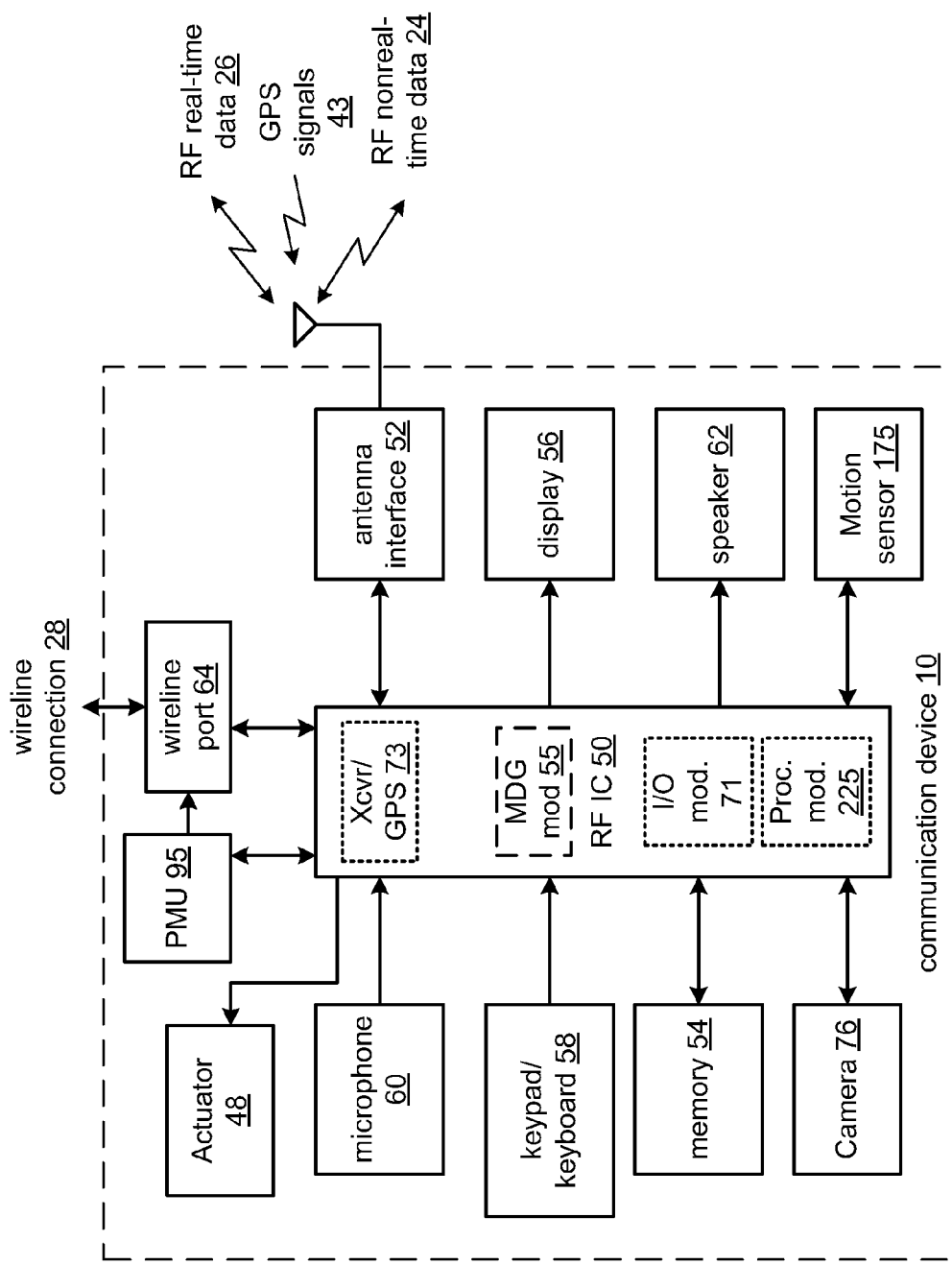
Figure 10:
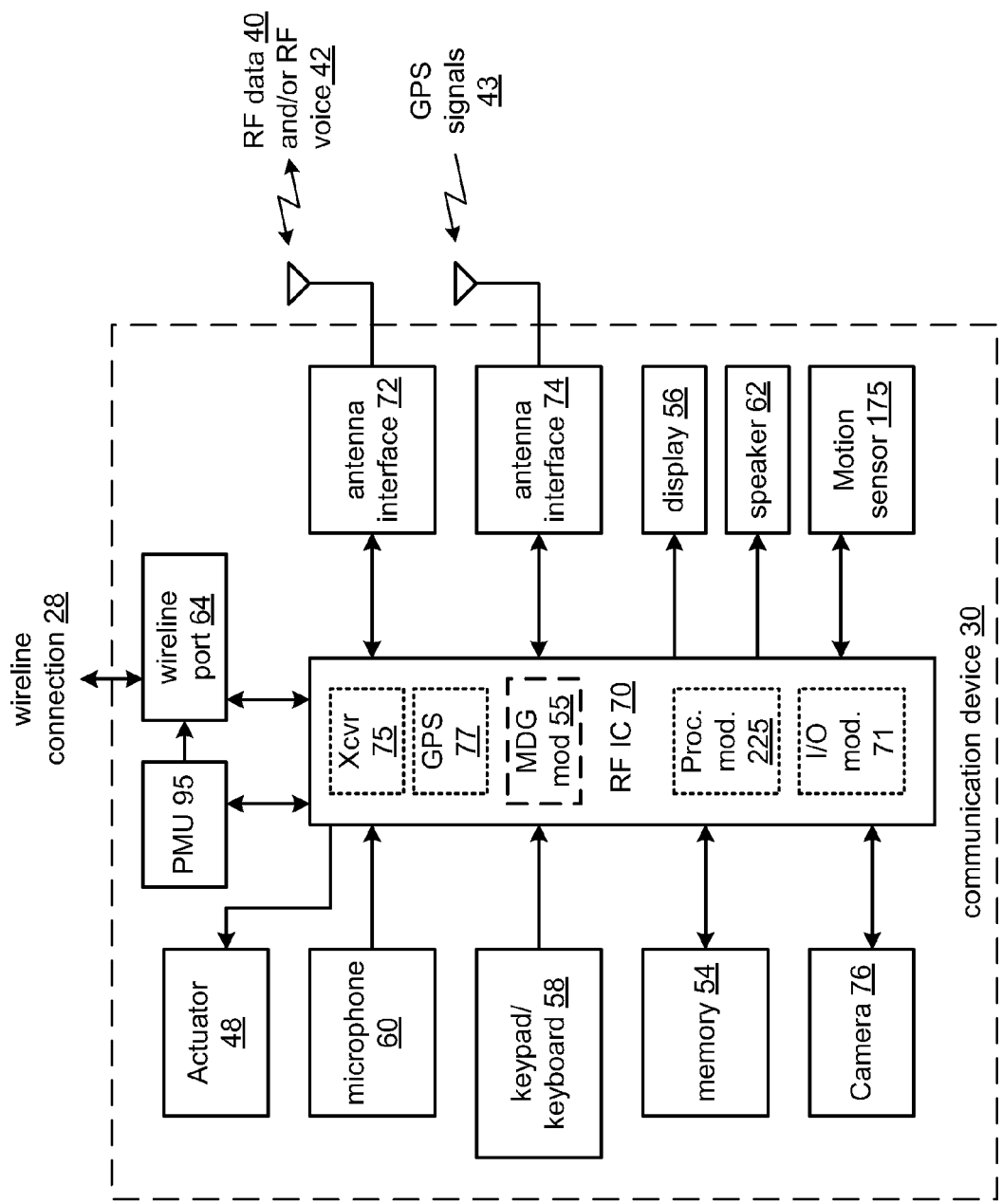
Figure 11:
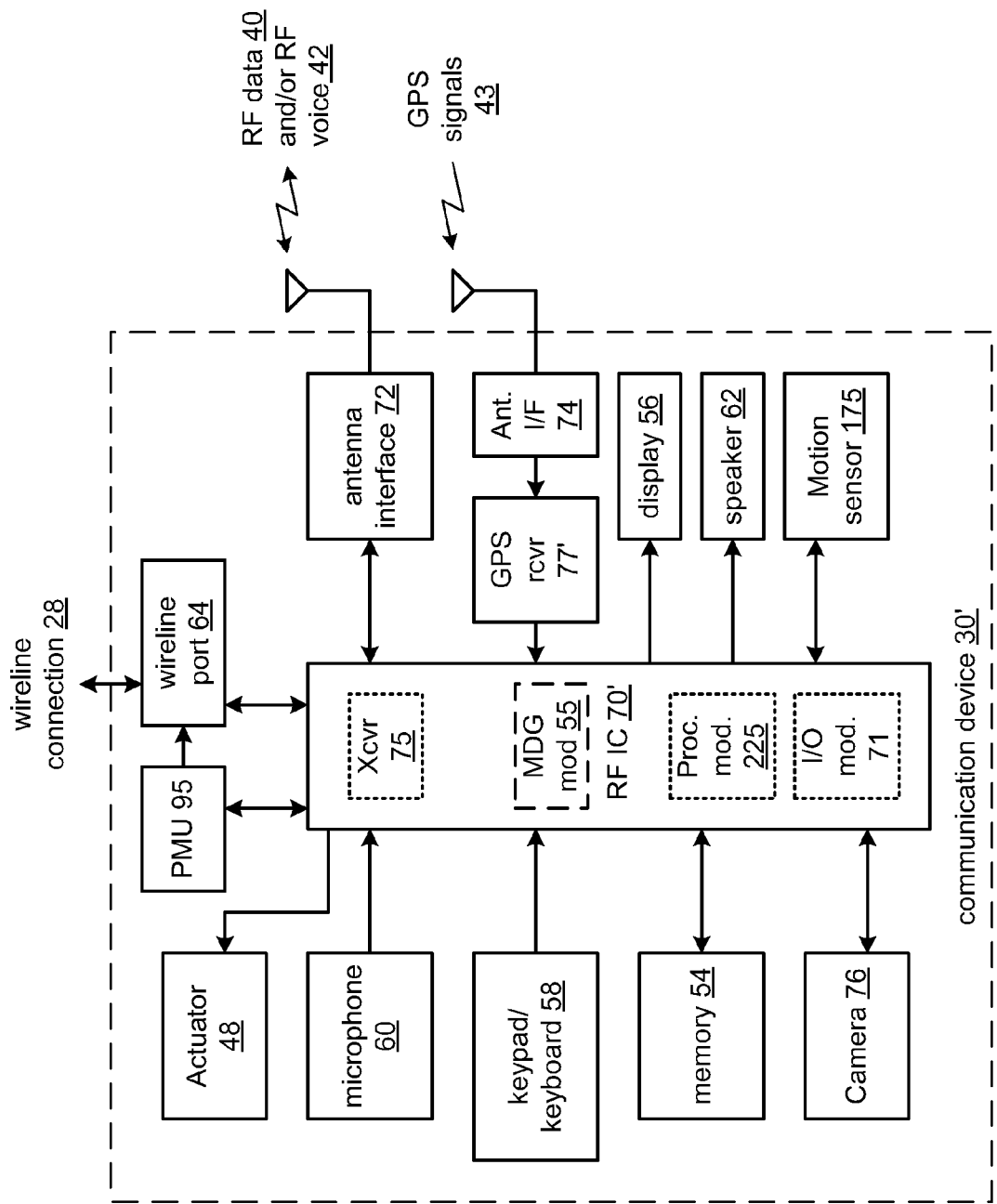
Figure 12:
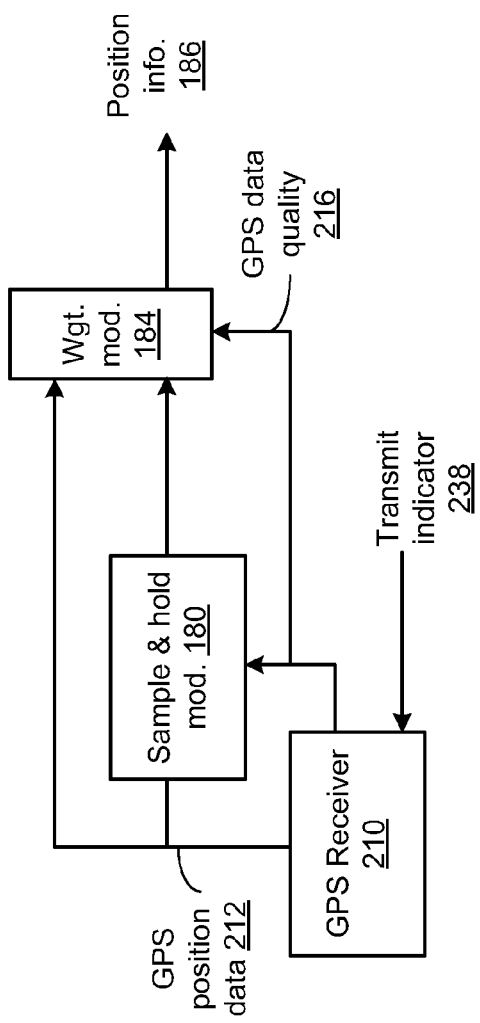
Figure 13:
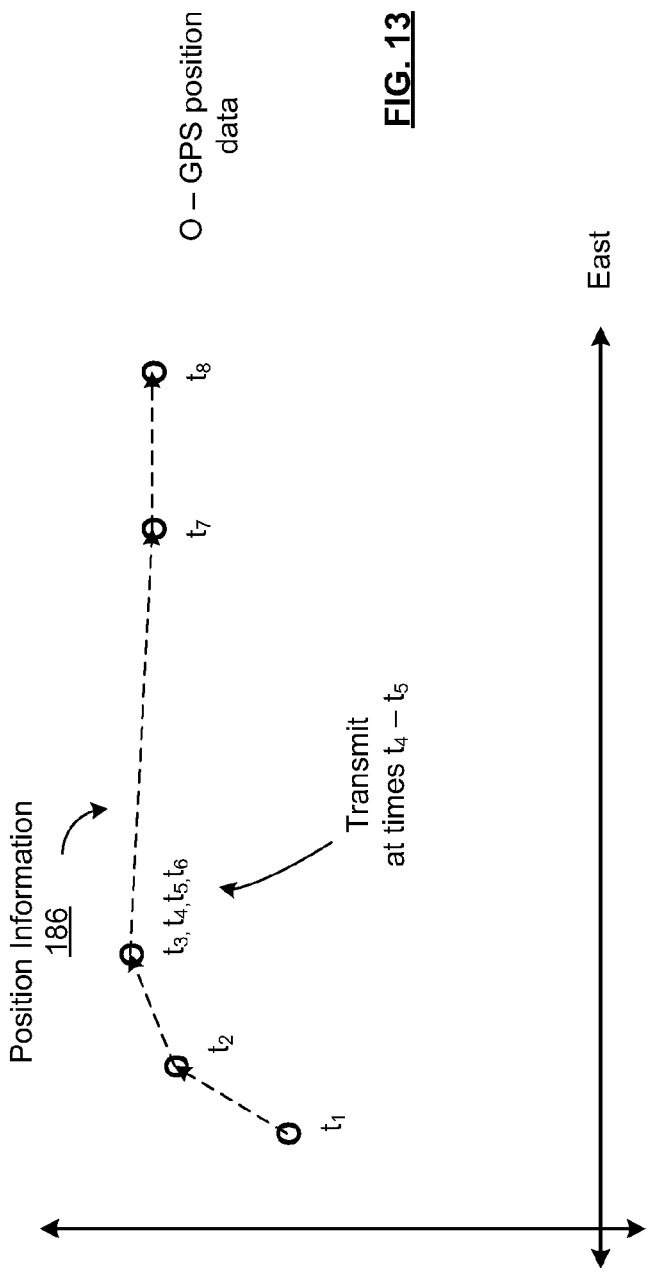
Figure 14:
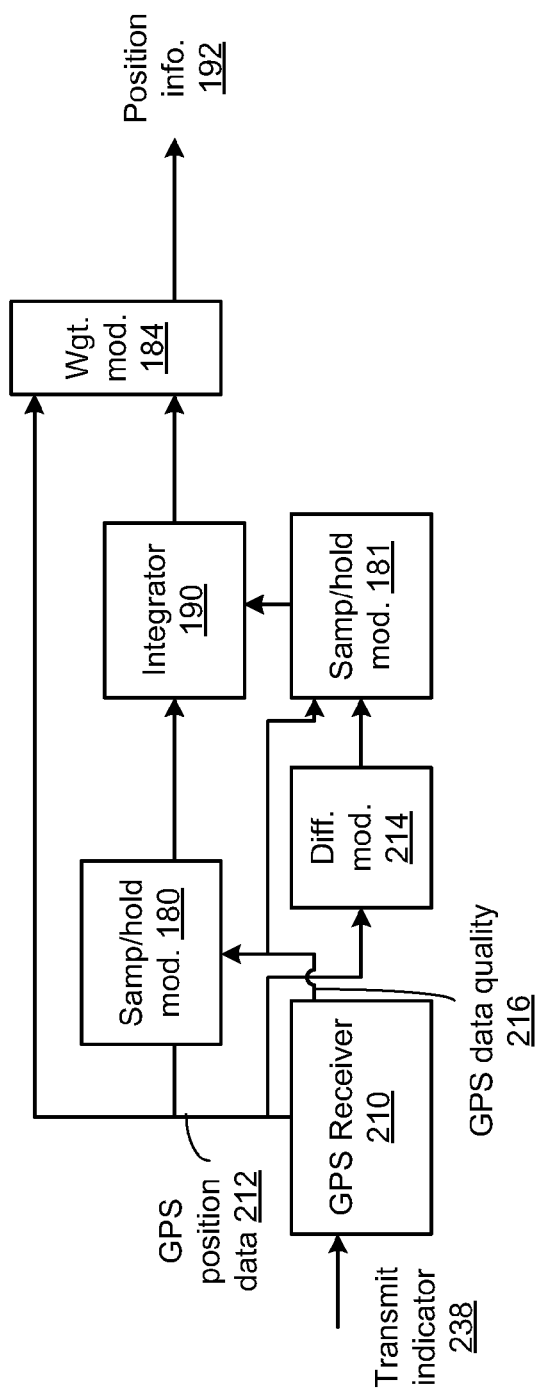
Figure 15:
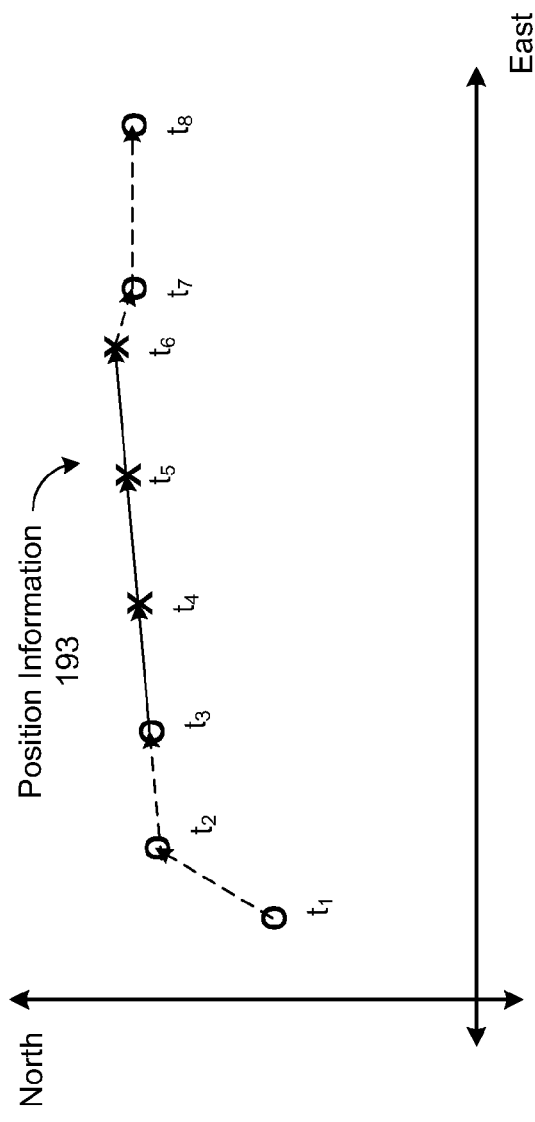
Figure 16:
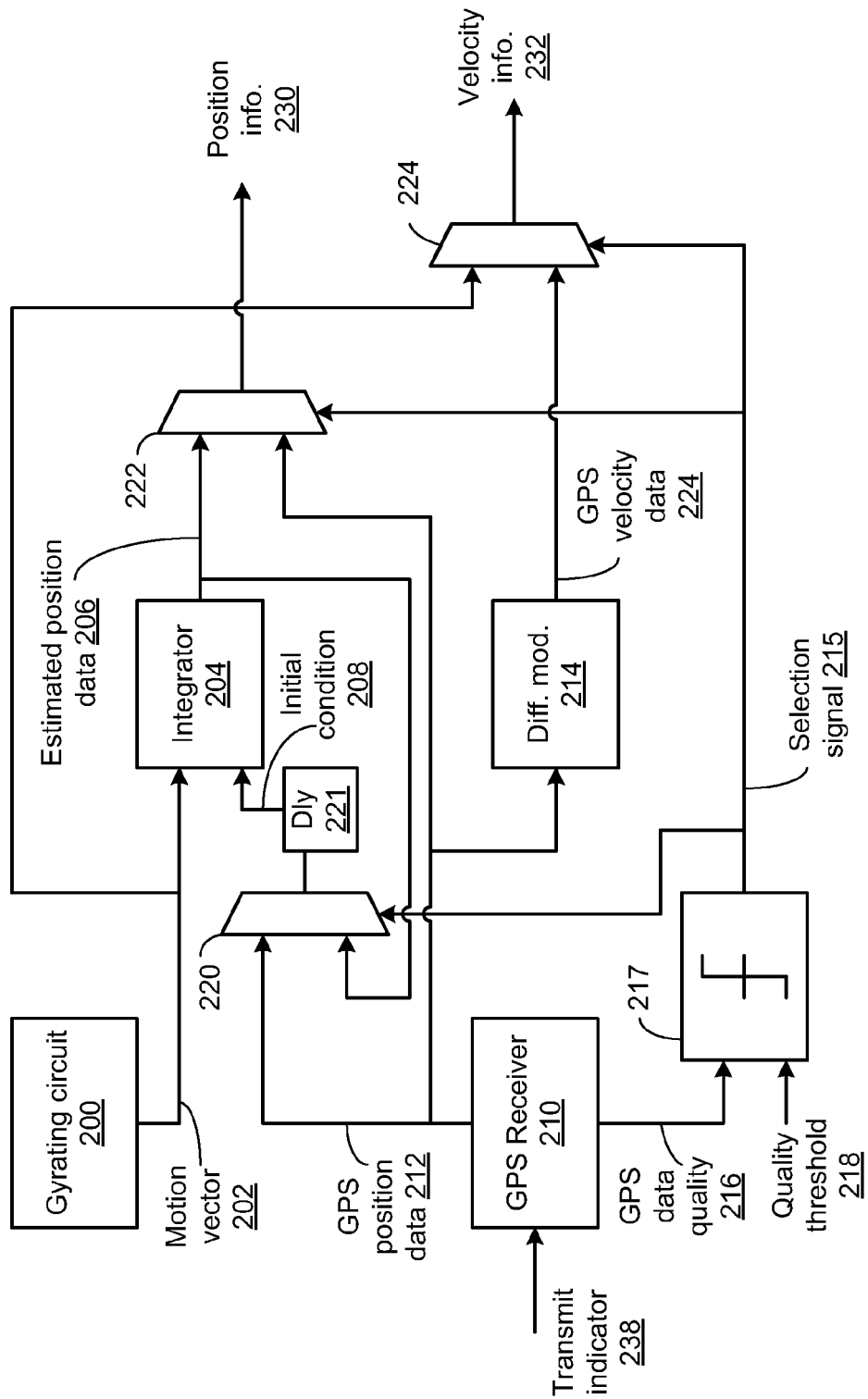
Figure 17:
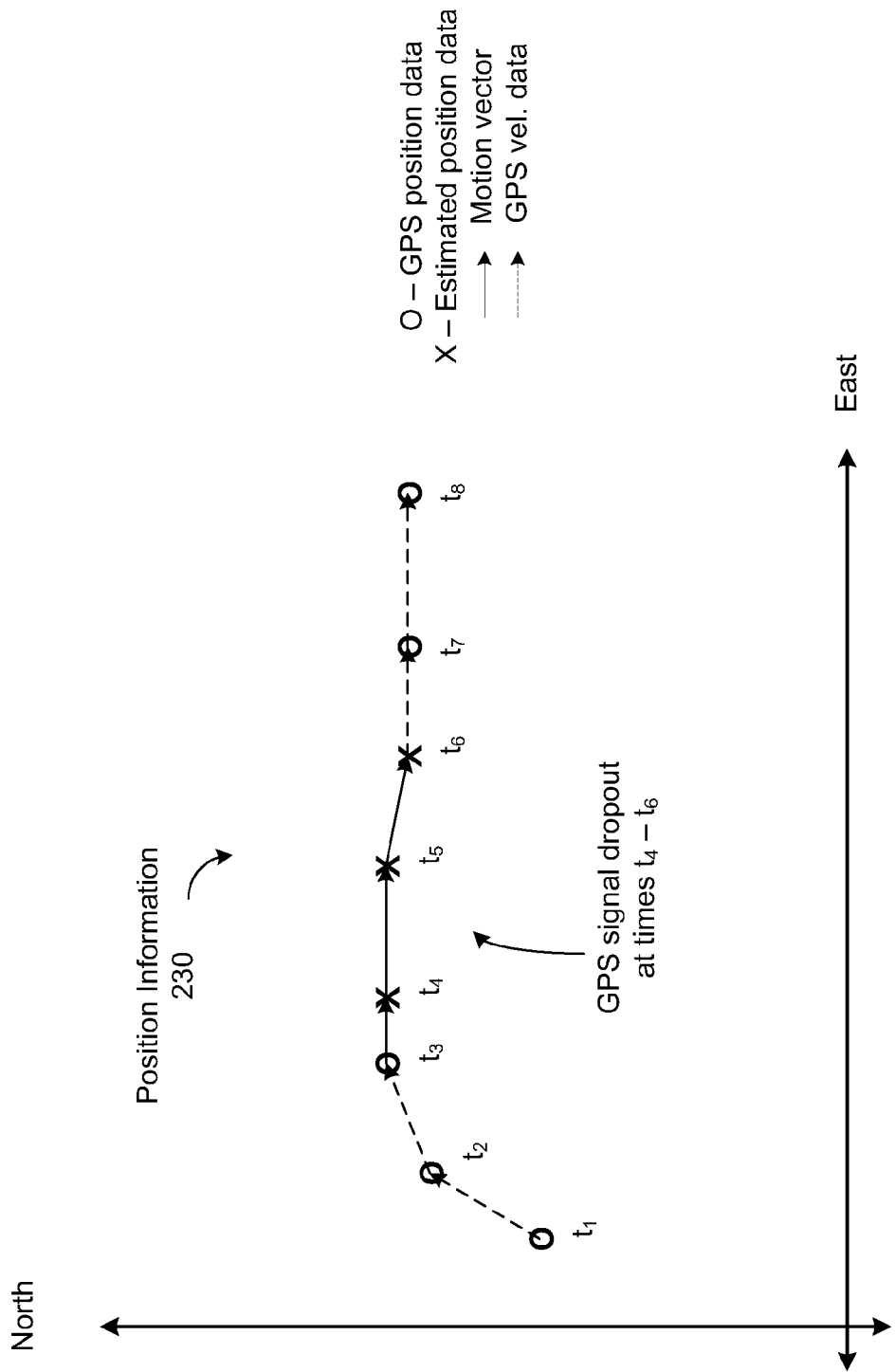
Figure 18:
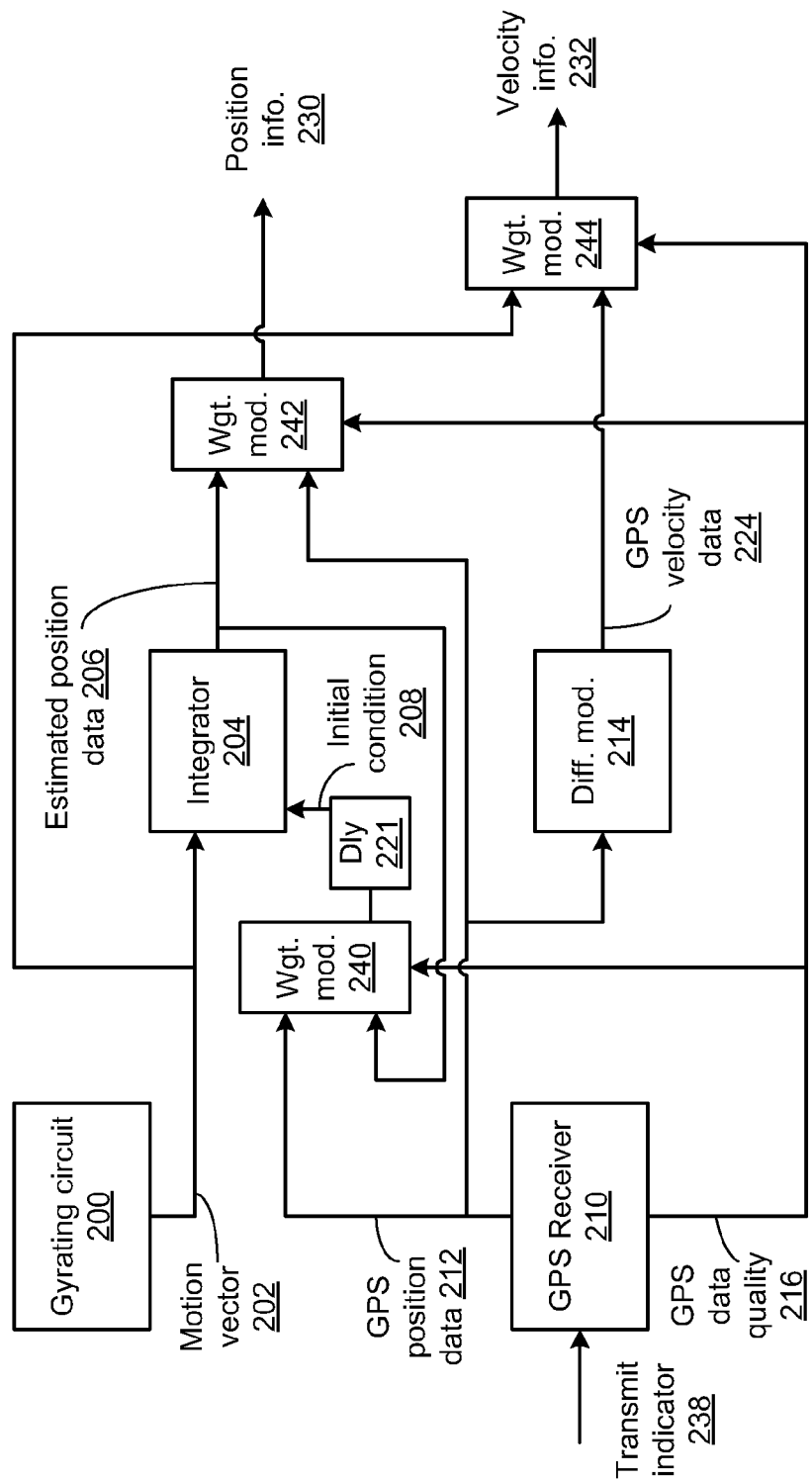
Figure 19:
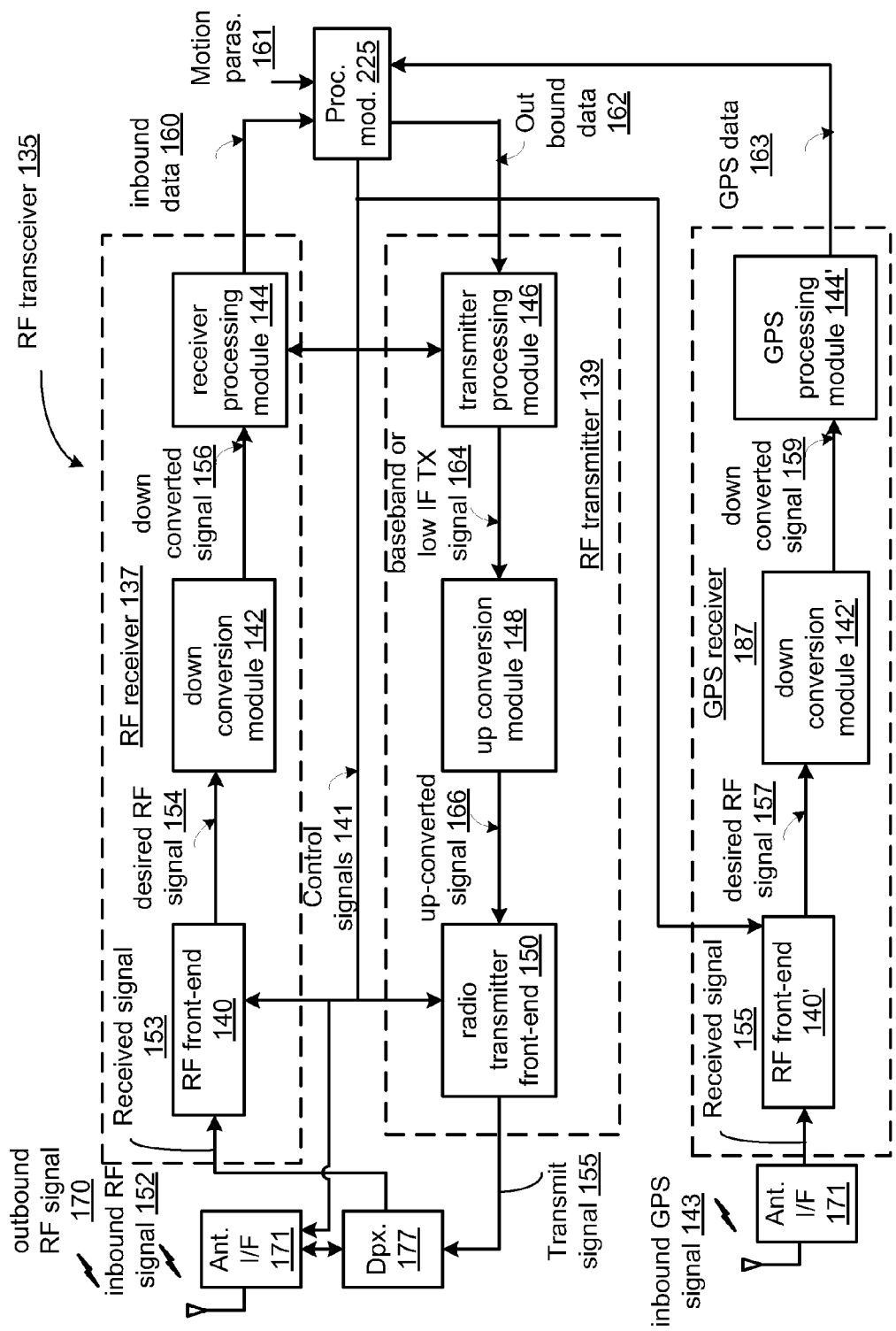
Figure 20:
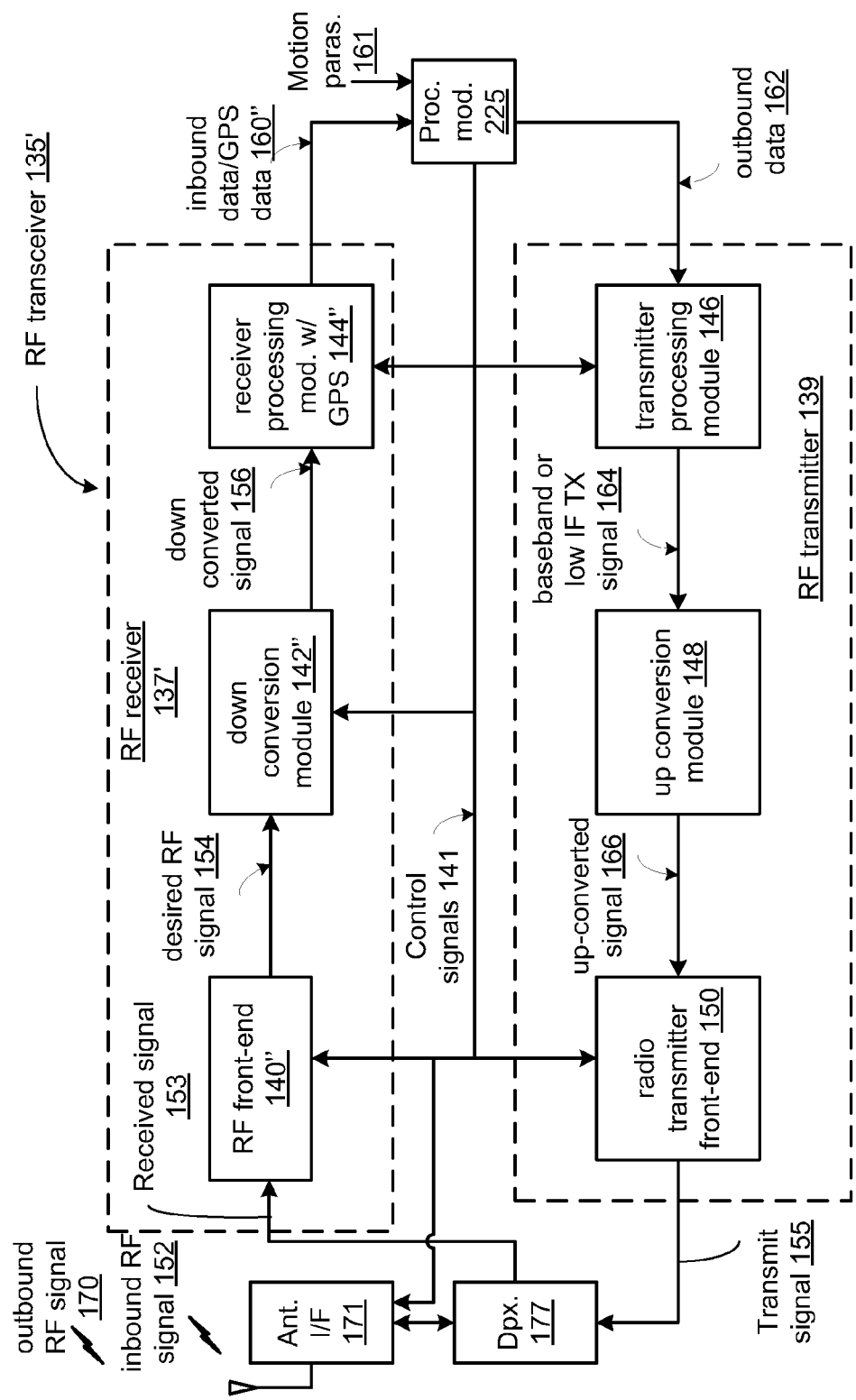
Figure 21:
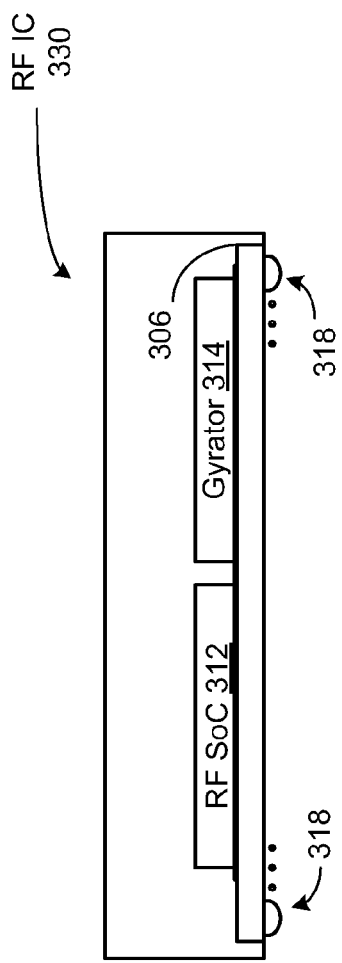
Figure 22:
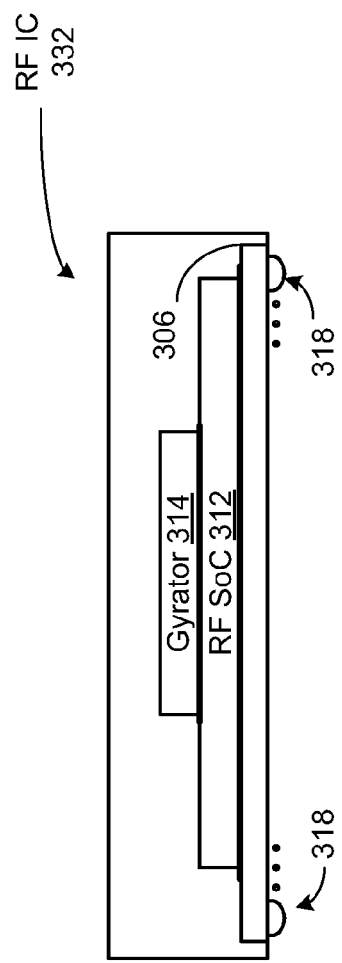
Figure 23:
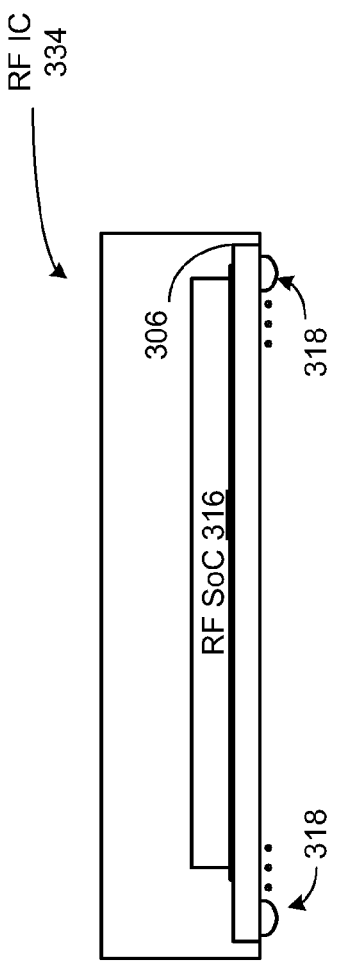
Figure 24:
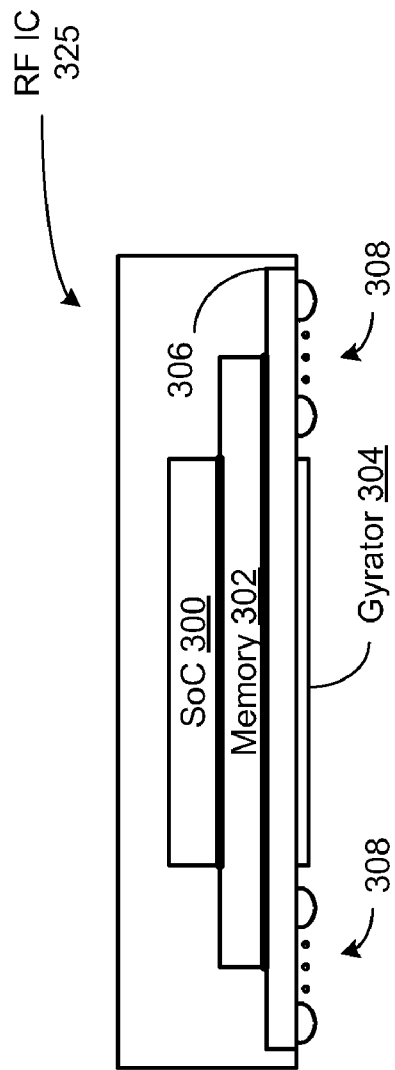
Figure 25:
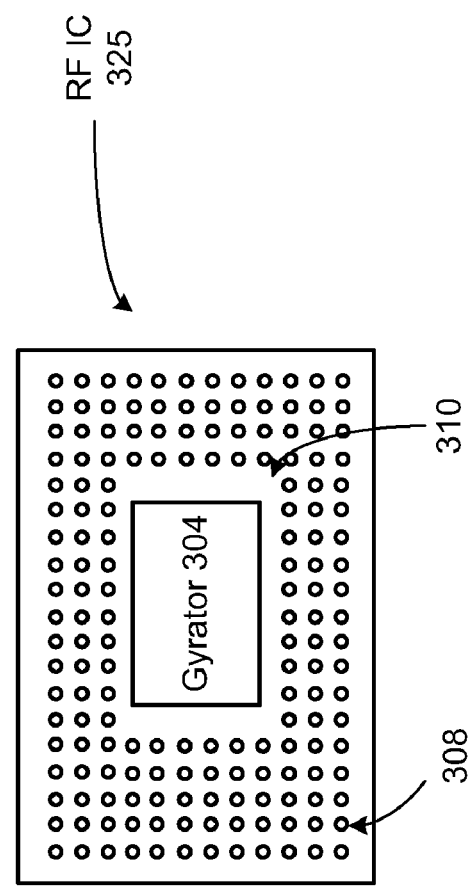
Figure 26:
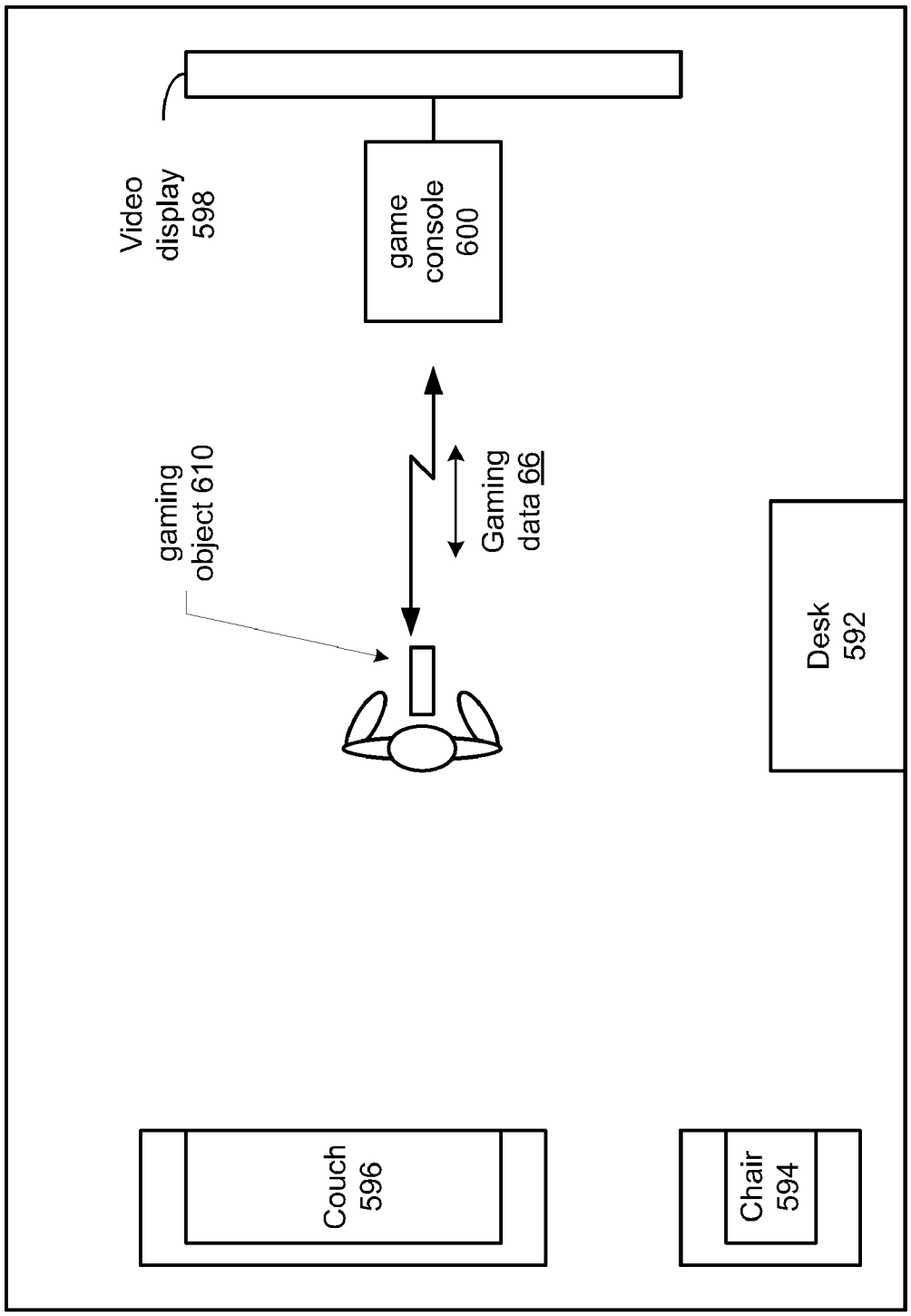
Figure 27:
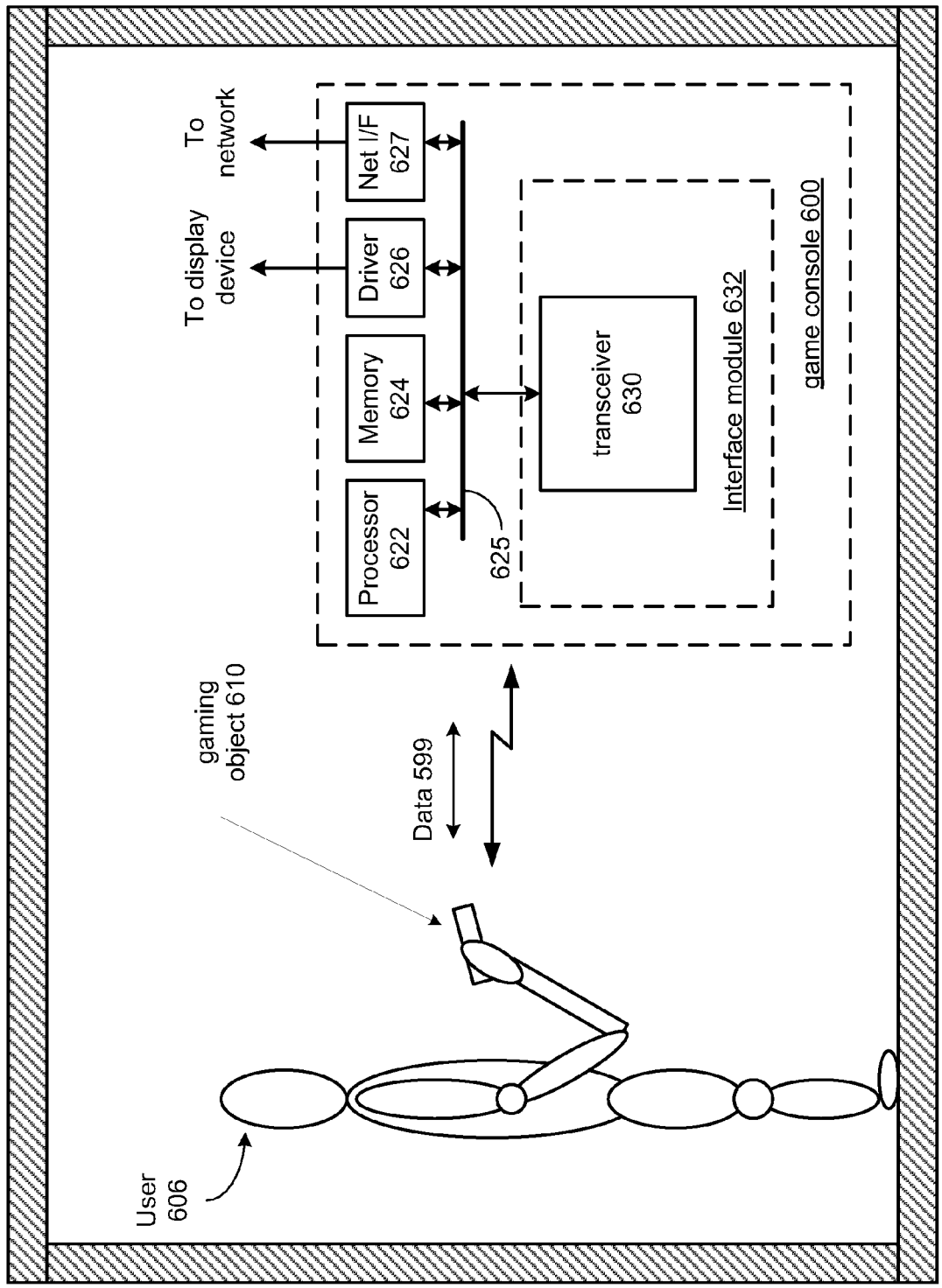
Figure 28:
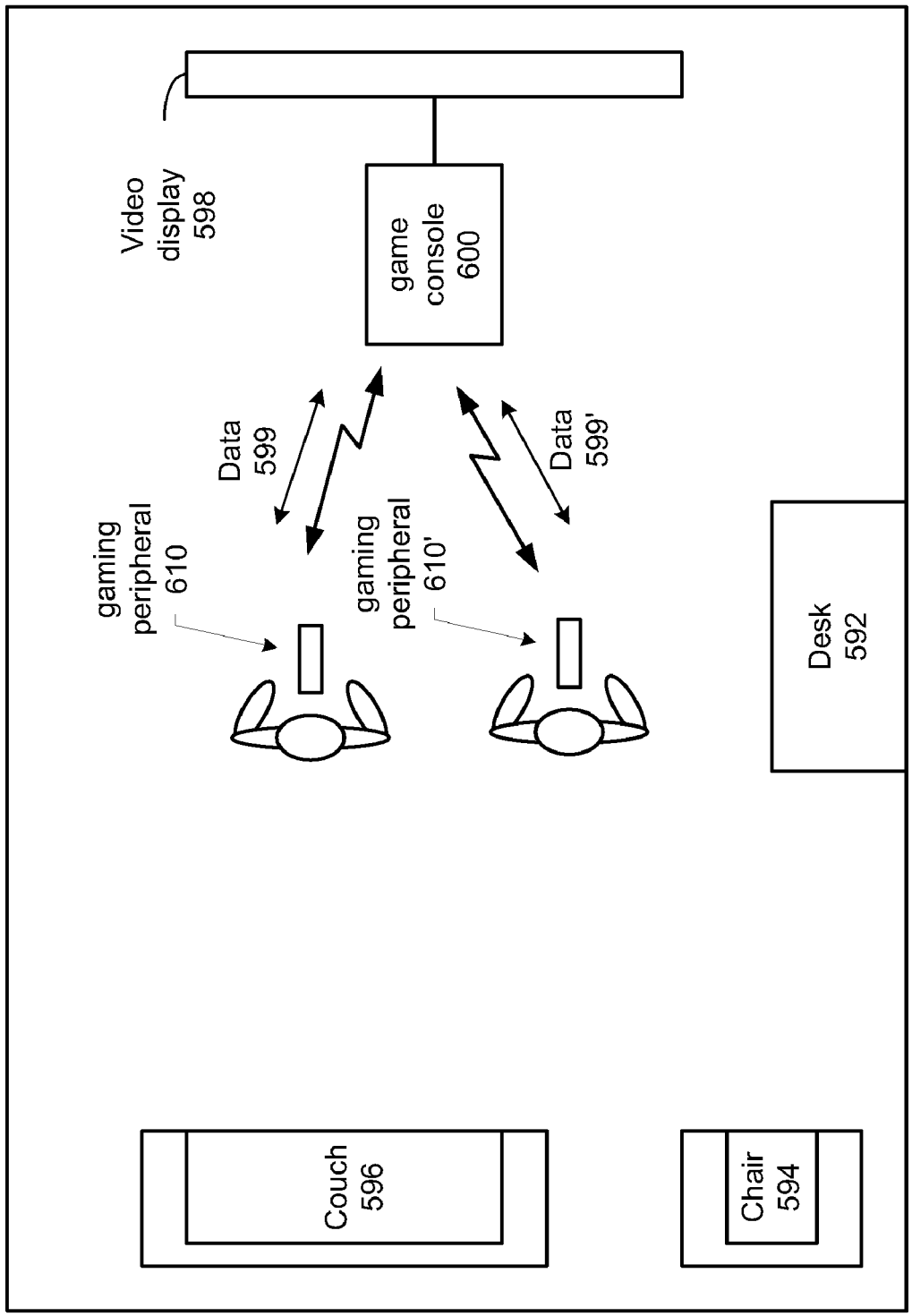
Figure 29:
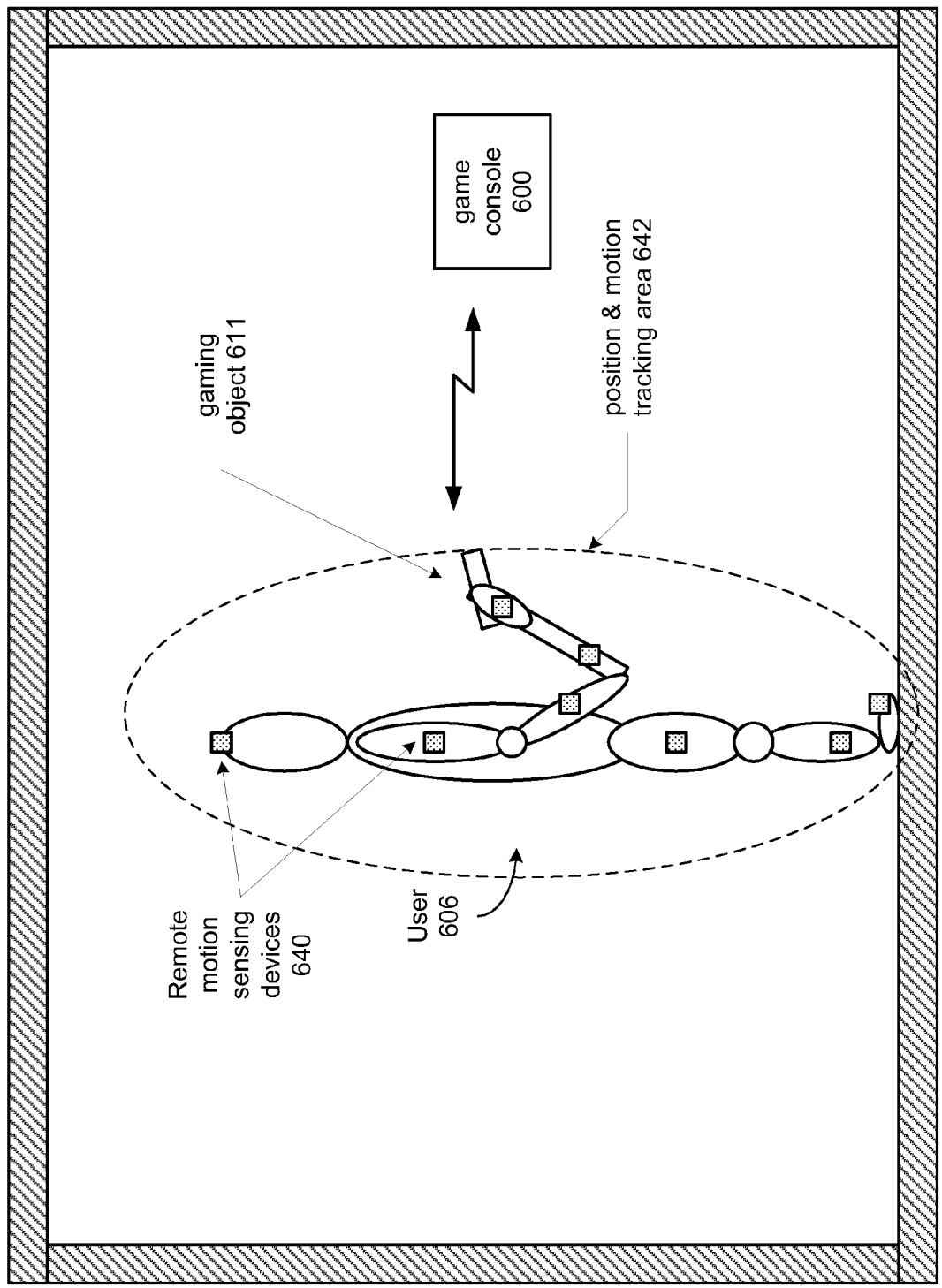
Figure 33:
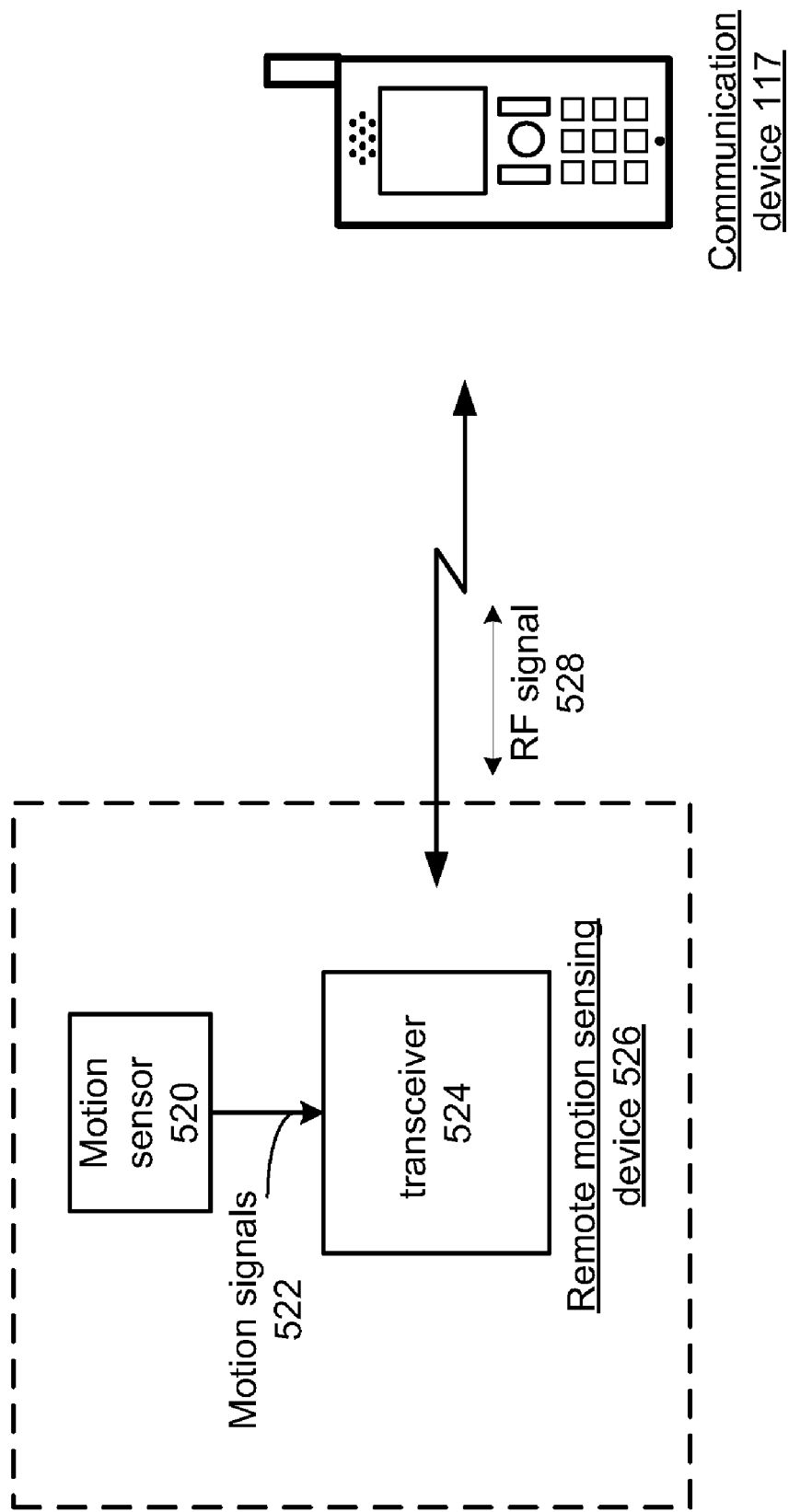
Figure 34:
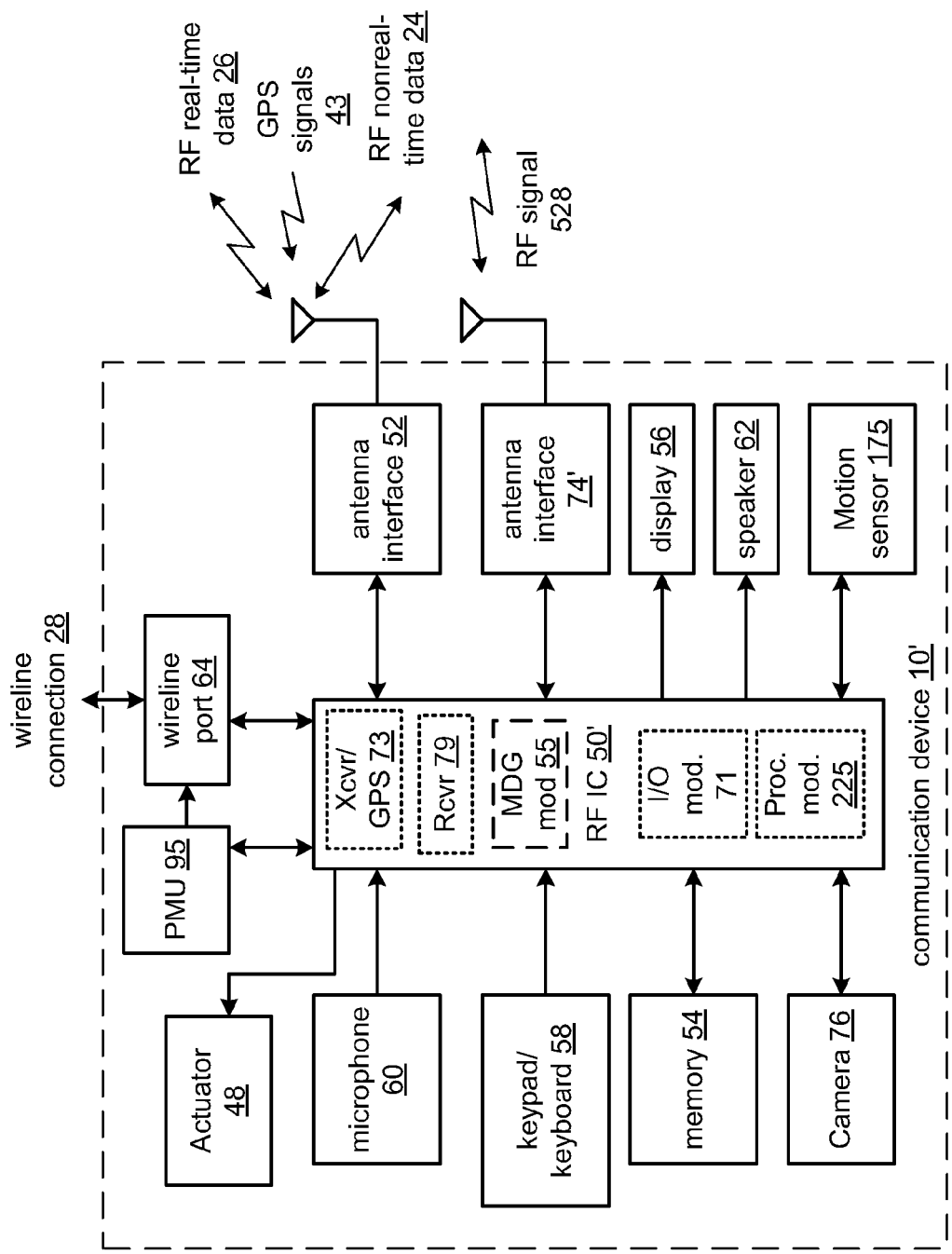
Figure 35:
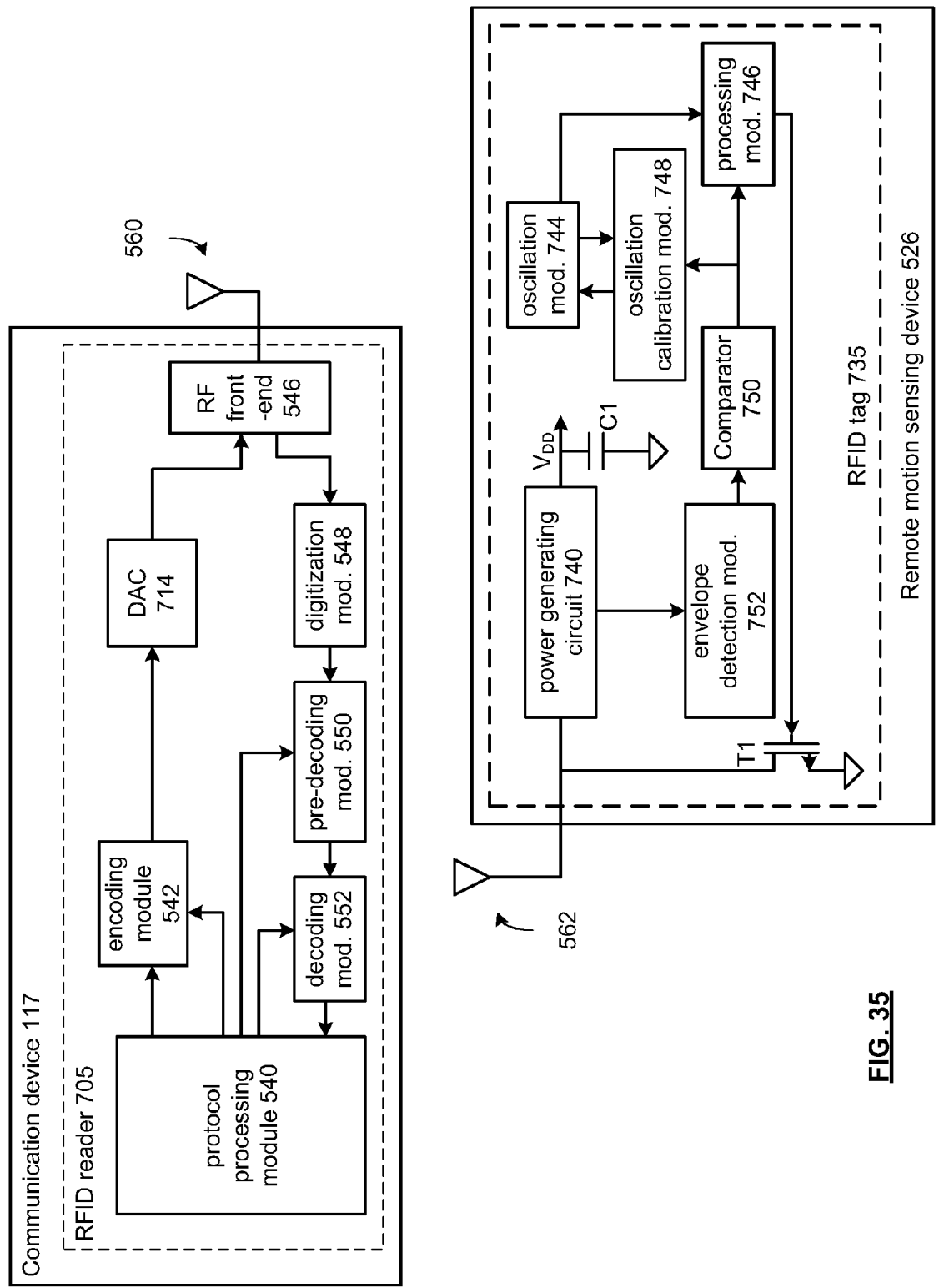
Figure 38:
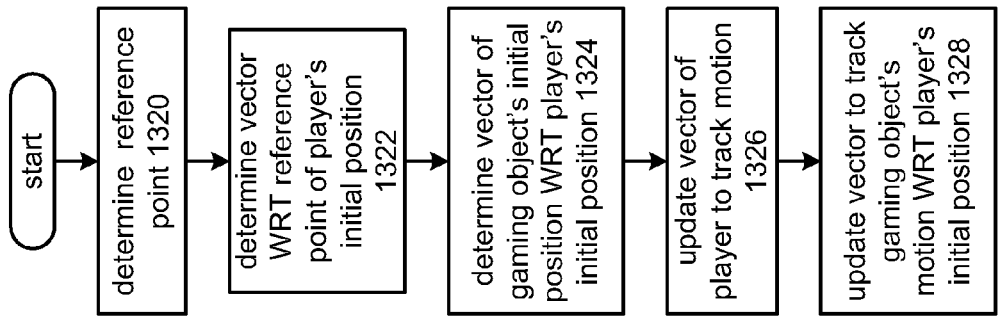
Figure 37:
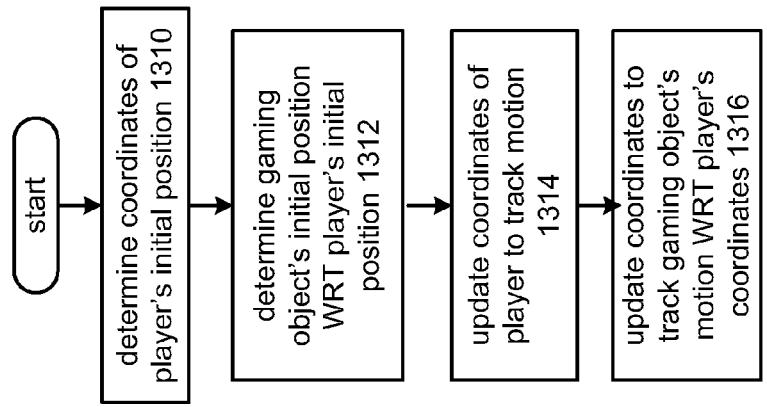
Figure 36:
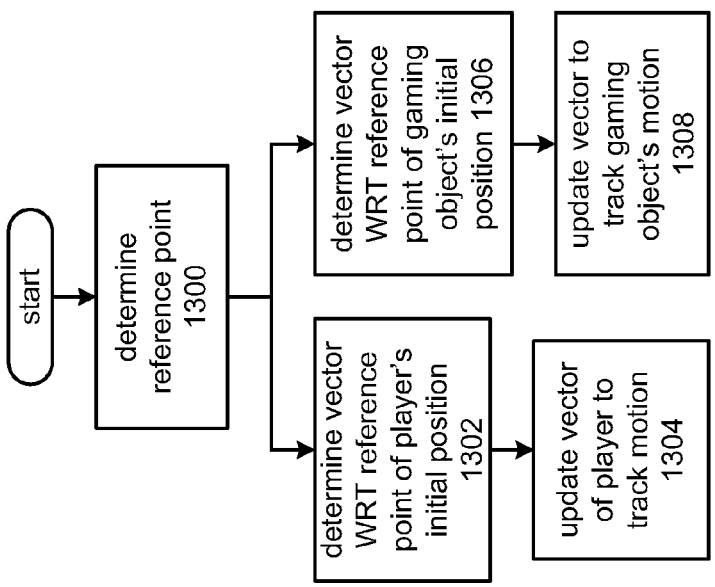
Figure 39:
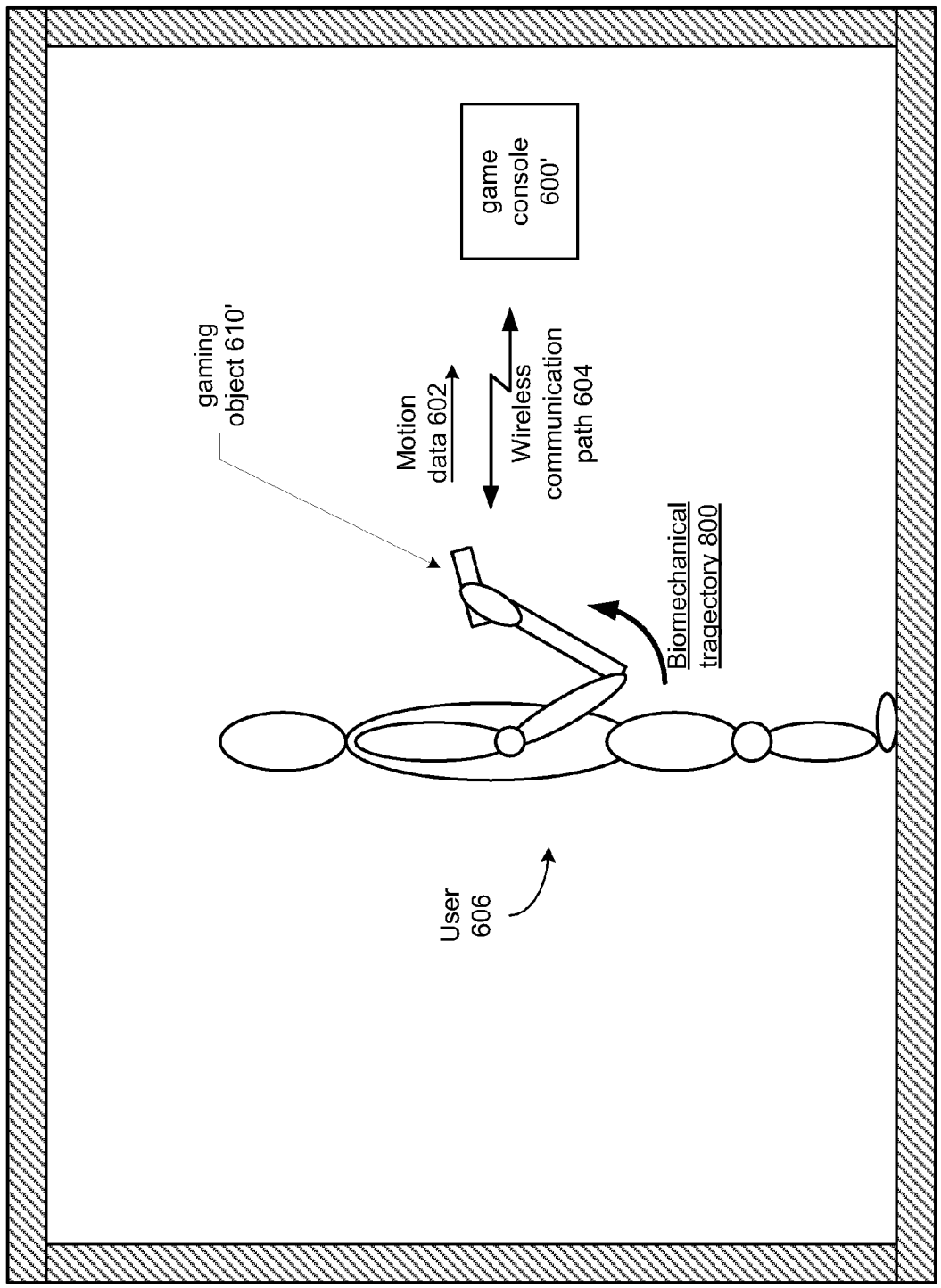
Figure 40:
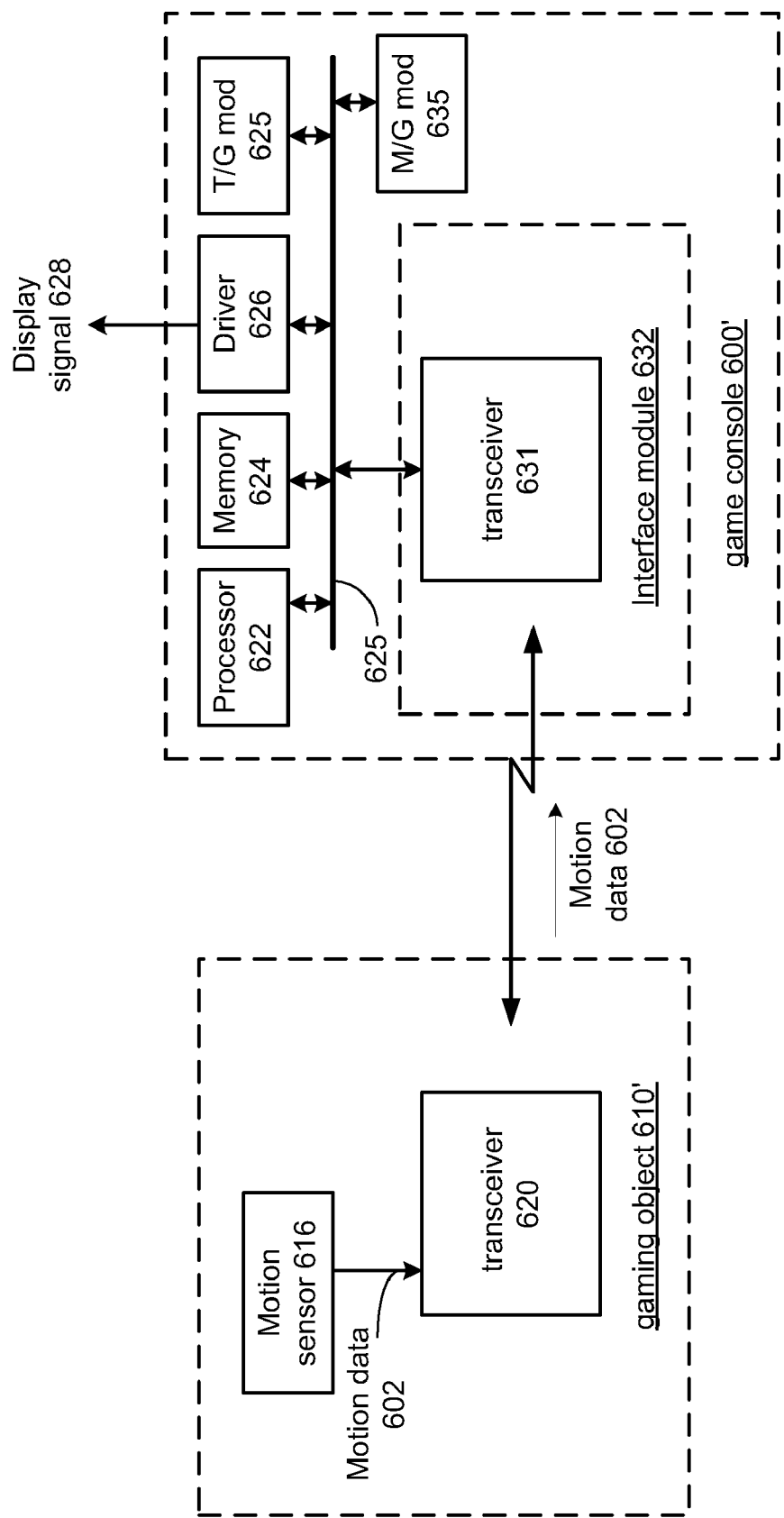
Figure 41:
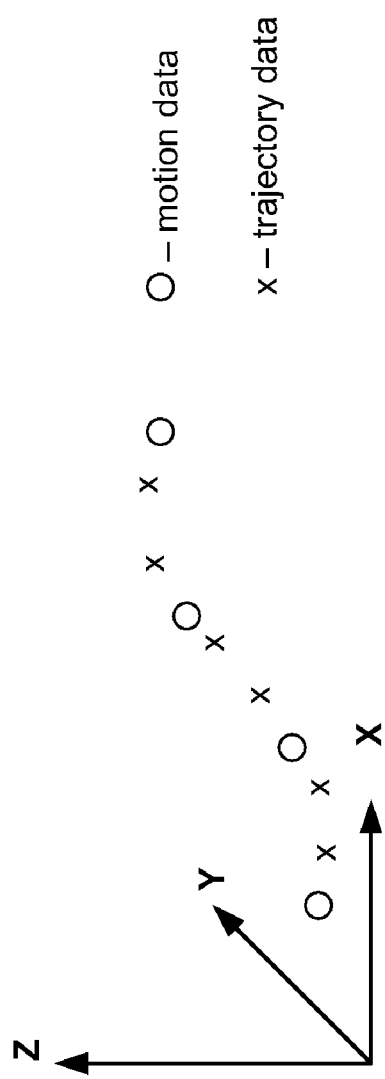
Figure 42:
Figure 43:
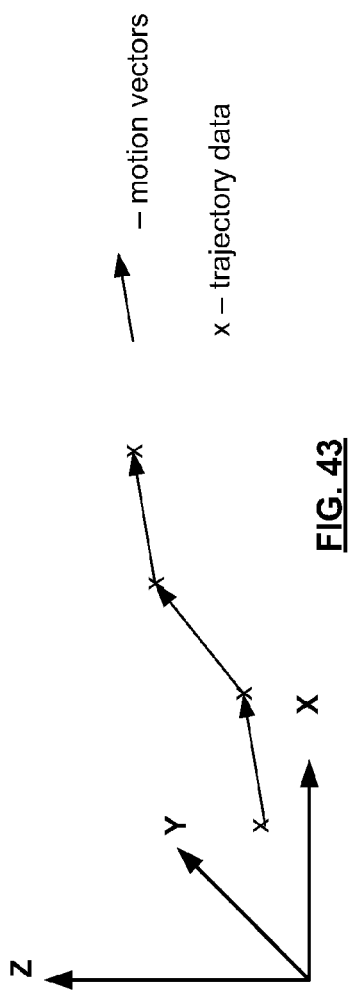
Figure 44:
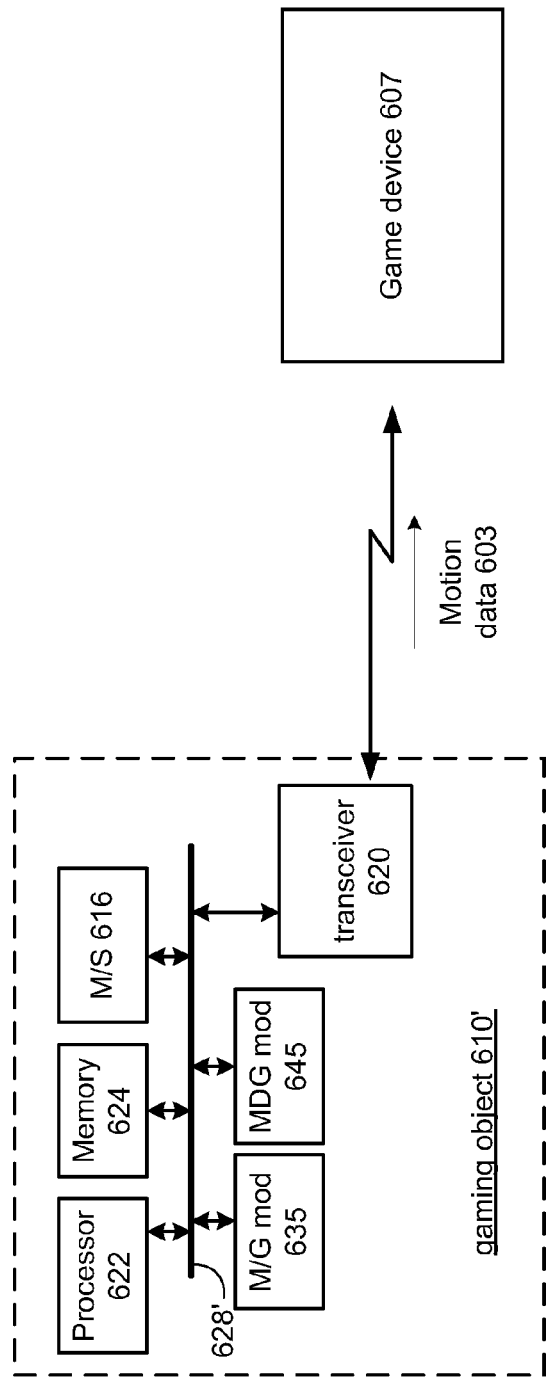
Figure 45:
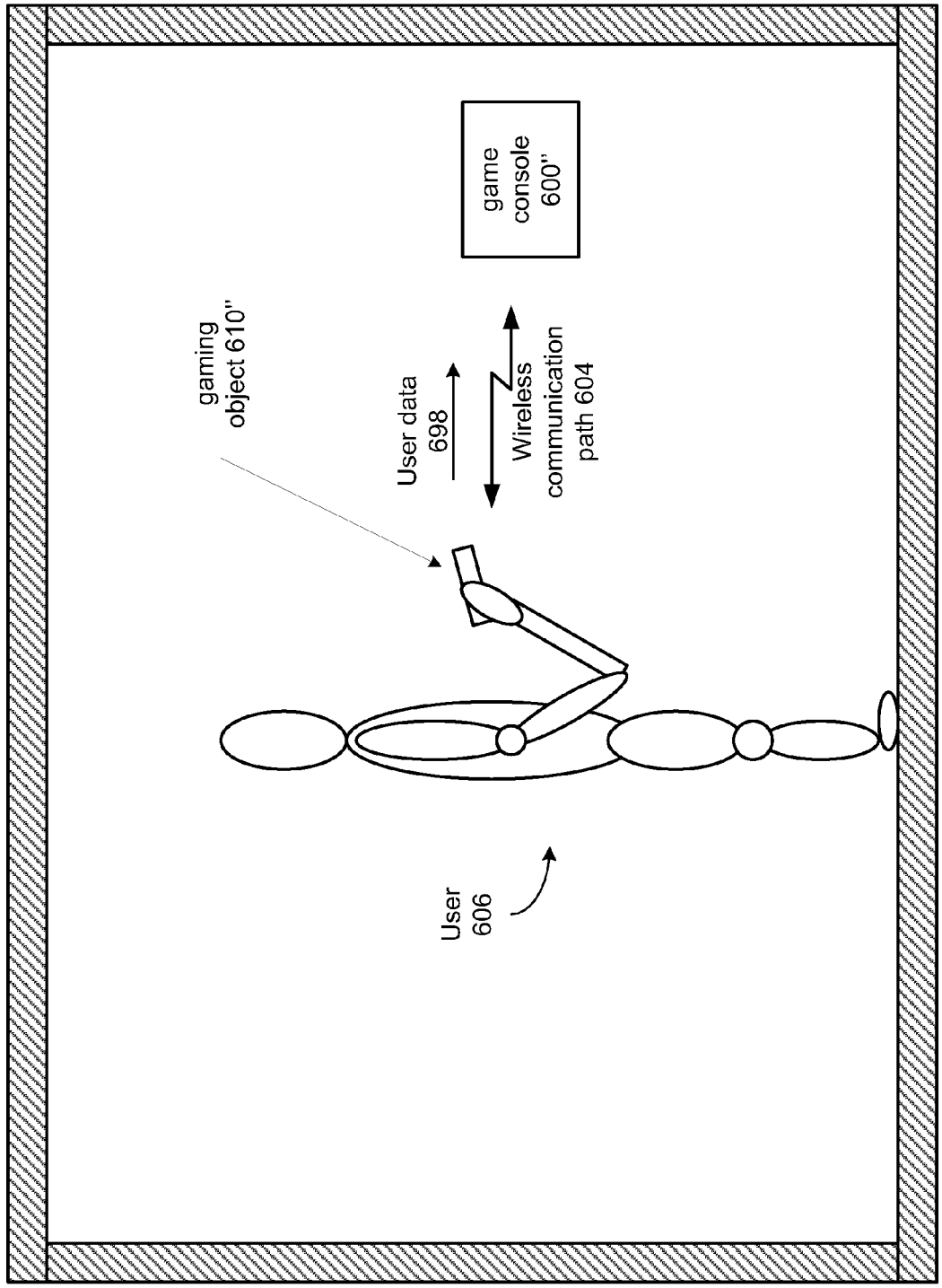
Figure 46:
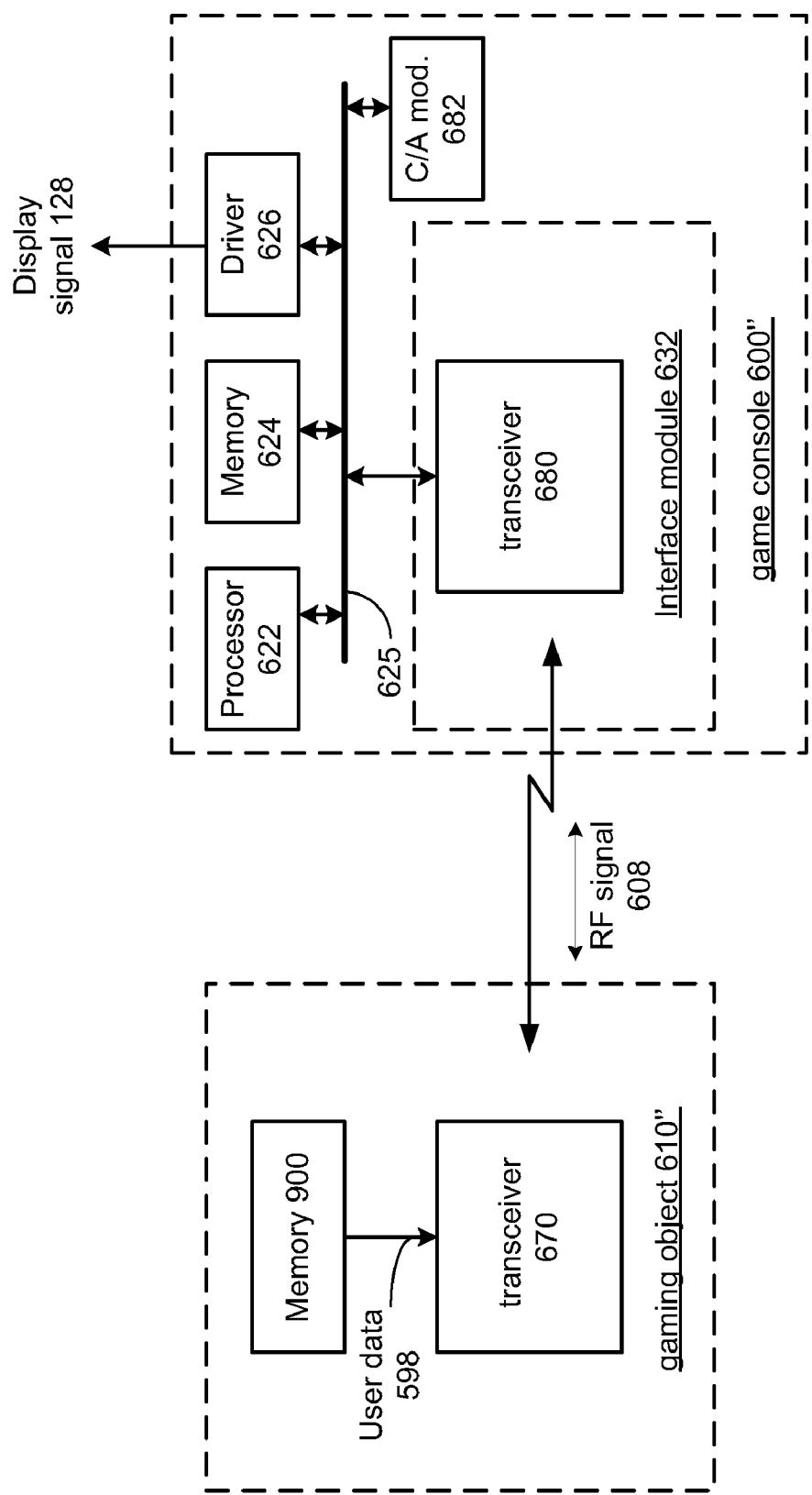
Figure 47:
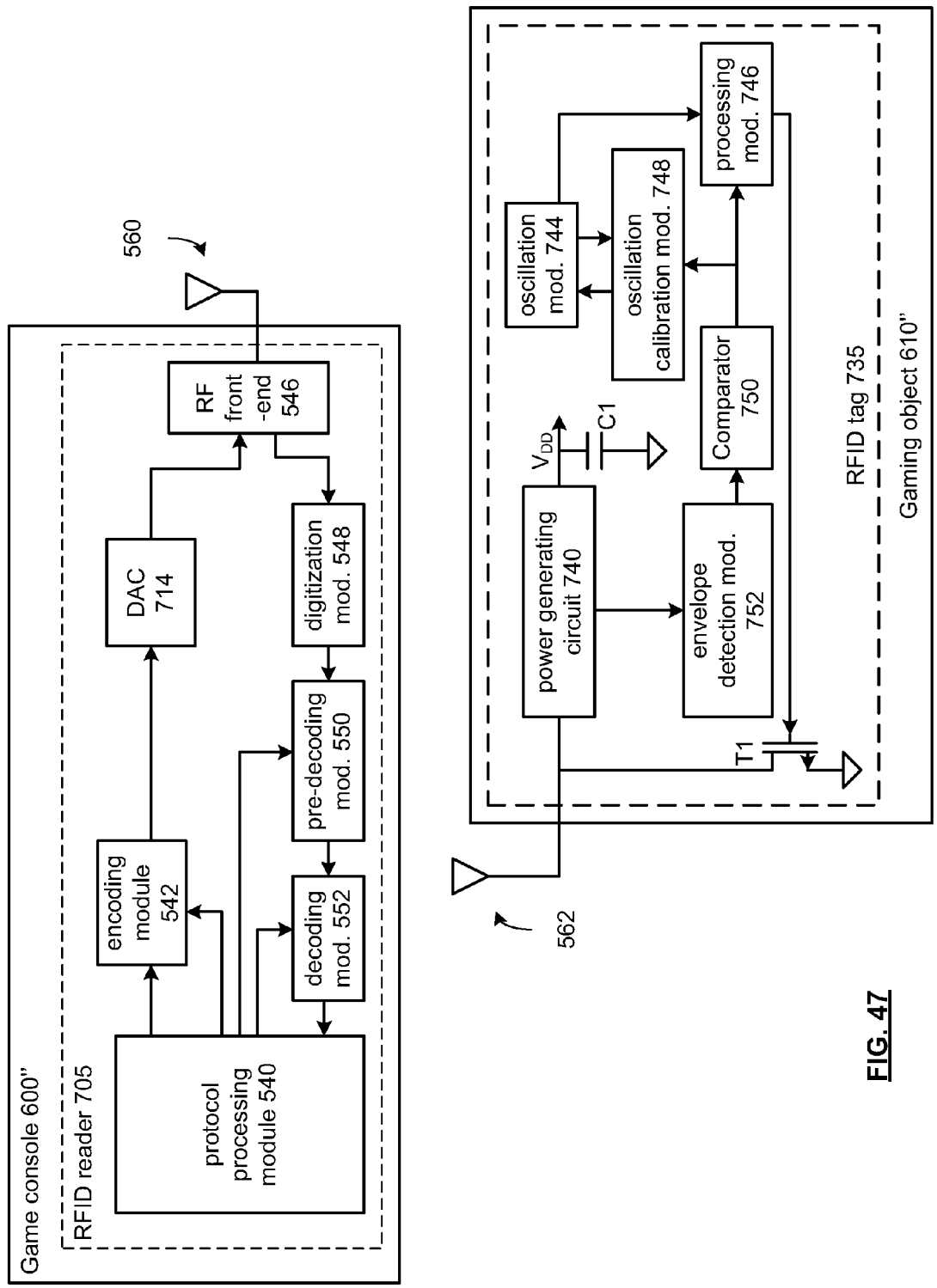
Figure 49:
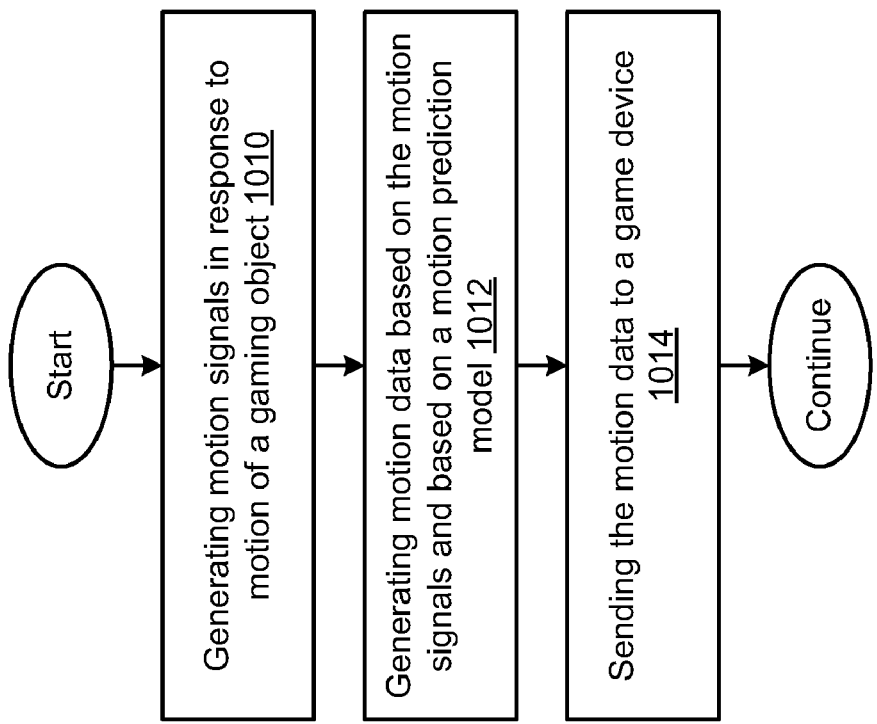
Figure 48:
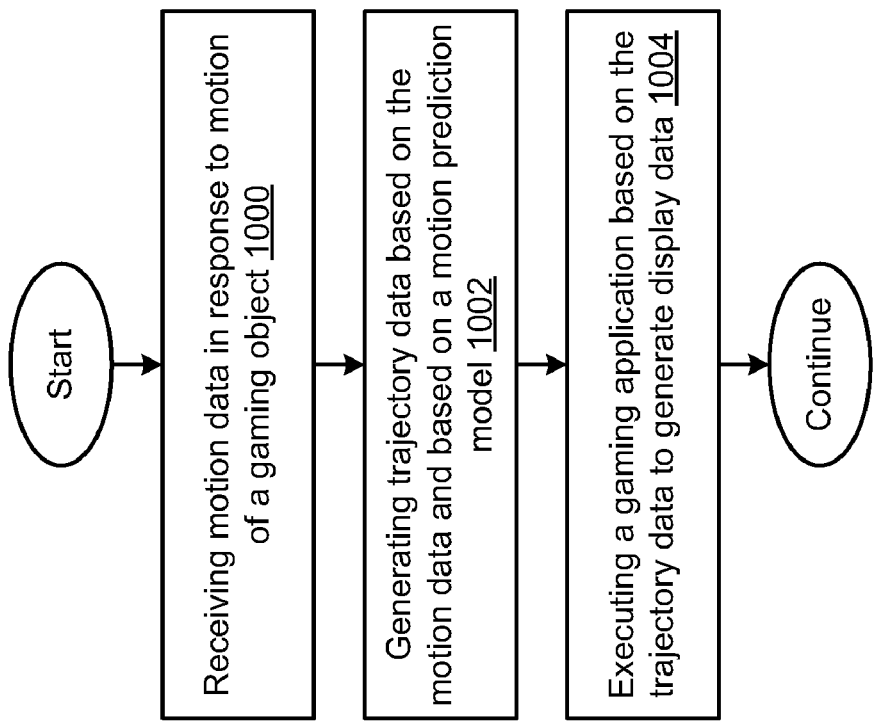
Figure 58:
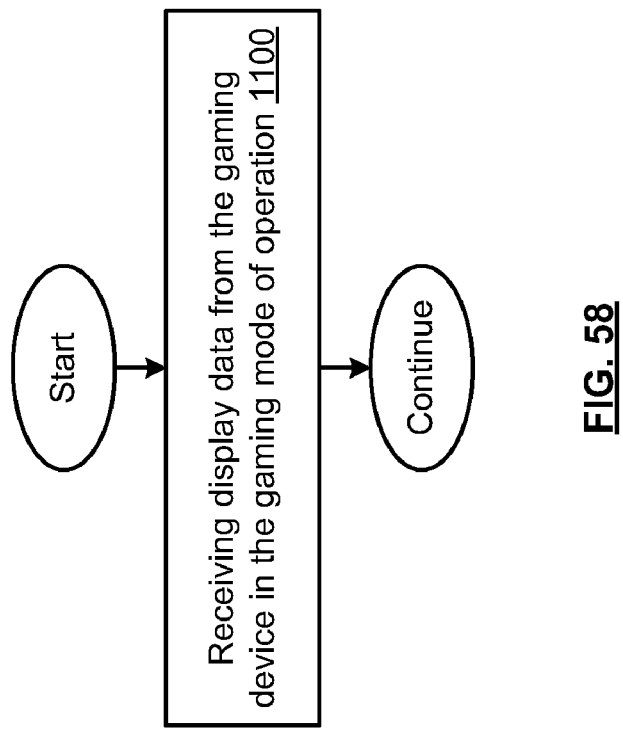
Figure 57:
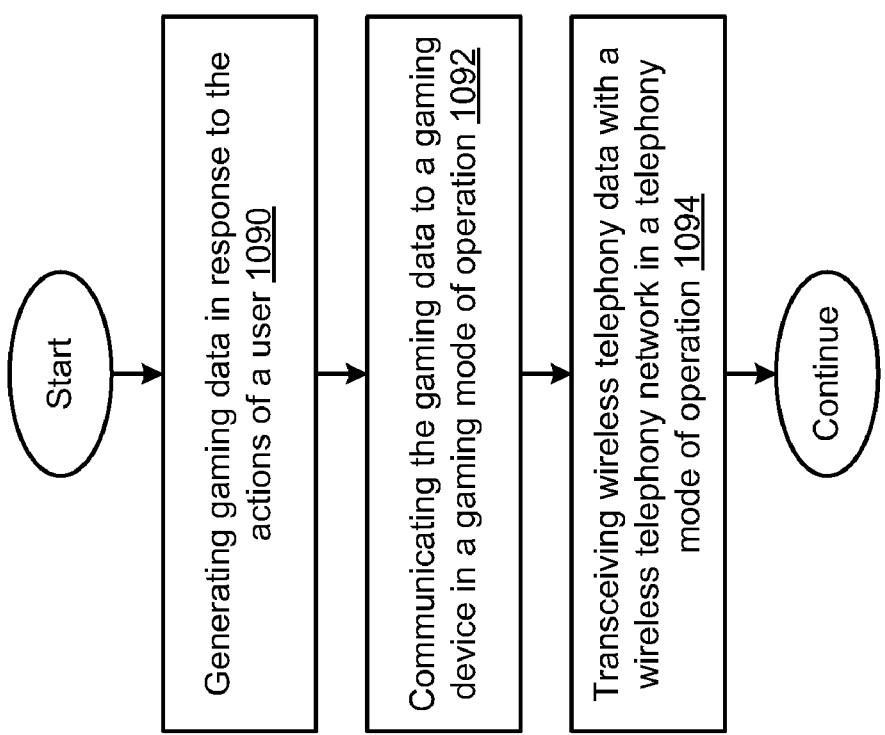
Figure 65:
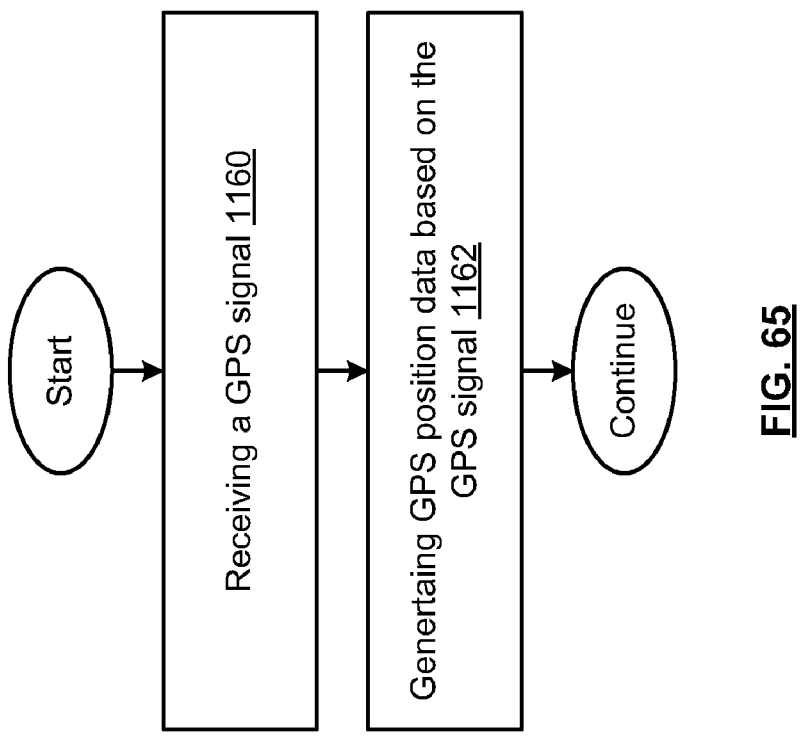
Figure 64:
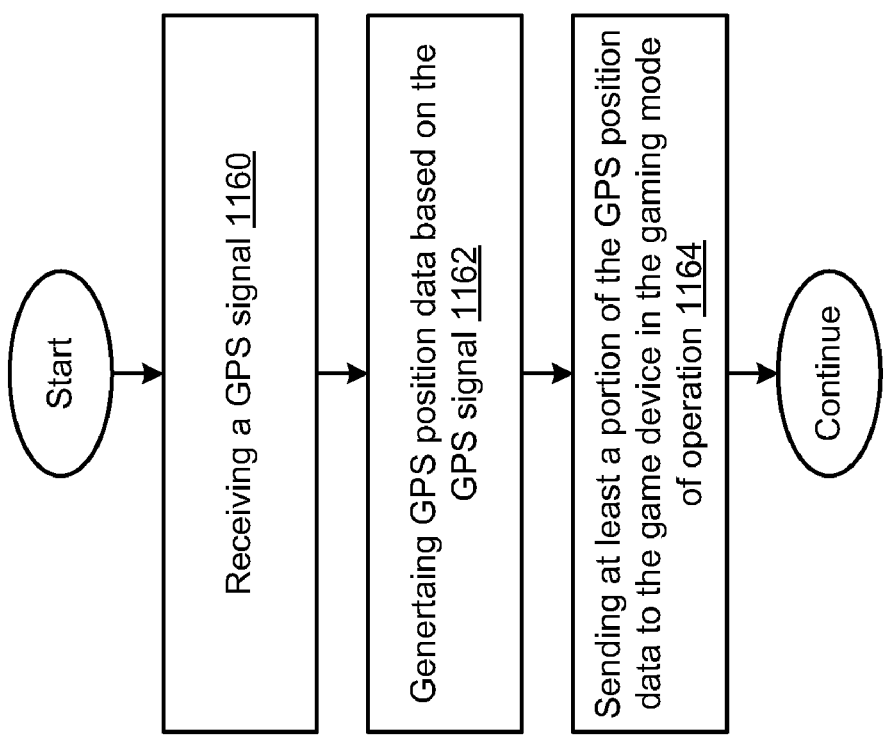

FIG. 3 presents a pictorial block diagram representation of a wireless network 111 in accordance with an embodiment of the present invention;

FIG. 4 presents a pictorial block diagram representation of a communication device 117 in accordance with an embodiment of the present invention;

FIG. 5 presents a pictorial block diagram representation of a communication device 117 in accordance with another embodiment of the present invention;

FIG. 6 presents a pictorial block diagram representation of a communication device 117 in accordance with another embodiment of the present invention;

FIG. 7 presents a pictorial block diagram representation of a communication device 117 in accordance with another embodiment of the present invention;

FIG. 8 presents a pictorial block diagram representation of a communication device 117 in accordance with another embodiment of the present invention;

FIG. 9 is a schematic block diagram of an embodiment of a communication device 10 in accordance with the present invention;

FIG. 10 is a schematic block diagram of a communication device 30 in accordance with another embodiment of the present invention;

FIG. 11 is a schematic block diagram of a communication device 30' in accordance with another embodiment of the present invention;

FIG. 12 is a schematic block diagram of a GPS receiver 210 used to generate position in accordance with an embodiment of the present invention;

FIG. 13 is a graphical representation of position information determined in accordance with an embodiment of the present invention;

FIG. 14 is a schematic block diagram of a GPS receiver 210 used to generate position in accordance with an embodiment of the present invention;

FIG. 15 is a graphical representation of position information determined in accordance with an embodiment of the present invention;

FIG. 16 is a schematic block diagram of a gyrating circuit 200 and GPS receiver 210 used to generate position and velocity information in accordance with an embodiment of the present invention;

FIG. 17 is a graphical representation of position information determined in accordance with an embodiment of the present invention;

FIG. 18 is a schematic block diagram of a gyrating circuit 200 and GPS receiver 210 used to generate position and velocity information in accordance with another embodiment of the present invention;

FIG. 19 is a schematic block diagram of an embodiment of RF transceiver 135 and GPS receiver 187 in accordance with the present invention;

FIG. 20 is a schematic block diagram of an embodiment of RF transceiver 135' and with dual mode receiver 137' in accordance with the present invention;

FIG. 21 is a side view of a pictorial representation of an integrated circuit package in accordance with an embodiment of the present invention;

FIG. 22 is a side view of a pictorial representation of an integrated circuit package in accordance with an embodiment of the present invention;

FIG. 23 is a side view of a pictorial representation of an integrated circuit package in accordance with an embodiment of the present invention;

FIG. 24 is a side view of a pictorial representation of an integrated circuit package in accordance with an embodiment of the present invention;

FIG. 25 is a bottom view of a pictorial representation of an integrated circuit package in accordance with an embodiment of the present invention;

FIG. 26 is a schematic block diagram of an overhead view of an embodiment of a gaming system in accordance with the present invention;

FIG. 27 is a schematic block diagram of a side view of an embodiment of a gaming system in accordance with the present invention;

FIG. 28 is a schematic block diagram of an overhead view of another embodiment of a gaming system in accordance with the present invention;

FIG. 29 is a schematic block diagram of a side view of another embodiment of a gaming system in accordance with the present invention;

FIGS. 30-32 are diagrams of an embodiment of a coordinate system of a gaming system in accordance with the present invention;

FIG. 33 is a schematic block diagram representation of a gaming system in accordance with an embodiment of the present invention that includes communication device 117;

FIG. 34 is a schematic block diagram of an embodiment of a communication device 10' in accordance with the present invention;

FIG. 35 is a schematic block diagram of an embodiment of an RFID reader and an RFID tag in accordance with the present invention;

FIG. 36 is a diagram of an example of positioning and/or motioning of a game controller to select an item on the display of a game console in accordance with the present invention;

FIG. 37 is a diagram of a method for processing a position and/or motion based selection in accordance with the present invention;

FIG. 38 is a diagram of a method for processing a position and/or motion based gaming action in accordance with the present invention;

FIG. 39 is a schematic block diagram of a side view of another embodiment of a gaming system in accordance with the present invention;

FIG. 40 is a schematic block diagram representation of a gaming system in accordance with another embodiment of the present invention;

FIG. 41 is a graphical representation of trajectory data determined in accordance with an embodiment of the present invention;

FIG. 42 is a graphical representation of trajectory data determined in accordance with another embodiment of the present invention;

FIG. 43 is a graphical representation of trajectory data determined in accordance with another embodiment of the present invention;

FIG. 44 is a schematic block diagram representation of a gaming system in accordance with another embodiment of the present invention;

FIG. 45 is a schematic block diagram of a side view of another embodiment of a gaming system in accordance with the present invention;

FIG. 46 is a schematic block diagram representation of a gaming system in accordance with another embodiment of the present invention;

FIG. 47 is a schematic block diagram of an embodiment of an RFID reader and an RFID tag in accordance another embodiment of the present invention;

FIG. 48 is a flowchart representation of a method in accordance with an embodiment of the present invention;

FIG. 49 is a flowchart representation of a method in accordance with an embodiment of the present invention;

FIG. 50 is a flowchart representation of a method in accordance with an embodiment of the present invention;

FIG. 51 is a flowchart representation of a method in accordance with an embodiment of the present invention;

FIG. 52 is a flowchart representation of a method in accordance with an embodiment of the present invention;

FIG. 53 is a flowchart representation of a method in accordance with an embodiment of the present invention;

FIG. 54 is a flowchart representation of a method in accordance with an embodiment of the present invention;

FIG. 55 is a flowchart representation of a method in accordance with an embodiment of the present invention;

FIG. 56 is a flowchart representation of a method in accordance with an embodiment of the present invention;

FIG. 57 is a flowchart representation of a method in accordance with an embodiment of the present invention;

FIG. 58 is a flowchart representation of a method in accordance with an embodiment of the present invention;

FIG. 59 is a flowchart representation of a method in accordance with an embodiment of the present invention;

FIG. 60 is a flowchart representation of a method in accordance with an embodiment of the present invention;

FIG. 61 is a flowchart representation of a method in accordance with an embodiment of the present invention;

FIG. 62 is a flowchart representation of a method in accordance with an embodiment of the present invention;

FIG. 63 is a flowchart representation of a method in accordance with an embodiment of the present invention;

FIG. 64 is a flowchart representation of a method in accordance with an embodiment of the present invention; and FIG. 65 is a flowchart representation of a method in accordance with an embodiment of the present invention.

DETAILED DESCRIPTION OF THE INVENTION

Figure 1:
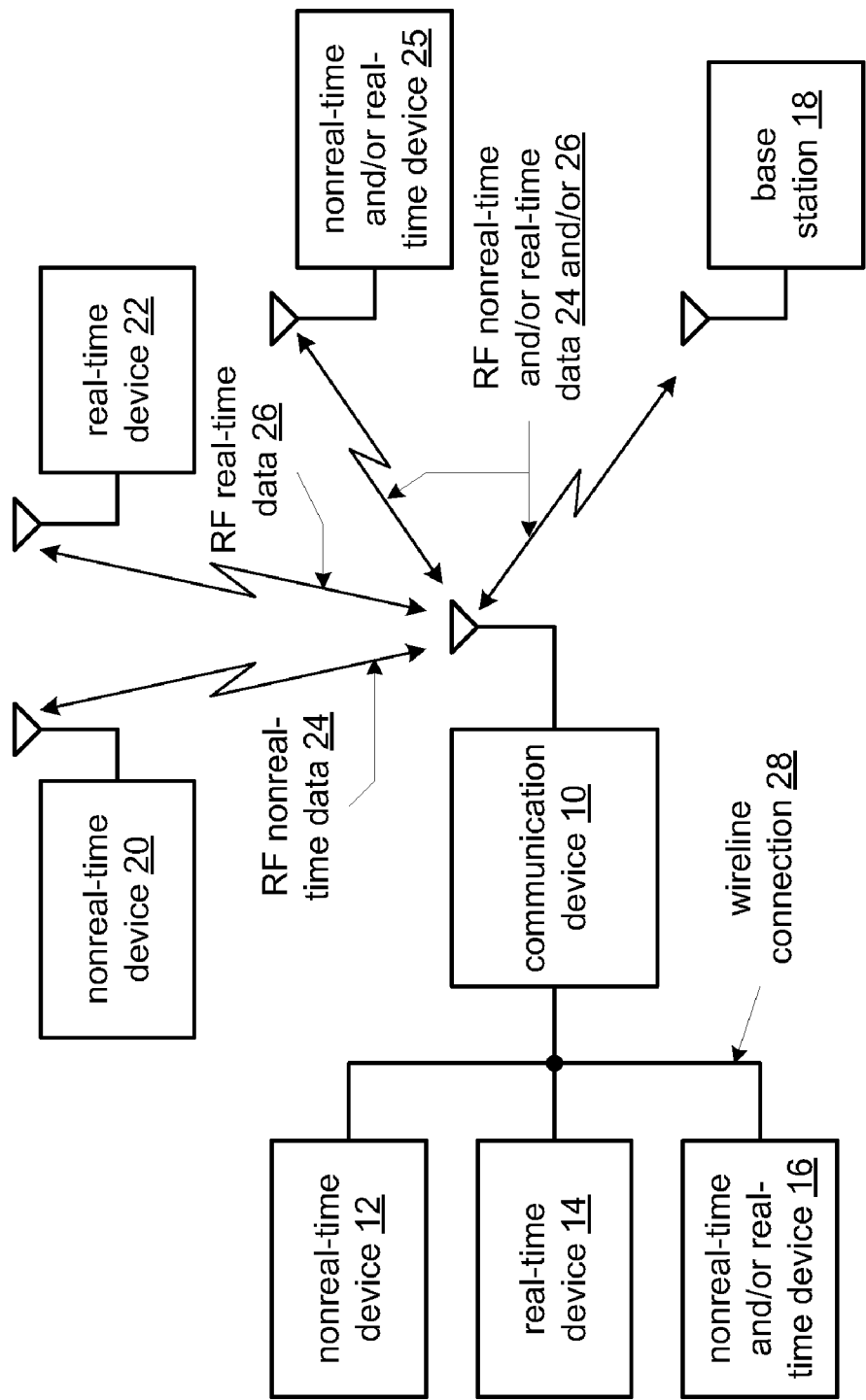
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol, RFID of other RF tag protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game device, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be a game console, access points, personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes telephony data, voice, audio, video, multimedia data, display data, motion data, for application such as telephony, gaming, or other applications. The non-real-time data 24 includes text messaging, email, web browsing, file uploading and downloading, authentication data, user preferences, and other data used in any of the application discussed above.

In an embodiment of the present invention, the communication device 10 includes an integrated circuit, such as an RF integrated circuit that includes one or more features or functions of the present invention. Such features and functions shall be described in greater detail in association with FIGS. 5-65 that follow.

Figure 2:
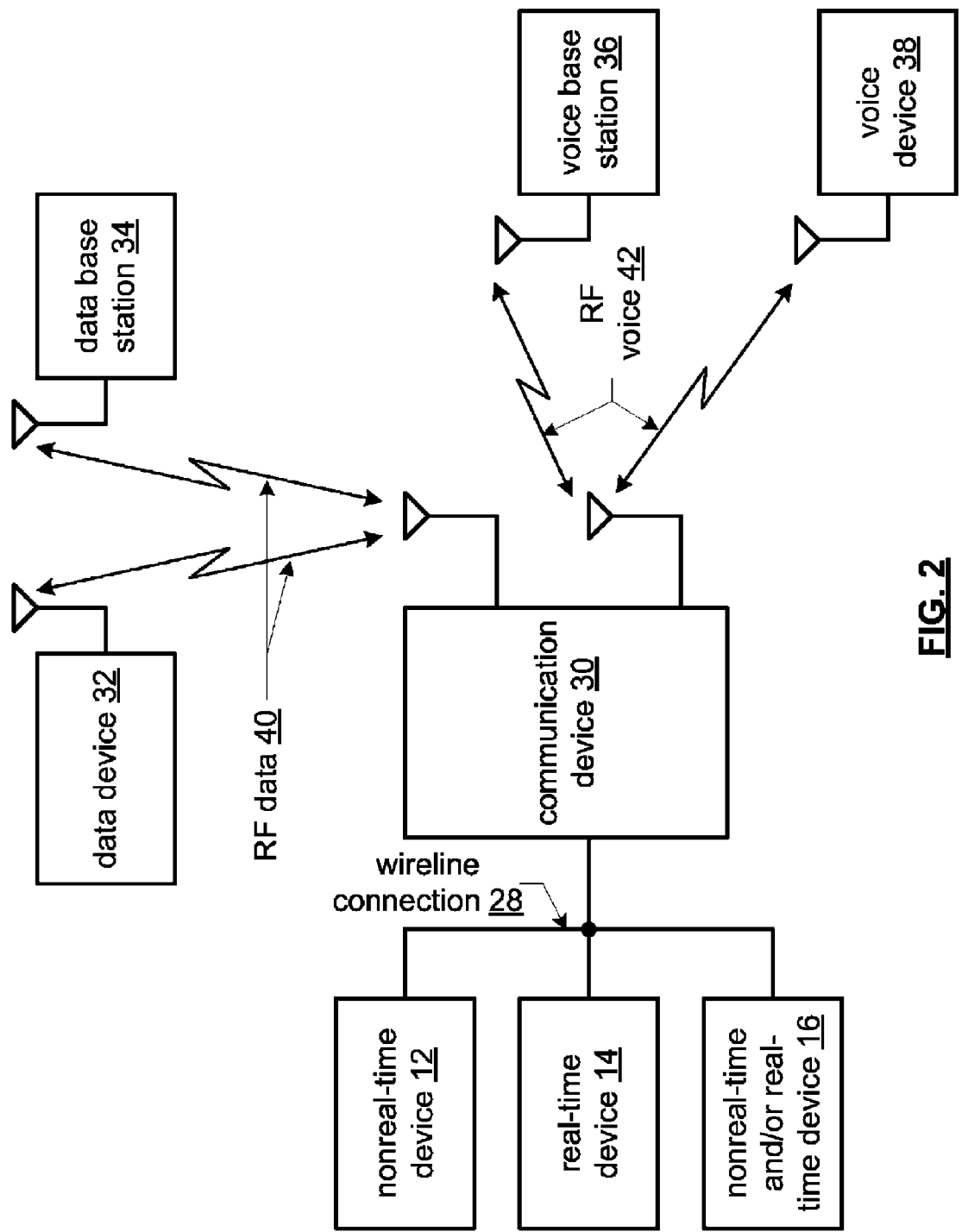
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes one or more separate wireless transceivers for communicating, contemporaneously, via two or more wireless communication protocols with data device 32 and/or data base station 34 via RF data 40 and voice base station 36 and/or voice device 38 via RF voice signals 42.

FIG. 3 presents a pictorial representation of a wireless network 111 in accordance with an embodiment of the present invention. The wireless network 111 includes an access point 110 that is coupled to packet switched backbone network 101. The access point 110 manages communication flow over the wireless network 111 destined for and originating from each of communication devices 121, 123, 117 and 127. Via the access point 110, each of the communication devices 121, 123, 117 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 121, 123, 117 and 127, such as communication device 117 is a mobile device that can include the functionality of communication devices 10 or 30. In particular, communication device 125 includes an RF integrated circuit (IC) optionally including a motion sensor such as an accelerometer, RFID tag, or on-chip gyrating circuit that generates motion parameters based on motion of the device including a velocity, velocity vector, acceleration (including deceleration) and/or other motion parameter. In addition, communication device 117 optionally includes a GPS receiver that generates GPS position data and/or GPS velocity data. The RF IC processes the optional GPS position data and GPS velocity data and the optional motion parameters to produce motion data 113, such as position information and velocity information that identifies the location, velocity, orientation and/or direction of motion of the communication device 117. The RF IC can use data from either the optional motion sensor or the GPS receiver or both to generate the motion data. If for instance the GPS receiver is running and receiving a strong signal, GPS position and velocity data can be used to generate the motion data 113. If however, the GPS receiver is starting up, has lost satellite reception, the device is transmitting or the GPS receiver is otherwise generating inaccurate data, either the optional motion sensor or an extrapolation of past data can be used to generate velocity information and can further generate position information from the last know position coordinates and/or velocity.

In addition, where high data rate motion data 113 is required for an application, for instance a gaming application where the communication device is used to communicate motion data to a game console or game server in conjunction with a local game or an online game, the GPS receiver can generate a reference position and the optional motion sensor can be used to generate motion vectors or other different position data at sample periods such as 10 msec, 20 msec, 50 msec, 100 msec, or some other data sample period.

The RF IC optionally generates outbound data that includes the motion data 113 and/or a flag or other data that indicates communication device 117 is a mobile device, generates an outbound RF signal from outbound data and transmits the outbound RF signal to a remote station, such as the access point 110.

In operation, access point 110 can optionally change its own transmit and receive characteristics, based on the knowledge that communication device 117 is mobile, is in motion and/or based on information from a velocity vector or other motion data 113 that indicates that the communication device 125 is moving into closer range, is moving out of range, is moving close to a known source of interference, is moving into or away from an obstructed path, etc. Examples of transmit and receive characteristics include: transmit power levels; antenna configurations such as multi-input multi-output (MIMO) configuration, beam patterns, polarization patterns, diversity configurations, etc. to adapt the orientation and/or position of the communication device; protocol parameters and other transmit and receive characteristics of the access point.

In addition, access point 110 can generate optionally control data 99 to transmit to the communication device 117 and/or the communication devices 121, 123 and 127, to modify the transmit and receive characteristics of these devices. Further, in an embodiment of the present invention, access point 110 can generate a request to receive periodic motion data from the communication device 117. Alternatively, communication device 117 can generate and transmit motion data on a regular and/or periodic basis or in response to changes in motion data 113 that compare unfavorably (such as to exceed) a motion change threshold, such as to inform the access point 110 when the communication device 117 starts, stops, changes speed and/or direction, etc.

For example, communication device 117 can indicate to access point 110 that it is a mobile device, and access point 110 can request that communication device 117 send periodic motion data 113. If the access point 110 determines that the communication device 117 is moving out of range, it can increase its power level, and steer its antenna beam in the direction of the communication device 117 and command the communication device 117 to modify one or more if its transmit and/or receive parameters, to increase its power level, steer its antenna beam at the access point and/or to modify other antenna parameters to compensate for a possible lowering of signal to noise ratio, etc.

Further access point 110 can operate to manage the transmit and receive characteristics by the adjustment of the protocol or protocols used in communicating between the access point 110 and the client devices 121, 123, 117 and 127 and power levels inherent in and associated therewith. In one mode of operation, access point 110 can selectively adjust one or more protocol parameters, such as the packet length, data rate, forward error correction, error detection, coding scheme, data payload length, contention period, and back-off parameters used by access point 110 in communication with one or more of the client devices 121, 123, 117 and 127, based on the analysis of the motion data 113. In this fashion, the protocol parameters can be adapted to compensate for the motion of one or more communication devices, such as communication device 117, to conserve power, increase throughput, and/or to minimize unnecessary transmission power utilization based on the conditions of the network.

For example, in the event that a mobile client device, such as communication device 117 is anticipated to have difficulty detecting transmissions from communication device 123 because it is moving out of range, access point 110 can modify the protocol parameters so that transmissions by communication device 117 include more aggressive error correcting codes, increased back-off times and/or smaller data payloads or packet length to increase the chances that a packet will be received in the event of contention by communication device 123. In addition, decreasing the packet length can increase the frequency of acknowledgements transmitted by access point 110. These acknowledgements can be transmitted at a power level sufficient to be heard by communication device 123. With increased back-off times, communication device 123 has less opportunity to create a potential contention.

In a further mode of operation, access point 110 and communication devices 121, 123, 117 and 127 can operate using a plurality of different, and potentially complimentary, protocols having different protocol parameters. Access point 110 can likewise select a particular one of a plurality of protocols that suits the particular conditions present in the wireless network 111, as determined based on an assessment of motion data 113. For instance, an access point can select from 802.11(n), 802.11(g) or 802.11(b) protocols having different protocol parameters, data rates, etc, based on the particular protocol best suited to the current mobility status of communication devices 121, 123, 117 and 127.

While the description above has focused on the control of transmit and receive characteristics of communication devices 121, 123, 117 and 127 based on control data 115 received from access point 110, in an embodiment of the present invention, each of these communication devices can respond to its own motion data, such as motion data 113, to control its transmit and receive characteristics, without intervention from the access point. For example, if the communication device 117 determines it is moving out of range, it can increase its power level, and steer its antenna beam in the direction of the access point 110 and/or modify other protocol parameters to compensate for a possible lowering of signal to noise ratio, etc.

In an embodiment of the present invention, the communication devices 121, 123, 117 and 127 adjusts the manner in which position information is determined based on whether or not the wireless transceiver is transmitting. In particular, potential interference caused by the transmission could corrupt the GPS data received during this period. The present invention adjusts the determination of position information during transceiver transmissions to compensate for the potential loss or corruption of current GPS position data by, for instance, de-weighting the current GPS position data and relying instead on position data that is estimated based on prior GPS position and/or velocity data or based on motion data generated by an optional motion sensor.

While motion data 113 has been discussed above primarily with respect to the control of communications in a communications application and for gaming such as local or Internet gaming, motion data 113 generated in such a fashion can further be used in support of other applications such as position and navigation services, location-based services, authentication services and other applications where the position, orientation or location of the communication device 117 is useful or required. Particular attention to the use of communication device 117 in a separate gaming mode of operation will be discussed in greater detail in conjunction with FIG. 26-44. Further details including several other methods and implementations will be discussed in conjunction with FIGS. 4-25 that follow.

FIG. 4 presents a pictorial representation of a wireless network in accordance with an embodiment of the present invention. In particular, communication device 117 is a wireless telephone device or other device that includes a wireless telephony transceiver and that, in a telephony mode of operation, is capable of placing a receiving conventional wireless telephone calls, voice over internet protocol telephone calls, communicating via a wireless telephony protocol such as cellular voice or data protocol such as GSM, GPRS, AMPS, UMTS, EDGE or other wireless telephony protocol that can be used to communicate with a network 119, such as a wireless telephone or data network, the Internet or other network, via base station or access point 118. In an embodiment of the present invention, communication device 117 includes a GPS receiver and generates position information that is used by communication device 117 and/or network 119 for location-based services, for placing emergency calls such as 911 (e911) calls.

In addition, the position information can be used by communication device 110 for adjusting transmit, receive and antenna characteristics based on the position or motion of communication device 117, either by itself or based on information obtained from a base station/access point such as base station or access point 118 in a similar fashion to communication device 117 discussed in conjunction with FIG. 3. In an embodiment of the present invention, can optionally adjust the determination of position information during transceiver transmissions to compensate for the potential loss or corruption of current GPS position data by, for instance, de-weighting the current GPS position data and relying instead on position data that is estimated based on prior GPS position and/or velocity data or based on motion data generated by an optional motion sensor.

In addition, communication device 117 can be a dual mode or multi-mode device that can be used in a gaming mode of operation. In this mode, communication 117 uses one or more sensors, such as a microphone, button, joy-stick, thumb wheel, motion sensor, touch screen or photo sensor, for generating gaming data 66 in response to the actions of a user. In addition, the communication device 117 can us its wireless telephony transceiver to sends the gaming data 66 to a game device 115 in the gaming mode of operation.

For example, the game device 115 can be a game console, such as a home gaming console, set-top box, arcade game or other local game device that runs a game, such as a video game and generates display data, such as audio and/or video display data, that can be transferred to display device 125 for display. The display device can be a television, monitor, or display screen, with or without corresponding audio production equipment, that is either integrated in game device 115 or connected to game device 115 via a port such as a video, multimedia or graphics port. Communication device 117 can operate as a game controller, joystick, remote controller, simulated sword, simulated gun, or be a simulated helmet, a vest, a hat, shoes, socks, pants, shorts, gloves, racquet, paddle, bat, musical instrument, or other gaming object to produce gaming data 66 to interact with the game. Gaming data can be game commands and preferences, user selections, authentication data control data, motion data or other data associated with a user's access to, set-up, and operation of a game. In this fashion, a user can operate communication device 117 as a wireless telephone to place and receive telephone calls, surf the Web or download ringtones, etc. In addition, the user can operate communication device 117 in a gaming mode of operation to interact with one or more games provided by game device 115.

In an embodiment of the present invention, the wireless telephony receiver of communication device 117 communicates directly with a compatible transceiver or receiver included in game device 115. Given the proximity of these devices during normal gaming conditions, the wireless telephony transceiver of communication device 117 adjusts its transmit power to a low power state in the gaming mode of operation so that, when sending the gaming data 66, the communication device 117 reduces possible interference with the base station or access point 118 and other devices and further operates with reduced power consumption. In one mode of operation, the wireless telephony receiver of game device 115 can likewise send other gaming data back to communication device 117 in conjunction with the set-up and operation of a game, the establishment of communication between the game device 115 and the communication device 117, the authentication of a user of communication device 117, etc. This other gaming data can further include display data for display on the display device of communication device 117. When communicating signals or other gaming data back to communication device 115, game device 115 can likewise operate in a low power state, either permanently or on a case-by-case basis, to avoid interference with the base station or access point 118 and other devices.

FIG. 5 presents a pictorial block diagram representation of a communication device 117 in accordance with another embodiment of the present invention. In particular, an embodiment is shown that includes similar elements from the embodiment of FIG. 4 that are referred to by common reference numerals. As discussed in conjunction with FIG. 4, communication device 117 can operate in a telephony mode of operation and communicate with network, such as network 119, via a base station or access point 118. In addition, the wireless telephony transceiver of communication device 117 can, in a gaming mode of operation, send data to and/or receive data from the game device 115.

In this embodiment however, game device 115 is itself coupled to a network 119 via a narrow or broadband modem, network card or other interface that is capable of transceiving data with the network 119 on a wireless or wired basis. In this fashion, the game device 115 can operate in conjunction with communication device 117 to select gaming applications that are stored on network 119 either by downloading and executing these gaming application or by executing these applications on a gaming server or other device coupled to network 119. In this fashion, the user of communication device 117 and gaming device 115 can access a wider variety of games, receive game updates engage in multiplayer games, and execute gaming applications based on data received from network 119.

In another mode of operation, game device 115 can obtain conditional access information via the network 119. For instance, game device 115 can be located in an arcade or other public location where many users may access the game device. Users of communication devices, such as communication device 117, can subscriber to a service, either for a limited period or on an on-going basis, that allows the user to access the game device 115 in order to play one or more games. During an initial exchange between communication device 117 and game device 115 gaming data 66 is provided to game device 115 that includes passwords, logon identifiers or other conditional access data that can be authenticated by game device 115 via network 119 prior to allowing the user of communication device 117 to play the game.

FIG. 6 presents a pictorial block diagram representation of a communication device 117 in accordance with another embodiment of the present invention. In particular, an embodiment is shown that includes similar elements from the embodiments of FIGS. 4-5 that are referred to by common reference numerals. As discussed in conjunction with FIG. 4, communication device 117 can operate in a telephony mode of operation and communicate with network, such as network 119, via a base station or access point 118. In addition, the wireless telephony transceiver of communication device 117 can, in a gaming mode of operation, send gaming data to and/or receive data from the game device 115.

In this embodiment, communication device 117 can further operate in a gaming mode of operation to send the gaming data 66 to the gaming device 115 by transmitting radio frequency signals via its wireless telephony transceiver to base station or access point 118 for communication with game device 115 over network 119. In particular, in implementations where game device 115 either does not include its own wireless telephony receiver or transceiver or the communication device 117 is out of range of the wireless telephony transceiver or receiver of game device 115, communication device 117 can nevertheless interact with the game device 115 to play a game.

As in the embodiment of FIG. 5, game device 115 is itself coupled to a network 119 via a narrow or broadband modem, network card or other interface that is capable of transceiving data with the network 119 on a wireless or wired basis. In this fashion, the communication device 117 can interact with network 119 to access game device 115. For example, during an initial exchange between communication device 117 and network 119 gaming data 66 is provided to network 119 to select a game device that is coupled to network 119, such as game device 115. The gaming data 66 can include passwords, logon identifiers or other conditional access data that can be authenticated by either network 119 or game device 115 prior to allowing the user of communication device 117 to play a game.

FIG. 7 presents a pictorial block diagram representation of a communication device 117 in accordance with another embodiment of the present invention. In particular, an embodiment is shown that includes similar elements from the embodiments of FIGS. 4-6 that are referred to by common reference numerals. As discussed in conjunction with FIG. 4, communication device 117 can operate in a telephony mode of operation and communicate with network, such as network 119, via a base station or access point 118. However in this embodiment, game device 115' is a game server or other device that is coupled to network 119 that runs a game, such as a video game and interacts with communication device 117 via gaming data 66. In this embodiment, communication device 117 can further operate in a gaming mode of operation to send the gaming data 66 to the gaming device 115 by transmitting radio frequency signals via its wireless telephony transceiver to base station or access point 118 for communication with game device 115 over network 119. Game device 115' further generates display data 68, such as audio, video and/or multimedia display data, that can be transferred to back to the communication device 117 for display on the display device associated therewith.

As in the example presented in conjunction with FIG. 7, during an initial exchange between communication device 117 and network 119, gaming data 66 is provided to network 119 to select a game device that is coupled to network 119, such as game device 115'. The gaming data 66 can include passwords, logon identifiers or other conditional access data that can be authenticated by either network 119 or game device 115' prior to allowing the user of communication device 117 to play a game.

FIG. 8 presents a pictorial block diagram representation of a communication device 117 in accordance with another embodiment of the present invention. In particular, an embodiment is shown that includes similar elements from the embodiments of FIGS. 4-6 that are referred to by common reference numerals. In this embodiment however, game device 115' generates the display data 68 for display on a device, such as personal computer 129, that is separate from communication device 117 and is also capable of accessing game device 115' via base station or access point 118 via network 119. While shown as a personal computer 129, the other device can similarly be implemented via a home game console, network coupled television or monitor, arcade game device or other device having a compatible display device for displaying display data 68 and further for communicating with network 119 on a wired or wireless basis.

In this embodiment, an initial exchange can take place between either communication device 117 or personal computer 129 to access game device 115', to optionally authenticate the user, to set up the game and further to identify the communication device 117 as the source of gaming data 66 and the destination for other gaming data and the personal computer 129 as the destination for display data 68.

FIG. 9 is a schematic block diagram of an embodiment of an integrated circuit in accordance with the present invention. In particular, an RF integrated circuit (IC) 50 is shown that implements communication device 10, such as communication device 117 in conjunction with actuator, microphone 60, keypad/keyboard 58, memory 54, speaker 62, display 56, camera 76, antenna interface 52 and wireline port 64. In operation, RF IC 50 includes a multi-mode transceiver/GPS receiver 73 having RF and baseband modules for receiving GPS signals 43 and further a wireless telephony receiver for transmitting and receiving data RF real-time data 26 and non-real-time data 24 via an antenna interface 52 and antenna. The antenna can be a fixed antenna, a single-input single-output (SISO) antenna, a multi-input multi-output (MIMO) antenna, a diversity antenna system, an antenna array or other antenna configuration that optionally allows the beam shape, gain, polarization or other antenna parameters to be controlled.

As previously discussed, the multimode transceiver/GPS receiver 73 can operate in a telephony mode where the real-time data 26 and/or non-real-time data 24 include telephony data communicated with a telephony network. Multimode transceiver/GPS receiver 73 can further operate and in a gaming mode of operation where the real-time data 26 and/or non-real-time data 24 include gaming data 66, display data 68 and other data. As will be discussed further multi-mode transceiver/GPS receiver 73 for receiving and processing GPS signals in conjunction with either the telephony mode of operation, the gaming mode of operation or further in a dedicated GPS mode of operation fur use of communication device 10 in GPS positioning, navigation or other services.

In addition, RF IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

The actuator 48 can be a sensor such as a joy-stick or thumb wheel. Further the actuator 48 can include a photosensor that generates gaming data based on an optical signal from a video display such as a video display associated in game console 115 or separate video display that operates based on display data 68. In this fashion, the optical signal can be used to generate data that represents position or orientation of the communication device 10. For instance, the optic sensor used on communication device 10 can generate optical feedback to determine if the communication device is pointed at particular object on the screen for games involving simulated guns, or objects whose orientation is important to the game and/or for use of the communication device 10 as a pointing device for selecting on-screen selections in conjunction with a user interface.

In operation, communication device 10 can generate gaming data, such as gaming data 66 in response to a user's interaction with microphone 60, actuator 48, keypad/keyboard 58, to provide game commands and preferences, user selections, authentication data, control data or other data associated with a user's access to, set-up, and operation of a game.

Power management circuit (PMU) 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits in response to power mode signals received from the RF IC 50. While shown as an off-chip module, PMU 95 can alternatively implemented as an on-chip circuit.

In addition, RF IC 50 and is coupled to a motion sensor 175 that generates motion signals in response to motion of the mobile communication device. The GPS receiver of multi-mode transceiver/GPS receiver 73 receives GPS signals and generates GPS position data based on these GPS signals. Motion data generation module 55 generates motion data based on the motion signals and/or the GPS position data that can be included in gaming data 66 in the gaming mode of operation, that can be used in support of the telephony and GPS modes of operation. Various implementations of motion data generation module including many optional functions and features are presented in conjunction with FIGS. 12-18 and/or FIGS. 36-38 or as otherwise described herein.

Motion sensor 175 can be implemented via one or more one, two or three-axis accelerometers or one or more on-chip gyrating circuits implemented with microelectromechanical systems (MEMS) technology to form a piezoelectric gyroscope, a vibrating wheel gyroscope, a tuning fork gyroscope, a hemispherical resonator gyroscope, or a rotating wheel gyroscope that responds to inertial forces, such as Coriolis acceleration or linear acceleration, in one, two or three axes to generate motion data, such as a velocity vector in one, two or three dimensions and/or one, two or three orientations.

While motion sensor 175 is shown as a off-chip component and motion data generation module 55 is shown as being implemented on-chip, either of these units can be implemented either on-chip or off-chip, depending on the implementation.

In operation, the multi-mode transceiver/GPS receiver 73 generates an outbound RF signal from outbound data and generates inbound data from an inbound RF signal. Further, processing module 225 is coupled to the motion sensor 175, when included, and the dual mode transceiver/GPS receiver 73, and processes position information, generates the outbound data that includes the position information or motion data, and receives the inbound data that optionally includes data from a remote access point/base station to modify transmit and/or receive parameters in response to the position information that was transmitted.

As discussed in conjunction with FIGS. 3 and 4, the communication device 10, places and receives wireless calls through a wireless telephone network and/or a IP telephone system, via a base station, access point or other communication portal, operates through command by the processing module 225 to either respond directly to motion data, such as motion data 113, it generates from motion sensor 175 and/or the GPS receiver to control the transmit and receive characteristics of transceiver 73 or to respond to control data, such as control data 99 received from an access point or other station to control the transmit and receive characteristics of transceiver 73.

For example, if the communication device 10 determines it is moving out of range, it can increase its power level, and steer its antenna beam in the direction of the access point and/or modify other protocol parameters to compensate for a possible lowering of signal to noise ratio, modify its receiver sensitivity, etc. In addition, position information generated by GPS receiver and/or motion sensor 175 can be included in the outbound RF signal sent to a telephone network to support a 911 call such as an E911 emergency call.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry. Motion data generation module 55, multi-mode transceiver/GPS receiver 73, and IPO module 71 can be implemented via hardware, or software and/or firmware operating in conjunction with processing module 225.

In further operation, the RF IC 50 executes operational instructions that implement one or more of the applications (real-time or non-real-time) attributed to communication devices 10 and 117 as discussed above and in conjunction with FIGS. 1-8.

FIG. 10 is a schematic block diagram of another embodiment of an integrated circuit in accordance with the present invention. In particular, FIG. 10 presents a communication device 30 that includes many common elements of FIG. 9 that are referred to by common reference numerals. RF IC 70 is similar to RF IC 50 and is capable of any of the applications, functions and features attributed to RF IC 50. However, RF IC 70 includes a separate wireless transceiver 75 for transmitting and receiving RF data 40 and RF voice signals 42, such as real-time data 26 and/or non-real-time data 24 and further a separate GPS receiver 77 for receiving GPS signals 43.

In operation, the RF IC 70 executes operational instructions that implement one or more of the applications (real-time or non-real-time) attributed to communication devices 10, 30 and 117 as discussed above and in conjunction with FIG. 1-9.

FIG. 11 is a schematic block diagram of another embodiment of an integrated circuit in accordance with the present invention. In particular, FIG. 11 presents a communication device 30' that includes many common elements of FIG. 10 that are referred to by common reference numerals. RF IC 70' is similar to RF IC 70 and is capable of any of the applications, functions and features attributed to RF ICs 50 and 70 as discussed in conjunction with FIGS. 1-10. However, RF IC 70' operates in conjunction with an off-chip GPS receiver 77' for receiving GPS signals 43.

In operation, the RF IC 70' executes operational instructions that implement one or more of the applications (real-time or non-real-time) attributed to communication devices 10, 30, and 117 as discussed above and in conjunction with FIGS. 1-10.

FIG. 12 is a schematic block diagram of a GPS receiver 210 used to generate position in accordance with an embodiment of the present invention. In this embodiment, GPS receiver 210, such as GPS receiver 77, 77' or multi-mode receiver 73 generates position information 186 that can be used by communication devices 10, 30, 30' and/or 117 to generate gaming data 66 and optionally to control its own operation and/or to send to remote devices such as access point 110, a base station, telephone network or system, etc. for other purposes.

In particular, global positioning system (GPS) receiver 210 receives a GPS signal and that generates GPS position data 212 based on the GPS signal. GPS receiver 210 generates GPS position data and GPS data quality signal 216. In operation, GPS receiver 210 is coupled to recover a plurality of coarse/acquisition (C/A) signals and a plurality of navigation messages from received GPS signals 43. The GPS receiver 210 utilizes the C/A signals and the navigations messages to determine the position of the communication device.

In an embodiment of the present invention, motion data generation module 55 is implemented via sample and hold module 180 and weighting module 184. While sample and hold module 180 and weighting module 184 are shown as discrete modules, in an embodiment of the present invention, these modules can also be implemented in hardware, software or firmware using a processor such as processing module 225 or other processing elements.

In particular, GPS receiver 210 generates one or more clock signals. The clock signal(s) may also be used by the GPS receiver 210 to determine the communication device's position. GPS receiver 210 determines a time delay for at least some of the plurality of C/A signals in accordance with the at least one clock signal. The GPS receiver calculates a distance to a corresponding plurality of satellites of the at least some of the plurality of C/A signals based on the time delays for the at least some of the plurality of C/A signals. In other words, for each GPS signal 43 received, which are received from different satellites, the GPS receiver 210 calculates a time delay with respect to each satellite that the communication device is receiving a GPS RF signal from, or a subset thereof. For instance, the GPS receiver 210 identifies each satellite's signal by its distinct C/A code pattern, then measures the time delay for each satellite. To do this, the receiver produces an identical C/A sequence using the same seed number as the satellite. By lining up the two sequences, the receiver can measure the delay and calculate the distance to the satellite, called the pseudorange. Note that overlapping pseudoranges may be represented as curves, which are modified to yield the probable position.

GPS receiver 210 can calculate the position of the corresponding plurality of satellites based on corresponding navigation messages of the plurality of navigation messages. For example, the GPS receiver 210 uses the orbital position data of the navigation message to calculate the satellite's position. The GPS receiver 210 can determine the location of the RF IC 50, 70 or 70' (and therefore communication device 10, 30, 30' or 117) based on the distance of the corresponding plurality of satellites and the position of the corresponding plurality of satellites. For instance, by knowing the position and the distance of a satellite, the GPS receiver 210 can determine it's location to be somewhere on the surface of an imaginary sphere centered on that satellite and whose radius is the distance to it. When four satellites are measured simultaneously, the intersection of the four imaginary spheres reveals the location of the receiver. Often, these spheres will overlap slightly instead of meeting at one point, so the receiver will yield a mathematically most-probable position that can be output as GPS position data 212. In addition, GPS receiver 210 can determine the amount of uncertainty in the calculation that is output as the GPS data quality 216. In the event that the GPS receiver 210 loses lock or otherwise receives insufficient signal from enough satellites to generate a GPS of even minimal accuracy, a minimum value of the GPS data quality 216 can be assigned. A transmit indicator 238 is generated when a wireless transceiver section such as a wireless telephone receiver, wireless LAN transceiver or other wire transceiver transmits by generating an outbound RF signal from an outbound symbol stream. A minimum value of the GPS data quality 216 can also be assigned when the transmit indicator 238 is asserted, and the when the transmit indicator is deasserted, the calculated GPS data quality can be used as GPS data quality 216.

It should be noted that the GPS data quality 216 can include a binary value that has a first value that indicates the quality of the GPS data is greater than some minimum quality and a second value that indicates that either the transmit indicator 238 has been asserted or that the data quality is otherwise below some minimum value due to poor signal strength, loss of satellite reception, etc. Further, the GPS data quality 216 can be a multi-valued signal, that includes separate indications of signal quality including multiple quality levels, with or without a separate transmission indication.

In operation, the GPS position data 212 is weighted with a first weighting factor when the wireless transceiver section is generating the outbound RF signal to produce first weighted GPS position data. In addition, the GPS position data is weighted with a second weighting factor when the wireless telephone transceiver section is not generating the outbound RF signal to produce second weighted GPS position data, wherein the first weighting factor is less than the second weighting factor. Position information 186 is generated based on at least one of the first and second weighted GPS position data.

In an embodiment, a sample and hold module 180 stores a prior value of the GPS position data 212. When the transmit indicator 238 is deasserted and the GPS data quality 216 indicates an acceptable level of accuracy, weight module 184 weights the GPS position data 212 by a weighting factor that is one or substantially one and the output of the sample and hold module 180 is weighted by a weighting factor that is zero or substantially zero. In this case, the position information 186 is equal to or substantially the GPS position data 212. When the transmit indicator 238 is asserted as reflected in a minimum value of GPS data quality 216 or other indication, the value of the prior GPS position data is held—frozen at the last value before the transmit indicator was asserted or the last position that is known to include accurate position data. The weight module 184 weights the GPS position data by a weighting factor that is zero or substantially zero and the output of the sample and hold module 180 is weighted by a weighting factor that is one or substantially one. In this case, the position information 186 is equal to or substantially the prior GPS position data value held by the sample and hold module 180.

FIG. 13 is a graphical representation of position information determined in accordance with an embodiment of the present invention. In particular, an example of position information 186 is shown on a graph, in map/Cartesian coordinates, of position information that progresses from times $t_1$-$t_8$, corresponding to sample times or other discrete intervals used to generate and/or update position information 186. While the position information 186 is shown in two-dimensions, three-dimensional position data can likewise be generated.

The first three times $t_1$-$t_3$, position data is derived from GPS position data such as GPS position data 212. In this example, transmit indicator 238 is asserted for times $t_4$-$t_5$. At time $t_4$, the GPS position data may be unreliable or inaccurate. In response to the assertion of the transmit indicator 238, the sample and hold module 180 holds the GPS position data 212 from time $t_3$ and the weighting module adjusts the weighting, so that the position information 186 for time $t_4$, and for the remaining duration of the time that transmit indicator 238 is asserted $t_5$ is equal to the prior GPS position data at time $t_3$. In this example, at time $t_6$, the GPS data quality 216 reflects unacceptable data quality, for instance due to the time required for the GPS receiver 210 to recover from the dropout caused by transmission during the time period $t_4$-$t_5$. In this case, the sample and hold module 180 continues to holds the GPS position data 212 from time $t_3$ and the weighting module retains the weightings from time $t_4$-$t_5$ and the position information 186 at time $t_6$ is also equal to the prior GPS position data at time $t_3$. At time $t_7$ and $t_8$, when the transmit indicator 238 is deasserted, and the GPS position data again becomes reliable, the GPS position data is used to generate the position information.

FIG. 14 is a schematic block diagram of a GPS receiver 210 used to generate position in accordance with an embodiment of the present invention. In this embodiment, GPS receiver 210, such as GPS receiver 77, 77' or multi-mode receiver 73 generates position information 186 that can be used by communication devices 10, 30, 30' and/or 117 to generate gaming data 66, to control its own operation or to otherwise send to remote devices such as access point 110, a base station, telephone network or system, etc. In particular, GPS velocity data is generated by difference module 214 based on the difference between successive samples of GPS position data 212. This GPS velocity data is held by sample and hold module 181 and used to estimate future positions based on the last know position and the last know velocity in the case of a dropout caused by either the assertion of the transmit indicator 238 or an otherwise unacceptable GPS data quality 216. In particular, in case of a dropout, prior GPS position data 216 is held by sample and hold module 180 and used as the initial condition for integrator 190. Prior GPS velocity data held by sample and hold module 181 is integrated during a dropout to form estimated position data that is weighted with a 1 during a dropout, while the GPS position data is weighted zero to form position information 192. After a dropout ceases and accurate GPS data 212 returns, the weighting module weights the GPS position data 212 with a 1 and the estimated position data with a zero to form position information 192.

In an embodiment of the present invention, motion data generation module 55 is implemented via sample and hold modules 180 and 181, difference module 214, integrator 190 and weighting module 184 that can be implemented in hardware, software or firmware using a processor such as processing module 225 or other processing elements.

FIG. 15 is a graphical representation of position information determined in accordance with an embodiment of the present invention. In particular, an example of position information 192 is shown on a graph, in map/Cartesian coordinates, of position information that progresses from times $t_1$-$t_8$, corresponding to sample times or other discrete intervals used to generate and/or update position information 192. While the position information 192 is shown in two-dimensions, three-dimensional position data can likewise be generated.

The first three times, position data is derived from GPS position data such as GPS position data 212. In this example, transmit indicator 238 is asserted for times $t_4$-$t_5$. At time $t_4$, the GPS position data may be unreliable or inaccurate. In response to the assertion of the transmit indicator 238, the sample and hold module 180 holds the GPS position data 212 from time $t_3$ and the sample and hold 181 holds the velocity at $t_3$ to form an estimated velocity vector. The integrator 190 generates estimated position data at times $t_4$-$t_6$ based on the position and velocity at time at time $t_3$. The weighting module adjusts the weighting for time $t_4$, and for the remaining duration of the time that transmit indicator 238 is asserted and the dropout condition further persists, so that the estimated position data is weighted and the GPS position data 212 is deweighted in determining position information 192. At time $t_7$ and $t_8$, when the transmit indicator 238 is deasserted and the GPS position data again becomes reliable, the GPS position data 212 is used to generate the position information.

FIG. 16 is a schematic block diagram of a gyrating circuit 200 and GPS receiver 210 used to generate position and velocity information in accordance with an embodiment of the present invention. In this embodiment, gyrating circuit 200, such as motion sensor 175 and GPS receiver 210, such as GPS receiver 77, 77' or multi-mode receiver 73 cooperate to generate position information 230 and velocity information 232 that can be used by communication devices 10, 30, 30' and/or 117 to generate gaming data 66, to control its own operation or otherwise to send to remote devices such as access point 110, a base station, telephone network or system, etc.

In particular, an embodiment of motion data generation module 55 is shown where GPS receiver 210 generates GPS position data and GPS data quality signal 216 that includes or is otherwise based on transmit indicator 238 as previously discussed in conjunction with FIGS. 12-15. At the same time, gyrating circuit 200 generates a motion vector 202 that is integrated by integrator 204 based on an initial condition 208 that is either its own prior estimated position data 206 or the prior GPS position data 212. By adding the motion vector 202 to the prior position, new estimated position data 206 can be generated.

In this embodiment, the GPS data quality 216 is compared with a value, such as quality threshold 218 that corresponds to a level of quality that is roughly on par with accuracy of position information that can be estimated using the gyrator circuit 200. If the GPS data quality 216 compares favorably to the quality threshold, the position information 230 is selected by multiplexer 222 as the GPS position data 212 in response to the selection signal 215 from comparator 217. When the GPS data quality 216 compares unfavorably to the quality threshold 218, such as during a dropout condition and/or a time when transmit indicator 238 is asserted, the selection signal 215 from comparator 217 selects the position information 230 from the estimated position data 206. The estimated position data 206 is initially generated from the prior (good) value of the GPS position data 212 (delayed by delay 221) and the current motion vector 202. If the dropout condition persists, the integrator 204 generates new estimated position data 206 based on the current motion vector 202 and the prior estimated position 206, as selected by multiplexer 220 in response to selection signal 215. While an integrator 204 is shown in this configuration, low-corner frequency low-pass filters, integrators with additional filtration and/or other filter configurations could likewise be employed. For instance, estimated position data 206 can be generated based on a filtered difference between current motion vector values and either past GPS position data 212 or past estimated position data 206, to provide more accurate estimates, to reject noise and/or to otherwise smooth the estimated position data 206.

In a similar fashion, velocity information 232 is generated either from the gyrating circuit 200 or from the GPS receiver 210. In particular, when the GPS data quality 216 compares favorably to quality threshold 218, velocity information 232 is selected from a difference module 214 that generates a velocity from the difference between successive values of the GPS position data 212. If however, the GPS data quality 216 compares unfavorably to the quality threshold 218, the velocity information 232 is selected instead from the motion vector 202.

While shown in a schematic block diagram as separate modules, the integrator 204, difference module 214, comparator 217, and multiplexers 220, 222, and 224 can likewise be implemented as part of processing module 225 either in hardware, firmware or software.

FIG. 17 is a graphical representation of position information determined in accordance with an embodiment of the present invention. In particular, position information 230 is shown that shows a graph, in map/Cartesian coordinates, of position information that progresses from times $t_1$-$t_8$, corresponding to sample times or other discrete intervals used to generate and/or update position information 230. While the position information 230 is shown in two-dimensions, three-dimensional position data can likewise be generated.

The first three times, position data is derived from GPS position data such as GPS position data 212. The velocity information, as shown for this interval, is GPS velocity data that is derived by the difference between the GPS position data. In this example, a GPS signal dropout covers times $t_4$-$t_6$ due to poor signal quality, the assertion of transmit indicator 238, etc. At time $t_4$, the GPS position data may be unreliable or inaccurate, so the new position is estimated position data that is generated from the prior GPS position data at time $t_3$, and updated by the current motion vector, such as motion vector 202 from the gyrating circuit. At times $t_5$ and $t_6$, the GPS position data still may be unreliable or inaccurate, so the new position is estimated position data that is generated from the prior GPS position data (in this case prior estimated positions), updated by the current motion vector. At time $t_7$ and $t_8$, when the GPS position data again becomes reliable, the GPS position data is used to generate the position information.

FIG. 18 is a schematic block diagram of a gyrating circuit 200 and GPS receiver 210 used to generate position and velocity information in accordance with another embodiment of the present invention. In particular, an embodiment of motion data generation module 55 is shown that includes similar elements from FIG. 17 that are referred to by common reference numerals. In this embodiment however, data from the gyrating circuit 200 and GPS receiver 210 are blended, based on the GPS data quality 216. In particular, weighting modules 240, 242, and 244 are provided that form the position information 230, the velocity information 232 and the initial condition 208 based on a weighted average of the GPS and gyrator produced values, wherein the weighting coefficients are dynamically chosen based on the GPS data quality 216.

For instance, for the value of the GPS data quality 216 corresponding to the highest accuracy GPS data and the transmit indicator 238 is deasserted, the weighting coefficients can be chosen to maximize the weight of the GPS position 212, and to minimize the weight of the estimated position data 206 in calculating the initial condition 208 and the position information 230 and further to maximize the weight of the GPS velocity data 224, and to minimize the weight of the motion vector 202 in calculating the velocity information 232. Further, for the value of the GPS data quality corresponding to the lowest accuracy GPS data (including a dropout condition, and/or a time when transmit indicator 238 is asserted), the weighting coefficients can be chosen to minimize the weight of the GPS position 212, and to maximize the weight of the estimated position data 206 in calculating the initial condition 208 and the position information 230 and further to minimize the weight of the GPS velocity data 224, and to maximize the weight of the motion vector 202 in calculating the velocity information 232. Also, for intermediate values of the GPS data quality 216, intermediate weighting values could be used that blend the GPS data with the data derived from the gyrating circuit to generate more robust estimates of these values.

FIG. 19 is a schematic block diagram of an embodiment of RF transceiver 135 and GPS receiver 187 in accordance with the present invention. The RF transceiver 135, such as transceiver 75 includes an RF transmitter 139, and an RF receiver 137. The RF receiver 137 includes a RF front end 140, a down conversion module 142 and a receiver processing module 144. The RF transmitter 139 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound data 162 that includes non-realtime data or real-time data including gaming data in a gaming mode of operation, from a host device, such as communication device 10 or other source via the transmitter processing module 146. The transmitter processing module 146 processes the outbound data 162 in accordance with a particular wireless communication standard that can include a cellular data or voice protocol, a WLAN protocol, piconet protocol or other wireless protocol such as IEEE 802.11, Bluetooth, RFID, GSM, CDMA, et cetera) to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation 168.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152, that may include display data, other gaming data of other real-time or non-real-time data, via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156 that includes a inbound symbol stream. Note that the ordering of the ADC module and filtering and/or gain module may be switched, such that the filtering and/or gain module is an analog module.

The receiver processing module 144 processes the baseband or low IF signal 156 in accordance with a particular wireless communication standard that can include a cellular data or voice protocol, a WLAN protocol, piconet protocol or other wireless protocol such as IEEE 802.11, Bluetooth, RFID, GSM, CDMA, et cetera) to produce inbound data 160 that can include non-realtime data, realtime data an control data. The processing performed by the receiver processing module 144 can include, but is not limited to, digital intermediate frequency to baseband conversion, demodulation, demapping, depuncturing, decoding, and/or descrambling.

GPS receiver 187, such as GPS receiver 77, includes an RF front-end 140' and down conversion module 142' that operates in a similar fashion to the modules described in conjunction with RF receiver 137, however, to receive and convert GPS RF signals 143 into a plurality of down converted GPS signals 159. Note that the GPS RF signals 143 may be one or more of: an L1 band at 1575.42 MHz, which includes a mix of navigation messages, coarse-acquisition (C/A) codes, and/or encryption precision P(Y) codes; an L2 band at 1227.60 MHz, which includes P(Y) codes and may also include an L2C code; and/or an L5 band at 1176.45 MHz. Further note that the GPS RF signals 143 can include an RF signal from a plurality of satellites (e.g., up to 20 different GPS satellites RF signals may be received). GPS processing module 144' operates on the down converted signal 159 to generate GPS data 163, such as GPS position data 212 and GPS data quality signal 216 and/or other GPS data.

Processing module 225 includes circuitry, software and/or firmware that generates transmit indicator 238 that is either used internally for supplied to GPS processing module 144', and motion data, such as motion data 113, position information 186, 192, 230, and/or velocity information 232, from motion parameters 161, such as motion vector 202 and GPS data 163, such as GPS position data 212. As previously described, processing module 225 optionally includes this motion data in outbound data 162 to be transmitted to a remote station such as access point 110, base station, telephone network, etc. In an embodiment of the present invention, the processing module 225 includes circuitry as described in conjunction with previous embodiments and/or other hardware, software or firmware.

In addition processing module 225 optionally includes circuitry, software and/or firmware that generates control signals 141 from either the motion data or control data, such as control data 115, received in inbound data 160 from a remote station such as access point 110. In operation, processing module 225 generates control signals 141 to modify the transmit and/or receiver parameters of the RF transceiver 125 such as the protocol parameters or protocols used by receiver processing module 144 and transmitter processing module 146, antenna configurations used by antenna interface 171 to set the beam pattern, gain, polarization or other antenna configuration of the antenna, transmit power levels used by radio transmitter front-end 150 and receiver parameters, such as receiver sensitivity used by RF front-ends 140 and 140' of the RF receiver 137 and the GPS receiver 187.

In an embodiment of the present invention, processing module 225 includes a look-up table, software algorithm, or circuitry that generates the desired control signals 141 based on the particular motion data or control data. In this fashion, the processing module 225 can operate adjust a receive parameter based on the receive control signal, such as a receiver sensitivity, a protocol selection, a data rate, a packet length, a data payload length, a coding parameter, a contention period, and/or a back-off parameter. Further, the processing module can operate to modify an in-air beamforming phase, a diversity antenna selection, an antenna gain, a polarization antenna selection, a multi-input multi-output (MIMO) antenna structure, and/or a single-input single-output (SISO) antenna structure of the antenna 171. In addition, the processing module 225 can operate to adjust a transmit parameter such as a transmit power, a protocol selection, a data rate, a packet length, a data payload length, a coding parameter, a contention period, and a back-off parameter.

In addition, processing module 225 can optionally access a look-up table, algorithm, database or other data structure that includes a list or data sufficient to define one or more restricted areas where either the operation of the communication device 10, 30, 30', or 117 is prohibited or the communication device 10, 30, 30', 117 or 125 is not permitted to transmit. The restricted areas could correspond to hospitals, airplanes in the air, security areas or other restricted areas. When the position information corresponds to one of these restricted areas, the RF transceiver 137 or just the RF transmitter 127 could be disabled by processing module 225 via one or more control lines 141 in accordance with the corresponding restriction in place for this particular restricted area.

In an embodiment of the present invention, receiver processing module 144, GPS processing module 144' and transmitter processing module 146 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the these processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 144, GPS processing module 144', transmitter processing module 146, and processing module 225 are shown separately, it should be understood that these elements could be implemented separately, together through the operation of one or more shared processing devices or in combination of separate and shared processing.

FIG. 20 is a schematic block diagram of an embodiment of RF transceiver 135' and with multi-mode receiver 137' in accordance with the present invention. In particular, RF transceiver 135' includes many similar elements of RF transceiver 135 that are referred to by common reference numerals. However, RF receiver 137' operates as a multi-mode device, combining the functionality of RF receiver 137 and GPS receiver 187 to produce inbound data/GPS data 160'' as either inbound data 160 (in a either telephony mode or gaming mode) or GPS data 163 (in either telephony mode, gaming mode or GPS mode). In this fashion, RF front end 140'' and down conversion module 142'' can be configured based one of the control signals 141 to operate as either RF front end 140 and down conversion module 142 to receive and down convert inbound RF signal 153 or as RF front end 140' and down conversion module 142' to receive and convert inbound GPS signal 143 as described in conjunction with FIG. 10.

In addition receiver processing module 144" further includes the functionality of receiver processing module 144 and additional GPS processing functionality of GPS processing module 144' to similarly operate based on the selected mode of operation.

FIG. 21 is a side view of a pictorial representation of an integrated circuit package in accordance with an embodiment of the present invention. RF IC 330, such as RF IC 50 or 70, includes a gyrator die 314 with a gyrating circuit such as motion sensor 175 and an RF system on a chip (SoC) die 312 that includes the remaining elements of RF IC 50, 70 or 70', a substrate 306, and bonding pads 318. This figure is not drawn to scale, rather it is meant to be a pictorial representation that illustrates the juxtaposition of the RF SoC die 312, gyrator die 314 and the substrate 306. RF SoC die 312 and gyrator die are coupled to one another and to respective ones of the bonding pads 318 using bonding wires, bonding pads and/or by other connections.

FIG. 22 is a side view of a pictorial representation of an integrated circuit package in accordance with an embodiment of the present invention. RF IC 332 is similar to the configuration described in conjunction with FIG. 21 is presented with similar elements referred to by common reference numerals. In particular, alternate stacked configuration is shown that stacks gyrator die 314 on top of RF SoC die 312. In this configuration, RF SoC die 312 and gyrator die 314 can be coupled to one another using bonding wires, bonding pads, conductive vias and/or by other connections. This figure is also not drawn to scale.

FIG. 23 is a side view of a pictorial representation of an integrated circuit package in accordance with an embodiment of the present invention. RF IC 334 is similar to the configuration described in conjunction with FIGS. 21 and 22 with similar elements referred to by common reference numerals. In this particular configuration, motion sensor 175 is included on RF SoC die 316 that includes the remaining components or RF IC 50, 70 or 70'. This figure is also not drawn to scale.

FIG. 24 is a side view of a pictorial representation of an integrated circuit package in accordance with the present invention. RF IC 325, such as RF IC 50, 70 or 70', includes a system on a chip (SoC) die 300, a memory die 302 a substrate 306, bonding pads 308 and gyrator 304, such as motion sensor 175. This figure is not drawn to scale. In particular, the RF IC 325 is integrated in a package with a top and a bottom having a plurality of bonding pads 308 to connect the RF IC 325 to a circuit board, and wherein the on-chip gyrator 304 is integrated along the bottom of the package. In an embodiment of the present invention, die 302 includes an on-chip memory and die 300 includes the processing module 225 and the remaining elements of RF IC 50, 70 or 70'. These dies are stacked and die bonding is employed to connect these two circuits and minimize the number of bonding pads, (balls) out to the package. Both SoC die 300 and memory die 302 are coupled to respective ones of the bonding pads 308 via bonding wires or other connections.

Gyrator 304 is coupled to the SoC die 300, and/or the memory die 302 via conductive vias, bonding wires, bonding pads or by other connections. The positioning of the Gyrator on the bottom of the package in a flip chip configuration allows good heat dissipation of the gyrator 304 to a circuit board when the RF integrated circuit is installed.

FIG. 25 is a bottom view of a pictorial representation of an integrated circuit package in accordance with the present invention. As shown, the bonding pads (balls) 308 are arrayed in an area of the bottom of the integrated circuit with an open center portion 310 and wherein the on-chip gyrator 304 is integrated in the open center portion. While a particular pattern and number of bonding pads 308 are shown, a greater or lesser number of bonding pads can likewise be employed with alternative configurations within the broad scope of the present invention.

While RF ICs 325, 330, 332 and 334 provide several possible implementations of RF ICs in accordance with the present invention, other circuits including other integrated circuit packages can be implemented including other stacked, in-line, surface mount and flip chip configurations.

FIG. 26 is a schematic block diagram of an overhead view of an embodiment of a gaming system that includes a game console and a gaming object. A video display 598 is shown that can be coupled to game console 600, such as game device 115 or 115', to display video generated by game console 600 in conjunction with the set-up and playing of the game and to provide other user interface functions of game console 600. It should also be noted that game console 600 can include its own integrated video display that displays, either directly or via projection, video content in association with any of the functions described in conjunction with video display 598.

The gaming system has an associated physical area in which the game console and the gaming object are located. The physical area may be a room, portion of a room, and/or any other space where the gaming object and game console are proximally co-located (e.g., airport terminal, at a gaming center, on an airplane, etc.). In the example shown the physical area includes desk 592, chair 594 and couch 596.

In an embodiment of the present invention, the gaming object 610 can be implemented using communication device 117 operating in the gaming mode of operation, or via another wireless game controller and/or any object used or worn by the player to facilitate play of a video game. For example, the gaming object 610 can, in the context of a game, simulate the actions of sword, a gun, a helmet, a vest, a hat, shoes, socks, pants, shorts, gloves, a sporting good, such as a bat, racquet, paddle of other object. In this system, the game console 600 determines the positioning of the gaming object 610 within the physical area based on motion data transmitted to the game console 600, such as position information, velocity information of other motion data included in gaming data 66. Once the gaming object 610's position is determined, the game console 600 tracks the motion of the gaming object to facilitate video game play. In this embodiment, the game console may determine the positioning of the gaming object 610 within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds) based on gaming data generated in response to the actions of a user in the form of position data. The gaming object 610 can include a joystick, touch pad, wheel, one or more buttons and/or other user interface devices that generates other gaming data 66 that includes other user data in response to the actions of a user that is further transmitted to the game console 600 as gaming data 66.

In operation, the gaming object 610 and gaming console 600 communicate gaming data 66 via wireless transceivers such as the wireless telephony transceivers discussed in conjunction with FIG. 4.

FIG. 27 is a schematic block diagram of a side view of an embodiment of a gaming system of FIG. 1. In particular, a user 606 is represented schematically as holding a particular gaming object 610 in his or her hand or hands. Data 599, such as gaming data 66, is generated by the gaming object 610 and communicated via a wireless communication path with the game console 600. The data 599 can include user selections, commands, motion data indicating the position, orientation, and/or motion of the gaming object 610 or other user data that is generated based on the actions of the user in conjunction with the playing, and set-up of a particular game, and/or the user's other interactions with the game console 600.

Game console 600 includes an interface module 632 for coupling to the gaming object 610. In particular, interface module 632 includes a transceiver 630, such as a wireless telephony transceiver, for receiving data 599, such as gaming data 66, transmitted from gaming object 610 and for optionally transmitting other data 599, such as display data 68 or other data back to gaming object 610. Game console 600 further includes a memory 624 and processor 622 that are coupled to interface module 632 via a bus 625.

Network interface 627 provides a coupling to a network, such as network 119 as discussed in conjunction with FIGS. 4-8. In particular, network interface itself can be used to transceive data such as gaming data 66 and/or display data 68 with the gaming object 610 or a remote display device, and further to communicate authentication data, download game applications, run remote game applications, etc.

In operation, processor 622 executes one or more routines such as an operating system, utilities, and one or more applications such as video game applications or other gaming applications that operate based on data 599 received from gaming object 610, that generate data 599 for transmission to gaming object 610, and that produce video information such as display data 68. In addition, such video information can be converted to display signal via driver 626, such as a signal generation module or other video processor for use by an integrated display device or a display device coupled to game console 600 via an optional display port, such as a video connector, component video port, S-video connector, parallel or serial video port, HDMI port or other video port.

Processor 622 can include a dedicated or shared processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 624 can be a single memory device or a plurality of memory devices. Such a memory device may be a read-only memory, random access memory, volatile memory, non-volatile memory, static memory, dynamic memory, flash memory, and/or any device that stores digital information. Note that when the processor 622 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is shown, alternative bus architectures including architectures having two or more buses or direct connectivity between the various modules of game console 600, can likewise be employed within the broad scope of the present invention.

FIG. 28 is a schematic block diagram of an overhead view of another embodiment of a gaming system that includes a game console, a plurality of players and a plurality of gaming objects. In this instance, interface module 632 of game console 600 communicates data 599 and similar data 599', such as gaming data 66 and display data 68, with both gaming object 610 and gaming object 610'. In an embodiment of the present invention, game console 600 operates on a separate frequency for each device, however, other multiple access techniques can likewise be employed.

FIG. 29 is a schematic block diagram of a side view of another embodiment of a gaming system that includes remote motion sensing devices that can be implemented in conjunction with a single user/player. In this embodiment, the gaming object 611 communicates with remote motion sensing devices 640 that can be embodied as a helmet, a shirt, pants, gloves, and socks, that incorporated in a wearable housing, that otherwise can be attached a user's body, or that otherwise can be coupled to track the motion of a portion of the user's body. Each of the remote motion sensing devices 640 generates motion signals that are sent to gaming object 610 for use in the generation of motion data via, for instance, a motion data generation module 55. In this embodiment, the positioning of the remote motion sensing devices 640 can be determined within a positioning tolerance (e.g., within a meter) at a positioning update rate (e.g., once every second or once every few seconds) with the motion tracked within a motion tracking tolerance (e.g., within a few millimeters) at a motion tracking update rate (e.g., once every 10-100 milliseconds) within a position and motion tracking area that is range of a separate transceiver, such as an RFID transceiver, incorporated in gaming object 610.

In one mode of operation, the gaming object 610 sends one or more RF signals on a continuous basis and reads the motion signals generated by each of the remote motion sensing devices 640 periodically (e.g., once every 10-100 milliseconds) to update the positioning of remote motion sensing devices 640. In another mode of operation, the gaming object 610 sends one or more RF signals periodically (e.g., once every 10-100 milliseconds) and reads the motion signals generated by each of the remote motion sensing devices 640 only when required to update the positioning of the remote motion sensing devices 640.

FIGS. 30-32 are diagrams of an embodiment of a coordinate system of a localized physical area that may be used for a gaming system. In these figures an xyz origin is selected to be somewhere in the localized physical area and each point being tracked and/or used for positioning on the player and/or on the gaming object 610 is determined based on its Cartesian coordinates (e.g., $x_1$, $y_1$, $z_1$). As the player and/or gaming object moves, the new position of the tracking and/or positioning points are determined in Cartesian coordinates with respect to the origin.

FIG. 33 is a block diagram representation of a gaming system in accordance with an embodiment of the present invention that includes communication device 117 and at least one remote motion sensing device 526, such as remote motion sensing devices 640. Remote motion sensing device 526 includes a motion sensor 520 for generating motion signals 522 in response to the motion of a user, such as user 606. Motion sensor 520 can include an on-chip gyrator or accelerometer or other position or motion sensing device along with other driver circuitry for generating motion signals 522 based on the actions of the user 606.

Transceiver 524 sends the motion signals to communication device 117. In an embodiment of the present invention, transceiver 524 can be implemented via a RFID tag that is coupled to receive an RF signal 528 initiated by communication device, such as a 60 GHz RF signal or other RF signal. In a similar fashion to a passive RFID tag, transceiver 524 converts energy from the RF signal 528 into a power signal for powering the transceiver 524 or all or some portion of the remote motion sensing device 526. By the remote motion sensing device 526 deriving power, in whole or in part, based on RF signal 528, the remote motion sensing device 526 can optionally be portable, small and light. Transceiver 524 conveys the motion signals 522 back to the communication device 117 by backscattering the RF signal 528 based on the motion signals 522.

FIG. 34 is a schematic block diagram of another embodiment of an integrated circuit in accordance with the present invention. In particular, FIG. 34 presents a communication device 10', such as communication device 117, that includes many common elements of FIGS. 9-11 that are referred to by common reference numerals. RF IC 50' is similar to RF IC 50 and is capable of any of the applications, functions and features attributed to RF ICs 50 and 70 as discussed in conjunction with FIGS. 1-10. However, RF IC 70' includes a receiver, such as an RFID reader or other receiver or transceiver 79 that receives motion signals, such as motion signals 522 carried by RF signal 528 from at least one remote motion sensing device 526. In an embodiment of the present invention the antenna and antenna interface 74' can include an off-chip near field coil, however, an on-chip near-field coil can likewise be implemented.

In operation, motion data generation module 55 generates motion data based on the motion signals 522, and optionally based further on GPS position data generated by multi-mode transceiver/GPS receiver 73. For instance, motion data generation module 55 can generate motion data that is based on one or more motion vectors that are based on the motion signals and further based on a reference position based on the GPS position data.

This motion data can be transmitted to a game device, such as game device 115, 115' or game console 600 when communication device 10' is in a gaming mode of operation. It should be noted that the transmitted motion data can further include motion data generated by motion data generation module 55 that represents the motion of communication device 10', based on GPS position data and/or data from motion sensor 175.

While the transceiver 79 has been incorporated in RF IC 50 to form the design of RF IC 50', RF ICs 70 and 70' can be modified in a similar fashion to include transceiver 79.

FIG. 35 is a schematic block diagram of an embodiment of an RFID reader and an RFID tag. In particular, RFID reader 705 represents a particular implementation of transceiver 79 of communication device 117. In addition, RFID tag 735 represents a particular implementation of transceiver 526 of remote motion sensing device 526. As shown, RFID reader 705 includes a protocol processing module 40, an encoding module 542, an RF front-end 546, a digitization module 548, a predecoding module 550 and a decoding module 552, all of which together form components of the RFID reader 705. RFID 705 optionally includes a digital-to-analog converter (DAC) 544.

The protocol processing module 540 is operably coupled to prepare data for encoding in accordance with a particular RFID standardized protocol. In an exemplary embodiment, the protocol processing module 540 is programmed with multiple RFID standardized protocols to enable the RFID reader 705 to communicate with any RFID tag, regardless of the particular protocol associated with the tag. In this embodiment, the protocol processing module 540 operates to program filters and other components of the encoding module 542, decoding module 552, pre-decoding module 550 and RF front end 546 in accordance with the particular RFID standardized protocol of the tag(s) currently communicating with the RFID reader 705. However, if the remote motion sensing devices 526 each operate in accordance with a single protocol, and the RFID reader is not used by communication device 117 for other purposes, such as conditional access, payment transaction, etc, this flexibility can be omitted.

In operation, once the particular RFID standardized protocol has been selected for communication with one or more RFID tags, such as RFID tag 735, the protocol processing module 540 generates and provides digital data to be communicated to the RFID tag 735 to the encoding module 542 for encoding in accordance with the selected RFID standardized protocol. This digital data can include commands to power up the RFID tag 735, to read motion data or other commands or data used by the RFID tag in association with its operation. By way of example, but not limitation, the RFID protocols may include one or more line encoding schemes, such as Manchester encoding, FM0 encoding, FM1 encoding, etc. Thereafter, in the embodiment shown, the digitally encoded data is provided to the digital-to-analog converter 544 which converts the digitally encoded data into an analog signal. The RF front-end 546 modulates the analog signal to produce an RF signal at a particular carrier frequency that is transmitted via antenna 560 to one or more RFID tags, such as RF ID rag 735. The antenna 560 can include a near-field coil that is either implemented on RFIC 50' or is located off-chip.

The RF front-end 546 further includes transmit blocking capabilities such that the energy of the transmitted RF signal does not substantially interfere with the receiving of a backscattered or other RF signal received from one or more RFID tags via the antenna 560. Upon receiving an RF signal from one or more RFID tags, the RF front-end 546 converts the received RF signal into a baseband signal. The digitization module 548, which may be a limiting module or an analog-to-digital converter, converts the received baseband signal into a digital signal. The predecoding module 550 converts the digital signal into an encoded signal in accordance with the particular RFID protocol being utilized. The encoded data is provided to the decoding module 552, which recaptures data, such as motion signals 522 therefrom in accordance with the particular encoding scheme of the selected RFID protocol. The protocol processing module 540 processes the recovered data to identify the object(s) associated with the RFID tag(s) and/or provides the recovered data to the processor 225.

The processing module 540 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 540 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

RFID tag 735 that includes a power generating circuit 740, an oscillation module 744, a processing module 746, an oscillation calibration module 748, a comparator 750, an envelope detection module 752, a capacitor C1, and a transistor T1. The oscillation module 744, the processing module 746, the oscillation calibration module 748, the comparator 750, and the envelope detection module 752 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 744, 746, 748, 750, 752 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the modules 744, 746, 748, 750, 752 implement one or more of their functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

In operation, the power generating circuit 740 generates a supply voltage ($V_{DD}$) from a radio frequency (RF) signal that is received via antenna 754. The power generating circuit 740 stores the supply voltage $V_{DD}$ in capacitor C1 and provides it to modules 744, 746, 748, 750, 752.

When the supply voltage $V_{DD}$ is present, the envelope detection module 752 determines an envelope of the RF signal, which includes a DC component corresponding to the supply voltage $V_{DD}$. In one embodiment, the RF signal is an amplitude modulation signal, where the envelope of the RF signal includes transmitted data. The envelope detection module 752 provides an envelope signal to the comparator 750. The comparator 750 compares the envelope signal with a threshold to produce a stream of recovered data.

The oscillation module 744, which may be a ring oscillator, crystal oscillator, or timing circuit, generates one or more clock signals that have a rate corresponding to the rate of the RF signal in accordance with an oscillation feedback signal. For instance, if the RF signal is a 900 MHz signal, the rate of the clock signals will be n*900 MHz, where "n" is equal to or greater than 1.

The oscillation calibration module 748 produces the oscillation feedback signal from a clock signal of the one or more clock signals and the stream of recovered data. In general, the oscillation calibration module 748 compares the rate of the clock signal with the rate of the stream of recovered data. Based on this comparison, the oscillation calibration module 748 generates the oscillation feedback to indicate to the oscillation module 744 to maintain the current rate, speed up the current rate, or slow down the current rate.

The processing module 746 receives the stream of recovered data and a clock signal of the one or more clock signals. The processing module 746 interprets the stream of recovered data to determine a command or commands contained therein. The command may be to store data, update data, reply with stored data, verify command compliance, generate motion data that carries motion signals 522 from motion sensor 520, send an acknowledgement, etc. If the command(s) requires a response, the processing module 746 provides a signal to the transistor T1 at a rate corresponding to the RF signal. The signal toggles transistor T1 on and off to generate an RF response signal that is transmitted via the antenna. In one embodiment, the RFID tag 735 utilizing a back-scattering RF communication. Note that the resistor R1 functions to decouple the power generating circuit 740 from the received RF signals and the transmitted RF signals.

The RFID tag 735 may further include a current reference (not shown) that provides one or more reference, or bias, currents to the oscillation module 744, the oscillation calibration module 748, the envelope detection module 752, and the comparator 750. The bias current may be adjusted to provide a desired level of biasing for each of the modules 744, 748, 750, and 752.

FIG. 36 is a diagram of another method for determining position and/or motion tracking that begins in step 1300 by determining a reference point within a coordinate system. The reference point may be the origin or any other point within the localized physical area. In particular, the reference point can be the location of the game console 600, the location of the game object 610 at a particular time, such as a set-up time, or the location of one of a plurality of remote motion sensing devices 526, however, other reference points can likewise be used.

The method continues in one or more branches. Along one branch, a vector with respect to the reference point is determined to indicate the player's initial position based on the reference point as shown in step 1302. This branch continues by updating the player's position to track the player's motion based on user data as shown in step 1304.

The other branch includes determining a vector with respect to the reference point for the gaming object 610 and/or the remote motion sensing devices 526 to establish their initial position as shown in step 1306. This branch continues by updating the motion data to track the gaming object's or player's motion as shown in step 1308. Note that the rate of tracking the motion of the player and/or gaming object may be done at a rate based on the video gaming being played and the expected speed of motion. Further note that a tracking rate of 10 milliseconds provides 0.1 mm accuracy in motion tracking.

FIG. 37 is a diagram of another method for determining position and/or motion tracking that begins in step 1310 by determining the coordinates of the player's, or players', position in the physical area. The method then continues by determining the coordinates of a gaming object's initial position as shown in step 1312. Note that the positioning of the gaming object may be used to determine the position of the player(s) if the gaming object is something worn by the player or is close proximity to the player. Alternatively, the initial position of the player may be used to determine the initial position of the gaming object. Note that one or more of the plurality of positioning techniques described herein may be used to determine the position of the player and/or of the gaming object.

The method then proceeds by updating the coordinates of the player's, or players', position in the physical area to track the player's motion as shown in step 1314. The method also continues by updating the coordinates of a gaming object's position to track its motion as shown in step 1316. Note that the motion of the gaming object may be used to determine the motion of the player(s) if the gaming object is something worn by the player or is close proximity to the player. Alternatively, the motion of the player may be used to determine the motion of the gaming object. Note that one or more of the plurality of motion techniques described herein may be used to determine the position of the player and/or of the gaming object.

While described in terms of a gaming object, such as gaming object 610, the method above may likewise be employed to determine positions of the remote motion sensing devices 526.

FIG. 38 is a diagram of another method for determining position and/or motion tracking that begins in step 1320 by determining a reference point within the physical area in which the gaming object lays and/or in which the game system lays. The method then proceeds by determining a vector for a player's initial position with respect to a reference point of a coordinate system as shown in step 1322. As an example, if the physical area is a room, a point in the room is selected as the origin and the coordinate system is applied to at least some of the room.

The method then continues by determining a vector of a gaming object 610's initial position as shown in step 1324. Note that the positioning of the gaming object may be used to determine the position of the player(s) if the gaming object 610 is something worn by the player or is close proximity to the player. Alternatively, the initial position of the player may be used to determine the initial position of the gaming object 610. Note that one or more of the plurality of positioning techniques described herein may be used to determine the position of the player and/or of the gaming object.

The method then proceeds by updating the vector of the player's, or players', position in the physical area to track the player's motion as shown in step 1326. The method also continues by updating the vector of the gaming object's position to track its motion as shown in step 1328. Note that the motion of the gaming object 610 may be used to determine the motion of the player(s) if the gaming object is something worn by the player or is close proximity to the player. Alternatively, the motion of the player may be used to determine the motion of the gaming object 610. Note that one or more of the plurality of motion techniques described herein may be used to determine the position of the player and/or of the gaming object.

While described in terms of a gaming object, such as gaming object 610, the method above may likewise be employed to determine positions of the remote motion sensing devices 526.

FIG. 39 is a schematic block diagram of a side view of another embodiment of a gaming system in accordance with the present invention. A gaming object 610' is provided that be implemented via gaming object 610, 611 or communication device 117 or via another gaming object that generates motion data 602 and that wirelessly transmits the motion data 602 to a game console 600' over a wireless communication path. Game console 600 can be similar to game console 600. The wireless communication path can be a implemented in accordance with one or more wireless telephony transceivers that operate in accordance with a wireless telephony protocol, via RFID communication, or via other wireless communications.

In this embodiment however, either the gaming object 610' or the game console 600' operates in accordance with a motion prediction model, for instance, that represents a biomechanical trajectory 800 of the user 606 or more specifically the user's body, during the playing of a game. The use of this motion prediction model can be used generate trajectory data that more accurately represents the motion of gaming object 610' or the body of user 606 with optionally less motion data 602 being communicated over the wireless communication path 604.

FIG. 40 is a block diagram representation of a gaming system in accordance with another embodiment of the present invention. In particular, a gaming system is shown that includes game console 600' and gaming object 610'. Gaming object 610' includes one or more motion sensors 616 for generating motion data, such as motion data 602 in response to the actions of a user, such as user 606. Motion sensor 616 can include an on-chip gyrator or accelerometer or other position or motion sensing device along with other driver circuitry for generating motion data 602 based on the actions of the user 606.

Transceiver 620 wireless transmits the motion data 602 to the transceiver 631 of game console 600'. Transceivers 620 and 631 can operate via a wireless telephony protocol when, for instance, gaming object 610' is implemented via communication device 117. However, or wireless communication paths cal likewise be used such as a Bluetooth communication interface or other short range communication path.

In an embodiment of the present invention an RFID communication path is employed where the transceiver 620 is coupled to receive an RF signal initiated by game console 600', such as a 60 GHz RF signal or other RF signal. In a similar fashion to a passive RFID tag, millimeter wave transceiver 620 converts energy from the RF signal into a power signal for powering the millimeter wave transceiver 620 or all or some portion of the gaming object 610'. By the gaming object 610' deriving power, in while or in part, based on RF signal, gaming object 610' can optionally be portable, small and light. In this embodiment, millimeter wave transceiver 620 conveys the motion data 602 back to the game console 600' by backscattering the RF signal based on motion data 102.

Game console 600' includes an interface module 632 for coupling to the gaming object 610'. In particular, interface module 632 includes a transceiver 631 or receiver that receives the motion data 602. As discussed above, transceiver 631 can be a millimeter wave transceiver that transmits an RF signal for powering the gaming object 610'. In this case, millimeter wave transceiver 631 demodulates the backscattering of the RF signal to recover the motion data 602.

Similar to game console 600, game console 600' includes a memory 624 and processor 622 that are coupled to interface module 632 via a bus 625. While not expressly shown, game console 600' can further include a network interface, such as network interface 627, that provides a coupling to a network, such as network 119 as discussed in conjunction with FIGS. 4-8. In particular, this network interface itself can be used to receive data such as motion data 602 or other gaming data, such as gaming data 66 from the gaming object 610', to send display data or other gaming data back to the gaming object 610' or a remote display device, and further to communicate authentication data, download game applications, run remote game applications, etc.

Game console 600' further includes a trajectory generation module 625 that generates trajectory data based on the motion data 602 and based on a motion prediction model provided by model generation module 635. As discussed in conjunction with FIG. 39, the motion prediction model represents a biomechanical trajectory of a user of the gaming object 610' in accordance with a game.

In an embodiment of the present invention, the model generation module 635 generates the motion prediction model based on a game selection signal from processor 622 that indicates which, of a plurality of games, has been selected and that is being executed. For instance, in a motion prediction model can operate to provide one or more biomechanical trajectories that correspond to the game being played. The trajectory generation module 625 can generate trajectory data that "fits" the motion data 602 based on this trajectory.

Consider an example where user 606 is playing a bowling game. The gaming object 610' is placed in his or her hand and is swung to simulate the throwing of the bowling ball. The gaming object 610' generates motion data 602 based on the motion of gaming object 610' during the simulated throw and sends the motion data 602 to the game console 600'. In this example, the motion prediction model can fit the motion data 602 to a trajectory that represents the user 606 throwing a bowling ball. In effect, the trajectory generation module 625 fits the model data 602 to one of a family of "bowling ball throw" trajectories having, for instance, different speeds, different angles, differing amounts of spin/curve. The trajectory model generation module 625 then generates the trajectory data based on either the selection of one of a discrete number of possible trajectories or the identification of particular trajectory parameters that describe a particular trajectory. The trajectory data can then be used by the processor 622 to generate a display signal 628 that shows the particular bowling ball throw on the screen and the resulting knocking down of pins (if any).

Consider a further example where user 606 is playing a tennis game. The gaming object 610' is placed in his or her hand and is swung to simulate the motion of the tennis racquet in stroking a tennis ball. The gaming object 610' generates motion data 602 based on the motion of gaming object 610' during the simulated motion and sends the motion data 602 to the game console 600'. In this example, the motion prediction model can fit the motion data 602 to a trajectory that represents the user 606 hitting the ball. In effect, the trajectory generation module 625 fits the model data 602 to one of a family of "tennis swings" trajectories having, for instance, forehand shots, backhand shots, drop shots, overhead shots, serves, etc. having different speeds, different angles, differing amounts of spin/curve. The trajectory model generation module 625 then generates the trajectory data based on either the selection of one of a discrete number of possible trajectories and/or the identification of particular trajectory parameters that describe a particular trajectory. The trajectory data can then be used by the processor 622 to generate a display signal 628 that shows the particular tennis shots on the screen.

While described above in the context of bowling and tennis, the model generation module 635 can operate to generate motion prediction models with the respect to a wider range of games that involve simulated combat, dancing, other sports, racing and other game activities where the motion data 602 can be used to generate trajectory data that is used in the execution of the gaming application to simulate the motion of the user 606. While the description above has focused on motion data 602 received from gaming object 610' derived from a single motion sensor 616, a plurality of motion sensors could likewise be employed to simulate more complex motion. Further, motion data 602 can be received from a gaming object 611 that collects motion signals from a plurality of remote motion sensing devices 640. In this fashion, more complex trajectories including multiple body parts of user 606 can be determined based on the motion data 602 to simulate a jump, throw, running, or other motion of the user's body in the context of one or more games.

In an embodiment of the present invention, the model generation module 635 generates a motion prediction model, such as a finite element model that corresponds to the position and/or motion of a plurality of body parts of user 606. In this fashion, trajectory data of the arms, legs, hands, head, etc. of the user 606 can be determined by trajectory generation module 625 based on motion data 602. In particular, motion data 602 corresponding to a plurality of remote motion sensing devices, such as remote motion sensing devices 526 associated with different portions of the body of user 606, can be fit to the motion prediction model of a body to simulate complex motion of the body in the context of one or more games.

In operation, processor 622 executes one or more routines such as an operating system, utilities, and one or more applications such as video game applications or other gaming applications that operate based on the trajectory data and optionally other gaming data received from gaming object 610', that optionally generate other data for transmission back to the gaming object 610', and produce video information, further based on the trajectory data, such as display data that can be converted to display signal 628 via driver 626. The driver 626 can be a signal generation module or other video processor for use by an integrated display device or a display device coupled to game console 600' via an optional display port, such as a video connector, component video port, S-video connector, parallel or serial video port, HDMI port or other video port.

Processor 622 can include a dedicated or shared processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 624 can be a single memory device or a plurality of memory devices. Such a memory device may be a read-only memory, random access memory, volatile memory, non-volatile memory, static memory, dynamic memory, flash memory, and/or any device that stores digital information. Note that when the processor 622 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is shown, alternative bus architectures including architectures having two or more buses or direct connectivity between the various modules of game console 600', can likewise be employed within the broad scope of the present invention.

FIG. 41 is a graphical representation of trajectory data determined in accordance with an embodiment of the present invention. In particular, example trajectory data 904 is presented that corresponds to a three-dimensional trajectory that is based on motion data 902, such as motion data 602 from a single motion sensor. While the motion data 902 and trajectory data 904 are shown in the context of a Cartesian coordinate system, other coordinate systems can likewise be employed.

In this embodiment, trajectory generation module 625 generates the trajectory data 904 by interpolating the motion data 902 based on the motion prediction model. In this case, the motion prediction module can include a mathematical function such as a linear function, a trigonometric function, polynomial function of other function that is fit to the motion data 902 using a curve-fitting technique and used to interpolate trajectory data. In this fashion, motion data collected at lower resolution or a lower data rate can be used to generate trajectory data at a higher resolution or a higher data rate to simulate the motion of the user 606 in the context of a game.

For example, motion data 902 corresponding to a simulated golf swing can be collected from a gaming object, such as gaming object 610, 610' or 611, at a data rate of 10 samples per second. This motion data 902 can be fit to a mathematical function that represents the biomechanical trajectory of possible golf swings and used to generate interpolated trajectory data 904 at a higher data rate such as 50 samples per second for the rendering of a smooth golf swing when presented on a video display.

FIG. 42 is a graphical representation of trajectory data determined in accordance with another embodiment of the present invention. In particular, example trajectory data 908 is presented that corresponds to a three-dimensional trajectory that is based on a model trajectory derived from motion data 602 from a single motion sensor. While the trajectory data 908 is shown in the context of a Cartesian coordinate system, other coordinate systems can likewise be employed.

In one example, the motion data 602 includes position data that is used by trajectory generation module 625 to select a best-fit model trajectory 906 of a finite number of possible trajectories generated by model generation module 635. Considering again the case of a simulated golf swing, motion data can be collected from a gaming object, such as gaming object 610, 610' or 611, and compared to each of the a finite number of possible trajectories generated by model generation module 635 corresponding to a finite number of possible golf swings. The motion data 602 can be compared to each possible trajectory to determine the model trajectory 906 that provides the best fit, such as best least squares fit, smallest absolute deviation or other best fit to the motion data 602. Once the model trajectory 906 is determined, trajectory generation module 625 generates the trajectory data 908 in accordance with the selected model trajectory 906.

In a further example, motion data 602 include a plurality of model parameters of the motion prediction model, such as polynomial coefficients of a polynomial trajectory, or other coefficients or model parameters of a mathematical function that describe the motion of one or more motion sensors. In this embodiment, trajectory generation module 925 generates the model trajectory 906 based on the model parameters included in the motion data 602 and, in turn, generates the trajectory data 908 based on the model trajectory.

FIG. 43 is a graphical representation of trajectory data determined in accordance with another embodiment of the present invention. In particular, example trajectory data 912 is presented that corresponds to a three-dimensional trajectory that is based on differential motion data. In this example motion data 602 includes motion vectors 910 that describe the magnitude and direction of the motion. Trajectory generation module 625 generates a current position for the trajectory data 912 based on a prior position of the trajectory data 912 and further based on this differential motion data. While the motion vectors 910 and trajectory data 912 are shown in the context of a Cartesian coordinate system, other coordinate systems can likewise be employed.

FIG. 44 is a schematic block diagram representation of a gaming system in accordance with another embodiment of the present invention. In particular, a gaming system, including gaming object 609 and game console 607 is presented that is similar to the gaming system presented in conjunction with FIG. 40 where similar elements are referred to by common reference numerals. In this embodiment however, the application of the motion prediction model is included in the gaming object 609, such as communication device 117 or gaming object 610 or 611.

Gaming object 609 includes a motion sensor 616 for generating motion signals in response to motion of the gaming object 609. Motion data generation module 645 generates motion data 603 based on the motion signals and based on a motion prediction model supplied for instance by model generation module 635. A transmitter or transceiver 620 is coupled to sends the motion data 603 to a game device 607 such as game console 600 or 600' or game device 115 or 115'.

In this embodiment, the motion data generation module 645, such as motion data generation module 55, can generate motion data 603, such as motion data 602, motion data 902 and/or motion vectors 910. For instance, the motion data 603 can include a plurality of model parameters of the motion prediction model. The motion prediction model can include a polynomial trajectory and the plurality of model parameters include a plurality of polynomial coefficients. The motion data 603 can include differential motion data. As discussed in conjunction with FIG. 40, model generation module 635 can generates the motion prediction model based on a game selection signal from processing module 622' or received from game device 607 that indicates the game.

In addition, model generation module can selects a data rate for the motion data based on the game selection signal. For example in a game where fast motion such as a golf swing is expected, a fast data rate can be selected for more frequent sampling of motion signals from motion sensor 616. In other games such as a chess game that simulates the motion of a user's hand to pick and place a chess piece, a slower data rate can be employed to, for instance, save bandwidth. One of a plurality of data rates or direct sampling rates can be selected based on the desired motion accuracy and the expected speed of motion for a particular game that has been selected.

Processor 622' can include a dedicated or shared processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 624' can be a single memory device or a plurality of memory devices. Such a memory device may be a read-only memory, random access memory, volatile memory, non-volatile memory, static memory, dynamic memory, flash memory, and/or any device that stores digital information. Note that when the processor 622' implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is shown with bus 628', alternative bus architectures including architectures having two or more buses or direct connectivity between the various modules of gaming object 609', can likewise be employed within the broad scope of the present invention.

FIG. 45 is a schematic block diagram of a side view of another embodiment of a gaming system in accordance with the present invention. In this embodiment, a gaming object 610" communicates user data 698 to game console 600", such as game console 600, 600', game device 115 or game device 115'. The user data 698 can include authentication data, such as a password, user ID, device ID or other authenticating the for authenticating the user 606 to the game console 600" or to a service provided through game console 600". Further, the authentication data is usable by the game console 600" to set access privileges for the user in accordance with at least one game executed by the game console. In this fashion, a user can be identified as a subscriber or other authorized person to play a game, can be identified as the user 606 as above a minimum age to play an age restricted game, can be identified as having sufficient access privileges to play a game, a particular type of game or a game with a particular rating or range of ratings.

In an embodiment of the present invention, the user data 698 can also include product registration data for the user 606 in accordance with at least one game executed by the game console 600" so that the product registration data can automatically be supplied to game console 600" or a service provider coupled thereto via a network. In this fashion, the user's product information can be obtained each time a new game is initiated, without having to query the user 606 each time and without a potentially laborious process of reentering the product registration.

The user data 698 can further include personal preferences data for the user 606 such as security preferences or data, volume settings, graphics settings, experience levels, names, character selections, etc. that are either game parameters that are specific to a particular game or that are specific to the user's use of the game console 600".

In this fashion, the use of different gaming objects 610" with different users 606 can automatically result in the gaming experience to be customized based on the preferences of user 606 via the user data 698. Similarly, a single gaming object 610" can store user data 698 corresponding to a plurality of users. A user 606 can select his or her user data 698 via an optional user interface provided by gaming object 610" for transmission to game console 600".

Gaming object 610" can be implemented within gaming object 609, 610, 610', 611, or communication device 117'. Gaming object 610" can be a game dedicated device such as a card, tag or game controller. Alternatively, gaming device 610" can be a personal device with non-gaming functionality such as a personal digital assistant, a mobile communication device, a jewelry item, a key chain, a flash drive, or other dongle device, or a digital camera. In either case the gaming object 610" can include a wearable housing that includes a strap, a clip or other device for attaching to the user's person or that itself is an article of clothing or jewelry such as a cap, a glove, a bracelet, a necklace, a ring or other object that can be worn by the user, FIG. 46 is a schematic block diagram representation of a gaming system in accordance with another embodiment of the present invention. In particular, a gaming system is shown that includes game console 600" and gaming object 610". Gaming object 610 includes a memory 900 for storing user data, such as user data 698. Transceiver 670 is coupled to receive an RF signal 608 initiated by game console 600", such as a 60 GHz RF signal or other RF signal. In a similar fashion to a passive RFID tag, transceiver 670 converts energy from the RF signal 608 into a power signal for powering the transceiver 670 or all or some portion of the gaming object 610". By the gaming object 610" deriving power, in whole or in part, based on RF signal 608, gaming object 610" can optionally be portable, small and light. Transceiver 670 conveys the user data 698 back to the game console 600" by backscattering the RF signal 608 based on user data 698.

Game console 600" includes an interface module 632 for coupling to the gaming object 610". In particular, interface module 632 includes a transceiver 680 that transmits RF signal 608 for powering the gaming object 610". In operation, transceiver 680 demodulates the backscattering of the RF signal 608 to recover the user data 698.

Game console 600 further includes a memory 624 and processor 622 that are coupled to interface module 632 via a bus 625. In operation, processor 622 executes one or more routines such as an operating system, utilities, and one or more applications such as video game applications or other gaming applications that produce video information that is converted to display signal 628 via driver 626. Processor 622 can include a dedicated or shared processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 624 can be a single memory device or a plurality of memory devices. Such a memory device may be a read-only memory, random access memory, volatile memory, non-volatile memory, static memory, dynamic memory, flash memory, and/or any device that stores digital information. Note that when the processor 622 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is shown, alternative bus architectures including architectures having two or more buses or direct connectivity between the various modules of game console 600, can likewise be employed within the broad scope of the present invention.

In an embodiment of the present invention, game console 600" further includes conditional access module 682 that authenticates the user based on authentication data included in the user data 698 and further can sets at least one access privilege for the user in accordance with the at least one game. In operation, the conditional access module 682 compares the user data 698 in a user database stored in memory 624 corresponding to the user 606. When the user data 698 compares favorably to the data stored in the user database, the user 606 is authenticated and access privileges can be set based on the access privileges listed in the user database.

As discussed in conjunction with FIG. 45, the user data 698 can also include product registration data for the user 606 in accordance with at least one game executed by the game console 600" so that the product registration data can automatically be supplied to game console 600" or a service provider coupled thereto via a network. In this fashion, the user's product information can be obtained each time a new game is initiated, without having to query the user 606 each time and without a potentially laborious process of reentering the product registration.

The user data 698 can further include personal preferences data for the user 606 such as security preferences or data, volume settings, graphics settings, experience levels, names, character selections, etc. that are either game parameters that are specific to a particular game or that are specific to the user's use of the game console 600".

While not expressly shown, game console 600' can further include a network interface, such as network interface 627, that provides a coupling to a network, such as network 119 as discussed in conjunction with FIGS. 4-8. In particular, this network can be used to communicate authentication data product registration data or user preferences data to a remote server in conjunction the provision of a local game or an on-line game delivered via game console 600".

FIG. 47 is a schematic block diagram of an embodiment of an RFID reader and an RFID tag in accordance another embodiment of the present invention. In particular, RFID reader 705 represents a particular implementation of transceiver 680. In addition, RFID tag 735 represents a particular implementation of transceiver 670. As shown, RFID reader 705 includes a protocol processing module 40, an encoding module 542, an RF front-end 546, a digitization module 548, a predecoding module 550 and a decoding module 552, all of which together form components of the RFID reader 705. RFID 705 optionally includes a digital-to-analog converter (DAC) 544.

The protocol processing module 540 is operably coupled to prepare data for encoding in accordance with a particular RFID standardized protocol. In an exemplary embodiment, the protocol processing module 540 is programmed with multiple RFID standardized protocols to enable the RFID reader 705 to communicate with any RFID tag, regardless of the particular protocol associated with the tag. In this embodiment, the protocol processing module 540 operates to program filters and other components of the encoding module 542, decoding module 552, pre-decoding module 550 and RF front end 546 in accordance with the particular RFID standardized protocol of the tag(s) currently communicating with the RFID reader 705. However, if the remote motion sensing devices 526 each operate in accordance with a single protocol, and the RFID reader is not used by communication device 117 for other purposes, such as conditional access, payment transaction, etc, this flexibility can be omitted.

In operation, once the particular RFID standardized protocol has been selected for communication with one or more RFID tags, such as RFID tag 735, the protocol processing module 540 generates and provides digital data to be communicated to the RFID tag 735 to the encoding module 542 for encoding in accordance with the selected RFID standardized protocol. This digital data can include commands to power up the RFID tag 735, to read motion data or other commands or data used by the RFID tag in association with its operation. By way of example, but not limitation, the RFID protocols may include one or more line encoding schemes, such as Manchester encoding, FM1 encoding, FM1 encoding, etc. Thereafter, in the embodiment shown, the digitally encoded data is provided to the digital-to-analog converter 544 which converts the digitally encoded data into an analog signal. The RF front-end 546 modulates the analog signal to produce an RF signal at a particular carrier frequency that is transmitted via antenna 560 to one or more RFID tags, such as RFID rag 735. The antenna 560 can include a near-field coil.

The RF front-end 546 further includes transmit blocking capabilities such that the energy of the transmitted RF signal does not substantially interfere with the receiving of a backscattered or other RF signal received from one or more RFID tags via the antenna 560. Upon receiving an RF signal from one or more RFID tags, the RF front-end 546 converts the received RF signal into a baseband signal. The digitization module 548, which may be a limiting module or an analog-to-digital converter, converts the received baseband signal into a digital signal. The predecoding module 550 converts the digital signal into an encoded signal in accordance with the particular RFID protocol being utilized. The encoded data is provided to the decoding module 552, which recaptures data, such as user data 698 therefrom in accordance with the particular encoding scheme of the selected RFID protocol. The protocol processing module 540 processes the recovered data to identify the object(s) associated with the RFID tag(s) and/or provides the recovered data to the processor 622 for further processing.

The processing module 540 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 540 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

RFID tag 735 that includes a power generating circuit 740, an oscillation module 744, a processing module 746, an oscillation calibration module 748, a comparator 750, an envelope detection module 752, a capacitor C1, and a transistor T1. The oscillation module 744, the processing module 746, the oscillation calibration module 748, the comparator 750, and the envelope detection module 752 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 744, 746, 748, 750, 752 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the modules 744, 746, 748, 750, 752 implement one or more of their functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

In operation, the power generating circuit 740 generates a supply voltage ($V_{DD}$) from a radio frequency (RF) signal that is received via antenna 754. The power generating circuit 740 stores the supply voltage $V_{DD}$ in capacitor C1 and provides it to modules 744, 746, 748, 750, 752.

When the supply voltage $V_{DD}$ is present, the envelope detection module 752 determines an envelope of the RF signal, which includes a DC component corresponding to the supply voltage $V_{DD}$. In one embodiment, the RF signal is an amplitude modulation signal, where the envelope of the RF signal includes transmitted data. The envelope detection module 752 provides an envelope signal to the comparator 750. The comparator 750 compares the envelope signal with a threshold to produce a stream of recovered data.

The oscillation module 744, which may be a ring oscillator, crystal oscillator, or timing circuit, generates one or more clock signals that have a rate corresponding to the rate of the RF signal in accordance with an oscillation feedback signal. For instance, if the RF signal is a 900 MHz signal, the rate of the clock signals will be n*900 MHz, where "n" is equal to or greater than 1.

The oscillation calibration module 748 produces the oscillation feedback signal from a clock signal of the one or more clock signals and the stream of recovered data. In general, the oscillation calibration module 748 compares the rate of the clock signal with the rate of the stream of recovered data. Based on this comparison, the oscillation calibration module 748 generates the oscillation feedback to indicate to the oscillation module 744 to maintain the current rate, speed up the current rate, or slow down the current rate.

The processing module 746 receives the stream of recovered data and a clock signal of the one or more clock signals. The processing module 746 interprets the stream of recovered data to determine a command or commands contained therein. The command may be to store data, update data, reply with stored data, verify command compliance, retrieve user data 698 from memory 900, send an acknowledgement, etc. If the command(s) requires a response, the processing module 746 provides a signal to the transistor T1 at a rate corresponding to the RF signal. The signal toggles transistor T1 on and off to generate an RF response signal that is transmitted via the antenna. In one embodiment, the RFID tag 735 utilizing a back-scattering RF communication. Note that the resistor R1 functions to decouple the power generating circuit 740 from the received RF signals and the transmitted RF signals.

The RFID tag 735 may further include a current reference (not shown) that provides one or more reference, or bias, currents to the oscillation module 744, the oscillation calibration module 748, the envelope detection module 752, and the comparator 750. The bias current may be adjusted to provide a desired level of biasing for each of the modules 744, 748, 750, and 752.

FIG. 48 is a flowchart representation of a method in accordance with an embodiment of the present invention. In particular, a method is presented for use in conjunction with one or more of the functions and features described in conjunction with FIGS. 1-47. In step 1000, motion data is received in response to motion of a gaming object. In step 1002, trajectory data is generated based on the motion data and based on a motion prediction model. In step 1004, a gaming application is executed based on the trajectory data to generate display data.

In an embodiment of the present invention, the motion prediction model represents a biomechanical trajectory of a user of the gaming object in accordance with a game. The trajectory data can be generated by interpolating the motion data based on the motion prediction model. The motion data can include a plurality of model parameters of the motion prediction model. The motion prediction model can include a polynomial trajectory and the plurality of model parameters can include a plurality of polynomial coefficients. The motion data can include differential motion data and the trajectory data can include a current position that is generated based on a prior position and further based on the differential motion data.

FIG. 49 is a flowchart representation of a method in accordance with an embodiment of the present invention. In particular, a method is presented for use in conjunction with one or more of the functions and features described in conjunction with FIGS. 1-48. In step 1010, motion signals are generated in response to motion of the gaming object. In step 1012, motion data is generated based on the motion signals and based on a motion prediction model. In step 1014, the motion data is sent to a game device.

In an embodiment of the present invention, the motion prediction model represents a biomechanical trajectory of a user of the game controller in accordance with a game. The motion data can include a plurality of model parameters of the motion prediction model. The motion prediction model can include a polynomial trajectory and the plurality of model parameters can include a plurality of polynomial coefficients. Further, the motion data include differential motion data.

FIG. 50 is a flowchart representation of a method in accordance with an embodiment of the present invention. In particular, a method is presented for use in conjunction with one or more of the functions and features described in conjunction with FIGS. 1-49. In step 1020, the motion prediction model is generated based on a game selection signal that indicates the game.

FIG. 51 is a flowchart representation of a method in accordance with an embodiment of the present invention. In particular, a method is presented for use in conjunction with one or more of the functions and features described in conjunction with FIGS. 1-50. In step 1030, a data rate can be selected for the motion data based on a game selection signal.

FIG. 52 is a flowchart representation of a method in accordance with an embodiment of the present invention. In particular, a method is presented for use in conjunction with one or more of the functions and features described in conjunction with FIGS. 1-51. In step 1040, user data is stored. In step 1042, an RF signal is received from a game console. In step 1044, the RF signal is converted into a power signal for powering a gaming object. In step 1046, the RF signal is backscattered based on user data. In an embodiment of the present invention, the user data includes security data for the user in accordance with at least one on-line game executed by the game console.

FIG. 53 is a flowchart representation of a method in accordance with an embodiment of the present invention. In particular, a method is presented for use in conjunction with one or more of the functions and features described in conjunction with FIGS. 1-52. In step 1050, the user data includes authentication data and a user is authenticated to the game console based on the authentication data.

FIG. 54 is a flowchart representation of a method in accordance with an embodiment of the present invention. In particular, a method is presented for use in conjunction with one or more of the functions and features described in conjunction with FIGS. 1-53. In step 1060, access privileges are set for the user in accordance with at least one game executed by the game console, based on the authentication data.

FIG. 55 is a flowchart representation of a method in accordance with an embodiment of the present invention. In particular, a method is presented for use in conjunction with one or more of the functions and features described in conjunction with FIGS. 1-54. In step 1070, the user data includes product registration data for the user in accordance with at least one game executed by the game console and a product is registered based on the product registration data.

FIG. 56 is a flowchart representation of a method in accordance with an embodiment of the present invention. In particular, a method is presented for use in conjunction with one or more of the functions and features described in conjunction with FIGS. 1-55. In step 1080, the user data includes personal preferences data for the user and game parameters corresponding to at least one game executed by the game console are set based on the personal preferences data.

FIG. 57 is a flowchart representation of a method in accordance with an embodiment of the present invention. In particular, a method is presented for use in conjunction with one or more of the functions and features described in conjunction with FIGS. 1-56. In step 1090, gaming data is generated in response to the actions of a user. In step 1092, the gaming data is sent to a game device in a gaming mode of operation. In step 1094, wireless telephony data is transceived with a wireless telephony network in a telephony mode of operation.

In an embodiment of the present invention the gaming device includes a home gaming console and step 1092 includes adjusting a transmit power to a low power state, sending the gaming data to the gaming device in accordance with a wireless telephony protocol, transmitting radio frequency signals directly to the gaming device, and/or transmitting radio frequency signals to a network coupled to the gaming device.

FIG. 58 is a flowchart representation of a method in accordance with an embodiment of the present invention. In particular, a method is presented for use in conjunction with one or more of the functions and features described in conjunction with FIGS. 1-57. In step 1100, display data is received from the gaming device in the gaming mode of operation and the display data is displayed.

FIG. 59 is a flowchart representation of a method in accordance with an embodiment of the present invention. In particular, a method is presented for use in conjunction with one or more of the functions and features described in conjunction with FIGS. 1-58. In step 1110, gaming data is received from a mobile communication device. In step 1112, a gaming application is executed based on the gaming data to generate display data. In an embodiment of the present invention, the gaming data is received in accordance with a wireless telephony protocol and/or via a network.

FIG. 60 is a flowchart representation of a method in accordance with an embodiment of the present invention. In particular, a method is presented for use in conjunction with one or more of the functions and features described in conjunction with FIGS. 1-59. In step 1120, the display data is transmitted to a display device via the network.

FIG. 61 is a flowchart representation of a method in accordance with an embodiment of the present invention. In particular, a method is presented for use in conjunction with one or more of the functions and features described in conjunction with FIGS. 1-60. In step 11130, the display data is transmitted to the mobile communication device.

FIG. 62 is a flowchart representation of a method in accordance with an embodiment of the present invention. In particular, a method is presented for use in conjunction with one or more of the functions and features described in conjunction with FIGS. 1-61. In step 1140, motion signals are generated in response to motion of the mobile communication device. In step 1142, motion data are generated based on the motion signals. In step 1144, the motion data are sent to a game device in a gaming mode of operation of the mobile communication device. In step 1146, wireless telephony data are transceived with a wireless telephony network in a telephony mode of operation of the mobile communication device.

FIG. 63 is a flowchart representation of a method in accordance with an embodiment of the present invention. In particular, a method is presented for use in conjunction with one or more of the functions and features described in conjunction with FIGS. 1-62. In step 1150, motion signals are received from at least one remote motion sensing device. In step 1152, motion data are generated based on the motion signals. In step 1154, the motion data are sent to a game device in a gaming mode of operation of the mobile communication device. In step 1156, wireless telephony data are transceived with a wireless telephony network in a telephony mode of operation of the mobile communication device. In an embodiment of the present invention, the motion signals are received from a plurality of remote sensors at a plurality of corresponding locations.

FIG. 64 is a flowchart representation of a method in accordance with an embodiment of the present invention. In particular, a method is presented for use in conjunction with one or more of the functions and features described in conjunction with FIGS. 1-63. In step 1160, a global positioning system (GPS) signal is received. In step 1162, GPS position data is generated based on the GPS signal. In step 1164, at least a portion of the GPS position data is sent to the game device in the gaming mode of operation.

FIG. 65 is a flowchart representation of a method in accordance with an embodiment of the present invention. In particular, a method is presented for use in conjunction with one or more of the functions and features described in conjunction with FIGS. 1-64. In step 1160, a global positioning system (GPS) signal is received. In step 1162, GPS position data is generated based on the GPS signal, and the motion data is generated based on the GPS position data. In an embodiment of the present invention, the motion data is generated based on a motion vector that is based on the motion signals and further based on a reference position based on the GPS position data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A mobile communication device comprising: a motion sensor for generating motion signals in response to motion of the mobile communication device; a motion data generation module, coupled to the motion sensor, that generates motion data based on the motion signals; and at least one transceiver, coupled to the motion data generation module, that sends the motion data to a game device in a gaming mode of operation and that transceives wireless telephony data with a wireless telephony network in a telephony mode of operation that is different from the gaming mode of operation, wherein the at least one transceiver includes a first transceiver that operates in accordance with a first wireless protocol in the gaming mode of operation and a second transceiver that operates contemporaneously in accordance with a second wireless protocol in the telephony mode of operation.

2. The mobile communication device of claim 1 wherein the motion sensor includes at least one of: an accelerometer and an on-chip gyrator.

3. The mobile communication device of claim 1 further comprising:
a global positioning system (GPS) receiver that receives a GPS signal and that generates GPS position data based on the GPS signal;
wherein the at least one transceiver further sends at least a portion of the GPS position data to the game device in the gaming mode of operation.

4. The mobile communication device of claim 1 further comprising:
a global positioning system (GPS) receiver that receives a GPS signal and that generates GPS position data based on the GPS signal;
wherein the motion data generation module generates the motion data based on the GPS position data.

5. The mobile communication device of claim 4 wherein the motion data generation module generates the motion data based on a motion vector that is based on the motion signals and further based on a reference position based on the GPS position data.

6. The mobile communication device of claim 1 further comprising:
a global positioning system (GPS) receiver that receives a GPS signal and that generates GPS position data based on the GPS signal and based on the motion data.

7. A mobile communication device comprising: a first receiver that receives motion signals from at least one remote motion sensing device; a motion data generation module, coupled to the first receiver, that generates motion data based on the motion signals; at least one transceiver, coupled to the motion data generation module, that: sends the motion data to a game device in a gaming mode of operation; and transceives wireless telephony data with a wireless telephony network in a telephony mode of operation that is different from the gaming mode of operation; and a second receiver that receives a global positioning system (GPS) signal and that generates GPS position data based on the GPS signal; wherein the at least one transceiver further sends at least a portion of the GPS position data to the game device in the gaming mode of operation, wherein the at least one transceiver includes a first transceiver that operates in accordance with a first wireless protocol in the gaming mode of operation and a second transceiver that operates contemporaneously in accordance with a second wireless protocol in the telephony mode of operation.

8. The mobile communication device of claim 1 wherein the remote motion sensor includes at least one of: an accelerometer, an RFID tag, and an on-chip gyrator.

9. The mobile communication device of claim 7 wherein the motion data generation module generates the motion data based on the GPS position data.

10. The mobile communication device of claim 9 wherein the motion data generation module generates the motion data based on a motion vector that is based on the motion signals and further based on a reference position based on the GPS position data.

11. A method for use in a mobile communication device, the method comprising: generating motion signals in response to motion of the mobile communication device; generating motion data based on the motion signals; sending the motion data to a game device in a gaming mode of operation of the mobile communication device; and transceiving wireless telephony data with a wireless telephony network in a telephony mode of operation of the mobile communication device that is different from the gaming mode of operation, wherein the at least one transceiver includes a first transceiver that operates in accordance with a first wireless protocol in the gaming mode of operation and a second transceiver that operates contemporaneously in accordance with a second wireless protocol in the telephony mode of operation.

12. The method of claim 11 further comprising;
receiving a global positioning system (GPS) signal;
generating GPS position data based on the GPS signal;
sending at least a portion of the GPS position data to the game device in the gaming mode of operation.

13. The method of claim 11 further comprising;
receiving a global positioning system (GPS) signal; and
generating GPS position data based on the GPS signal;
wherein the motion data is generated based on the GPS position data.

14. The method of claim 13 wherein the motion data is generated based on a motion vector that is based on the motion signals and further based on a reference position based on the GPS position data.

15. The method of claim 12 further comprising;
receiving a global positioning system (GPS) signal; and
generating GPS position data based on the GPS signal and based on the motion data.

16. A method for use in a mobile communication device, the method comprising: receiving motion signals from at least one remote motion sensing device; generating motion data based on the motion signals; sending the motion data to a game device in a gaming mode of operation of the mobile communication device; a~transceiving wireless telephony data with a wireless telephony network in a telephony mode of operation of the mobile communication device that is different from the gaming mode of operation; receiving a global positioning system (GPS) signal via a receiver included in mobile communication device; generating GPS position data based on the GPS signal; and sending at least a portion of the GPS position data to the game device in the gaming mode of operation, wherein the at least one transceiver includes a first transceiver that operates in accordance with a first wireless protocol in the gaming mode of operation and a second transceiver that operates contemporaneously in accordance with a second wireless protocol in the telephony mode of operation.

17. The method of claim 16 wherein the motion data is generated based on the GPS position data.

18. The method of claim 17 wherein the motion data is generated based on a motion vector that is based on the motion signals and further based on a reference position based on the GPS position data.

19. The method of claim 16 wherein the motion signals are received from a plurality of remote sensors at a plurality of corresponding locations.

20. The mobile communication device of claim 1 wherein the at least one transceiver operates at a first transmit power in the gaming mode of operation and a second transmit power in the telephony mode of operation and wherein the first transmit power is less than the second transmit power.

* * * * *

UNITED STATES PATENT AND TRADEMARK OFFICE
CERTIFICATE OF CORRECTION

PATENT NO.         : 8,160,640 B2
APPLICATION NO.    : 12/131579
DATED              : April 17, 2012
INVENTOR(S)        : Ahmadreza Rofougaran et al.

It is certified that error appears in the above-identified patent and that said Letters Patent is hereby corrected as shown below:

In the Claims:

Col. 48, line 52, in claim 16: replace "a~transceiving" with --transceiving--

Signed and Sealed this
Fourteenth Day of May, 2013

Teresa Stanek Rea
*Acting Director of the United States Patent and Trademark Office*